US012775542B1

(12) United States Patent
Zhang et al.

(10) Patent No.: US 12,775,542 B1
(45) Date of Patent: Oct. 27, 2026

(54) SOURCE CODE SELF-DEBUGGING USING SIMULATED ANNEALING

(71) Applicant: Amazon Technologies, Inc., Seattle, WA (US)

(72) Inventors: Jiangtao Zhang, Pleasanton, CA (US); Ramu Panayappan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 18/753,849

(22) Filed: Jun. 25, 2024

(51) Int. Cl.
*G06F 9/44* (2018.01)
*G06F 8/51* (2018.01)
*G06F 11/362* (2025.01)

(52) U.S. Cl.
CPC ............ *G06F 11/3624* (2013.01); *G06F 8/51* (2013.01)

(58) Field of Classification Search
CPC ............................... G06F 11/3624; G06F 8/51
See application file for complete search history.

(56) References Cited

U.S. PATENT DOCUMENTS

2023/0195560 A1* 6/2023 Haririan .............. G06F 11/0709 714/26
2024/0289640 A1* 8/2024 Araki ..................... G06N 10/80

* cited by examiner

*Primary Examiner* — Bradley A Teets
*Assistant Examiner* — Lenin Paulino
(74) *Attorney, Agent, or Firm* — Athorus, PLLC

(57) ABSTRACT

Disclosed are systems and methods that utilize a simulated annealing technique to guide a self-debugging of source code. The disclosed implementations balance between finding immediate fixes for errors and exploring more radical changes that could lead to increases in errors in the short term and finally an error-free final code in the long term. The disclosed implementations improve and enable self-debugging of code by the SDS by allowing the early exploration that might introduce new errors so that deeper problems in the code can be uncovered and resolved. As the SA temperature is decreased, for example with each iteration or each error resolution, the probability of accepting worsening changes decreases. As a result, the self-debugging process becomes more focused and less likely to introduce new errors as it converges on an error-free solution.

20 Claims, 45 Drawing Sheets

FIG. 21D

2170

STATIC SECTION 2170-1

```
                          LLM Prompt
<role>
    You are an expert programmer debugging a .NET software program.
<role>

<task>
    You are given the file and an error message from that file.
    You are also given the line number in the file where the error exists.
    You are also given the package reference used in the project where the file exists.
    Your task is to help fix the error using the below explanation:
    <explanation>
        1.Packages
                For any changes related to adding or removing packages…
                <example>
                        <packages>
                                <remove>Package1</remove>
                                <add>PackageA</add>
                        </packages>
                </example>

        2.Using Statements
                For any changes related to adding new using statements…
                <example>
                        <usingStatement>
                                <remove>Statement1</remove>
                                <add>StatementA</add>
                        </usingStatement>
                </example>
```

2171

2172

2173-1

2173-2

FIG. 21E

2170

STATIC SECTION 2170-1

2173-3

```
3. Class Level Changes
If you have any class level changes that are outside a
method….
<example>
   <class Name="MyClass">
      <baseClass>
         <add></add>
         <remove></remove>
      </baseClass>
      <properties>
         <add>public SignInManager _signInManager;</add>
         <update Name="_userManager">UserManager<IdentityUser> _userManager…
         </properties>
      </class>
   </example>
```

2173-4

```
4. Method level changes
   For any changes inside a method…
   <example>
      <method Name="ChangedMethod"
      ParameterTypes="string,int" IsNew="true"> public void
      PrintNew(string s, int count)
      {

         Console.WriteLine("Hello World!");
      }

      </method>
   </example>
```

FIG. 21F

2170

STATIC SECTION 2170-1

2173-5

```
5. Attribute changes
   For any attribute changes…
   <example>
       <attributes>
           <remove>
                   <attribute Name="Bind"></attribute>
             </remove>
            <update>
                   <attribute Name="Bind">(argument1, argument2, argument3)</attri
           </update>
       </attributes>
    </example>
```

2173-6

```
6. Artifact changes
   For any artifact changes…
   <example>
       <artifacts>
           ⋮
       </artifacts>
   </example>
  </explanation>
</task>
```

CONSTRAINTS SECTION 2170-2

```
<constraints>
  Constraint 1
  Constraint 2
  Constraint 3
</constraints>
```

FIG. 21G

2170

DYNAMIC SECTION
2170-3

```
        packageReferences>
        Package1
    bootstrap
    EntityFramework
    jQuery
    jQuery.Validation
    Package1.jQuery.Unobtrusive.Validation
    Newtonsoft.Json
        </packageReferences>

    <compile_error>
    'ProductsAPIController.Dispose(bool)': no suitable method found…
    </compile_error>

        <line_number>
        101
        </line_number>

        <file_content>
           …

         </file_content>
        <knowledge>
           DropCreateDatabaseIfModelChanges is not supported in EF Core….
           Dispose methods are no longer part of the controller. These can be
    removed.
           …
        </knowledge>
```

SOURCE CODE SELF-DEBUGGING USING SIMULATED ANNEALING

BACKGROUND

Machine learning (ML) refers to a discipline by which computer systems can be trained to recognize patterns through repeated exposure to training data. The use of a trained model in production is often referred to as "inference," during which the model receives new data that was not in its training data set and provides an output based on its learned parameters. In contrast to machine learning (ML), artificial intelligence (AI) refers to a human perception of a computer system as possessing a capability typically considered to require intelligence.

Large language models (LLMs) are ML/AI systems designed to understand and generate human-like text. These models are trained using machine learning techniques, typically on vast amounts of text data from the internet, books, articles, and other sources. Often, LLMs use a type of neural network called a transformer to process and understand the patterns and structures of language.

The underlying model of an LLM often consists of millions or even billions of model parameters, which are adjustable values that determine how the model behaves. The models are typically trained using a process called unsupervised learning, where they learn to predict the next word or sequence of words in a sentence based on the context provided. By doing so, LLMs develop an understanding of grammar, syntax, and semantics. As a result, LLMs are being increasingly deployed to aid in a variety of fields, including customer support, healthcare, language translation, education, software development, finance, and more.

BRIEF DESCRIPTION OF DRAWINGS

Various examples in accordance with the present disclosure will be described with reference to the drawings, in which:

FIGS. 21D through 21G illustrate example sections of an LLM prompt that may be generated as part of the example operations of the error resolution agent discussed with respect to FIGS. 21A through 21C, in accordance with disclosed implementations.

DETAILED DESCRIPTION

Figure 1:
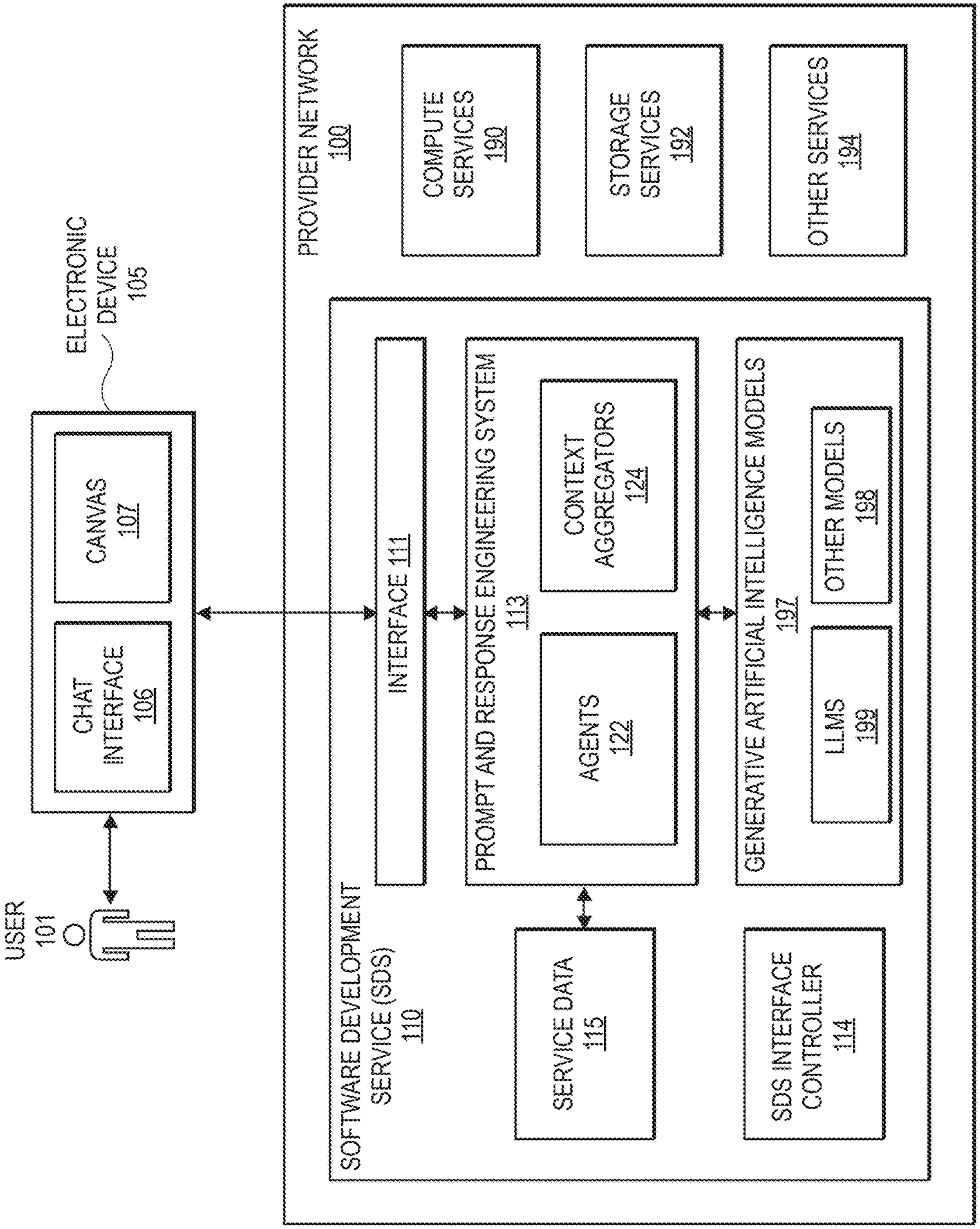
FIG. 1 depicts a high level overview of software development service and environment according to some examples.

The increasing adoption of cloud computing has driven many enterprises to modernize their legacy software applications. This includes migrating Windows-based .NET applications to run natively on Linux, enabling organizations to benefit from the availability, agility, and cost reduction of cloud-native architectures. However, the process of porting these applications is complex and time-consuming, often requiring extensive manual refactoring tasks as well as resolving build errors introduced during the transformation. To address these challenges, the present disclosure introduces two complementary innovations: a generative AI-powered refactoring experience that automates, for example, the porting of .NET applications to Linux, and a self-debugging mechanism that leverages simulated annealing to guide the resolution of compilation and build errors caused by code transformation.

Regarding code transformation, the process typically involves manually identifying and replacing incompatible packages and application programming interfaces ("APIs"), refactoring deprecated code, transitioning to new runtimes, and adding test coverage. The disclosed systems leverage LLMs to provide a guided refactoring experience, automating code transformation workflows, enabling self-debugging capabilities to resolve build errors, and employing in-context learning techniques for replacing incompatible APIs between versions such as .NET Framework and .NET Core. Specifically, this system can generate prompts for LLMs that specify structured sections that define how the LLM's output should be organized into distinct parts. Additionally, the disclosed systems and techniques can utilize code analysis tools to analyze various components, such as packages, APIs, artifacts, and errors, and append relevant data to the LLM prompts based on this analysis. Furthermore, the innovation allows for the validation of the LLM's response based on the defined sections. If necessary, the LLM can update its response based on the feedback generated during the validation process. This feedback loop ensures that the LLM's response adheres to the specified structure and incorporates any necessary corrections or improvements.

As referenced above, the code transformation process can introduce new compilation and build errors into the modified code. Fixing these errors through manual debugging can be challenging, especially when the errors are interdependent. Resolving one error may expose or create additional errors, or the applied fix may be suboptimal, leading to a dead-end that blocks the path to an entirely error-free codebase. Repeatedly prompting an LLM with different errors and information without an overarching strategy is ineffective for achieving convergence, particularly when errors are interconnected. To address this challenge, the present disclosure describes using a simulated annealing optimization algorithm to guide an automated self-debugging process. The buggy code segment can be treated as the initial state, with error-free code being the desired final state, and potential fixes representing neighboring states. The simulated annealing algorithm balances exploration (trying fixes that may temporarily increase errors) and exploitation (preferring fixes that reduce errors), for example by way of "temperature" adjustments. This exploration-exploitation tradeoff mimics the iterative nature of debugging, allowing the process to escape local optima by temporarily accepting worse solutions. As the temperature decreases, the system becomes more conservative, converging toward an optimal, error-free solution. This approach provides an effective way to navigate the complex landscape of interdependent errors and find a globally optimal fix.

By offloading these undifferentiated tasks, developers can focus on value-added work like building new features rather than the laborious process of identifying and replacing packages, libraries, APIs, and fixing build issues. The system can use LLMs to analyze the codebase, generate transformation plans, execute key refactoring tasks, and strategically explore potential fixes for build errors, streamlining the overall modernization workflow.

Accordingly, the present disclosure relates to an AI-powered developer productivity solution that utilizes a simulated annealing ("SA") algorithm to guide a self-debugging process to resolve errors or bugs in software applications that are common during coding, development, transformation of code from an older version of the code to a current version of the code (e.g., Java 8 to Java 17), etc. This self-debugging solution can be provided as a software development service (SDS) in a cloud provider network and/or can be integrated into a development environment, in various implementations. The SDS supports a broad array of tasks, from small bug fixes to sweeping refactoring changes that impact multiple inter-dependent applications.

As described above, the SDS can self-debug and fix errors, bugs, and vulnerabilities in a software program, transform code, perform refactoring, replace packages in code, etc. Specifically, the SDS can identify errors or potential errors, determine solutions to those errors, test those solutions to determine whether, when implemented, the solution generates additional errors in the code, or other problems, and then decide whether to commit the solution as part of a strategic process of achieving error-free code. As discussed further below, in some implementations, one or more ML/AI systems, such as an LLM, may be utilized to determine potential solutions to errors, bugs, vulnerabilities, package replacements, code transformations, and/or other operations, generally referred to herein as suggested error solutions or suggestion operation solutions, in the software programs. For example, during refactoring of a code base, changes may be centered around fixing errors in the code base, replacing packages with different packages, and replacing APIs with different APIs.

To improve the functioning of the LLM and to validate suggested operation solutions received from an LLM, the code may be processed to determine errors, packages, APIs, and/or other artifacts in the code that need to be updated/resolved as part of the operation. A knowledge base, such as a package knowledge base, API knowledge base, an error knowledge base, an artifacts knowledge base, etc., may then be queried to determine information relevant to the errors, packages, APIs, and/or other artifacts. An LLM prompt may then be generated that includes not only the relevant code, errors, etc., but also knowledge regarding those errors/code, etc., to help guide the LLM in generating suggested operation solution(s). Through this structured approach, the suggested operation solution(s) received from the LLM may then be validated before they are incorporated into the code or considered for incorporation into the code, thereby reducing or eliminating the chance of hallucination by the LLM.

Still further, through use of an SA algorithm, the SDS can explore various resolutions to code errors, even potentially suboptimal or error increasing solutions temporarily, to eventually determine a path that leads to resolution of all code issues and an error-free code. SA is a probabilistic algorithm that is akin to physical annealing in which a material is repeatedly heated and cooled to elicit a desired structural property. Similarly, SA may allow more flexibility (higher temperature) in exploring/accepting possible solutions to code errors or less flexibility (lower temperature) in exploring/accepting possible solutions to code errors to reach a desired or final state of error-free code.

As discussed further herein, with the disclosed implementations, code with errors may be considered an initial state, error-free code may be considered a final state, and all versions of the code between the initial state and the final state may be considered neighbor states. Potential solutions to errors may be applied in a way that balances between finding immediate solutions for the errors and exploring more radical changes to the code that could lead to more errors in the short-term neighbor states but error-free code at the final state. When processing the initial state and nearby neighbor states the temperature may be high such that the SDS is more willing to accept more radical changes, even if more errors are created in the short term neighbor states. Such a strategic approach reduces or eliminates the downside of greedy algorithms that only select the short-term best solution, which may result in an inability to converge to error-free code. Likewise, as the temperature decreases, the probability of the SDS accepting solutions that increase the number or errors in the code decreases and the self-debugging process becomes more focused and less likely to introduce new errors as it converges on a solution.

Further, the SDS can use AI, such as an LLM, to understand an application's architecture and the changes or possible solutions to resolve errors in the code. For example, the SDS may analyze a source code of an application that is to be debugged, transformed, etc., any documentation about the application, and information about the resources that comprise the application (ex: specific compute and storage resources) to understands the application code and architecture, for example by querying the application programming interfaces ("APIs") of other services to gather information about the application's resources and configuration. If there are areas of the task which are uncertain, the SDS can identify these areas and request clarification, for example from a developer, before generating a development plan and proposed changes and/or initiating a self-debugging of the code. The SDS may then determine and explore the trade-offs of multiple code changes/solutions to debug the code or transform the code from an initial state, to one or more neighbor states, and finally to an error-free state, also referred to herein as a final state. As discussed herein, depending on the number of neighbor states specified between the initial state and the final state, the temperature or flexibility of exploring different solutions may vary as the SDS converges toward the final state of the code.

To provide an example, a developer may describe a change such as 'switch the frontend of my application's container cluster to application load balancer.' The SDS can inspect the application's source code, propose a list of next steps, such as 'create a new application load balancer', 'configure round-robin load balancing across containers', 'test the load balancer with example traffic', and 'add an alarm for error messages from the cluster', and include for each step the required command-line interface ("CLI") commands, infrastructure-as-code, application code, and tests. The developer can quickly validate the proposed changes, make any needed edits, and apply them in a single click. Other non-limiting examples of use cases include adding payment processing using a particular API, modernizing code by breaking a monolith into microservices, refactoring an application from one framework to another, or adding authentication using an authentication service API.

Developers can interact with the SDS through multiple user interfaces, such as a console chat window, directly in their preferred development environment, or through comments in their source and task management systems. The SDS can include a chat that allows developers to specify their task and clarify requirements or respond to follow up questions from the SDS, as well as an interactive canvas for displaying the system architecture. The SDS can display the list of needed actions and list of required changes to accomplish the task both as text in the chat window and visually on the architecture diagram, helping the developer easily assess the scope and impact of changes. Clicking on the action list in the chat response or on the visual canvas notifications can cause display of the changes the SDS recommends. As an example, for code changes, the SDS can show a code diff and open the developer's specified development environment to apply the change; for infrastructure changes, the SDS can show the infrastructure-as-code changes directly in the visual architecture representation. Using this multimodal interface, the developer can quickly inspect the proposed change, amend it if necessary, and apply it in a single click. The developer can amend code changes in their development environment or by telling the SDS via the chat what changes need to be made, and can make architectural changes by interacting with the visual diagram which triggers the SDS to create corresponding new changes. The SDS can also display a list of all tests available for the workload in a panel on its visual canvas, making it easy to apply the recommended changes and execute the tests that validate the application's behavior in a couple of clicks. If any errors are identified during testing, the SDS can perform error resolution as described above. When used with task managed systems, the SDS can act as a bot, suggesting changes and responding to developers' questions in the comments section of each task.

It will be appreciated that source code and documentation can be highly proprietary and so the SDS will not use such content from one developer for purposes of assisting other developers, but rather keeps any source code, documentation, and/or learnings based on such materials (ex: trainings or fine tuning of any of its models) within the boundaries of the owning user's account. The SDS may also expose an API that users can use to fine-tune its model(s) for their use cases and provide additional runtime context. Accordingly, there may be many slightly different copies of the ML/AI of the SDS, each tuned to support a specific developer or organization based on their proprietary code and documentation.

Accordingly, disclosed are methods, apparatus, systems, and non-transitory computer-readable storage media for an SDS. The SDS can assist with a variety of software development efforts, including for complex tasks that involve multi-step reasoning or require large amounts of user-specific context, by leveraging generative artificial intelligence (GAI) models such as LLMs. GAI models can create new data instances as output. A new data instance means that it is generated by the model based on the model parameters and is not carried over from the model input or otherwise copied from outside the model (for example, from an index of searchable content). Example efforts include developing software project plans, dividing development tasks into sub-tasks or actions, and troubleshooting errors. The SDS acts as an intermediary between users and GAI models, enriching user prompts with additional instructions and/or context, monitoring model responses, and, in some cases, performing various "under-the-hood" interactions with the model without requiring action by the user.

In some examples, the SDS includes agent applications that formalize various software development effort workflows and their interactions with an LLM. Agent applications serve as an intermediary between a user and an LLM, operating to expand user prompts, curate LLM responses, and provide the LLM with additional context often without user intervention. Additionally, various control mechanisms that regulate interactions with an LLM are introduced by way of example in the agent applications. Such control mechanisms can be used to avoid circular conversations with an LLM, keep the LLM on task, validate LLM responses, etc.

Existing LLMs have a very unidirectional conversation approach that requires users to have a well specified question or prompt to get a result that matches their expectations. With a well-defined prompt, LLM systems can create or modify software systems in a manner that respects the boundaries of the given description. While this is an impressive feature, it lacks the interaction that usually happens between engineers and product managers during the requirements engineering phase in which design considerations for a software system are defined. In some examples, a system design agent of the SDS can cause an LLM to ask clarifying questions regarding an initial prompt to gather answers to various design considerations. Such design considerations can include scope, requirements, and priorities, such as the geographic region(s) in which to host the system, whether the application should be distributed, the expected workload of the system (e.g., to understand how much compute and storage resources to allocate), the types of compute and/or storage resources to use to host the system, programming languages and/or frameworks to use or leverage, whether the application should operate with synchronous or asynchronous transfers between components, which aspects of the CAP (Consistency, Availability, Partition tolerance) theorem to prioritize (in the case of a distributed system), etc. The SDS can gather additional information about existing software systems associated with the user. Using that gathered information, the SDS can attempt to answer the clarifying questions. For example, if a question involves the specification of a programming language to use for a task, the SDS can infer that a client would use Python where the system (if modifying an existing system) or most of the other systems of the client (if creating a new system) are authored in Python. When a clarifying question from the LLM remains unanswered from the gathered information, the SDS can prompt the client to provide an answer. When answering the SDS's clarifying questions with information that is relevant beyond the current project and task, such as a company's preference for private subnets in a virtual private cloud ("VPC"), developers can ask the SDS to retain this information for future reference and share it across accounts within their same organization. These preferences are stored alongside any business jargon dictionary and used to augment future prompts to the SDS's model. By providing answers to the LLM's clarifying questions, the SDS improves the degree to which the LLM can propose solutions that meet the client's design requirements.

In some examples, a development task agent of the SDS can cause an LLM to subdivide a given software development task into discrete actions by prompting the LLM for the set of actions a user would need to take to complete a particular task. Exemplary tasks include modifying an interface between software components, adding support for a new feature, changing an order processing backend on a website, migrating data from one database to another, etc. For each action, the development task agent obtains detailed actions from the LLM for the developer to take to complete the action. The development task agent tracks the gathering of this detailed information, keeping the LLM on task by including context related to the status of the additional detailed information gathering in subsequent prompts. Doing so avoids relying on the "memory" of the LLM, which often is limited in size and can fade as the number of interactions with the LLM increases, often resulting in unwanted effects such as straying off task. In some examples, the detailed actions include generated code snippets, which the development task agent can provide to the user such as with a link to the source code file in which the change is to be made, a display of a code diffs (e.g., a display of the code indicating before and after the suggested to-do), and other information. In some examples, the stored tracking data allows users to iteratively break down particular actions into more discrete actions (e.g., a top level task divided into a plurality of level 1 tasks, a level 1 tasks divided into a plurality of level 2 tasks, and so on).

In some examples, an error resolution agent of the SDS can cause an LLM to generate one or more potential resolutions for an operation, such as an error resolution operation, a package replacement operation, a refactoring operation, a transformation operation, etc., also referred to herein as a potential error solution or potential operation solution. For example, when resolving an error, the error resolution agent may consider each of the one or more errors, the current SA temperature value and implement one of the potential error solutions as it self-debugs code toward an error-free final state. In some implementations, another client in the form of a software application might invoke the error resolution agent via an API call to the SDS. Example software applications include an error logging application or service that records errors that occur during execution of a software application, software project management applications that track reports of errors or bugs, software development environments, etc. An error resolution agent can gather additional details regarding the error in responses from the LLM and consider those responses when determining potential error solutions. By increasing the level of specificity about the error that is provided to the LLM in these chained prompts, the error resolution agent can prompt the LLM for specific error resolutions, such as suggested code or configuration changes.

In some examples, agents submit prompts to an LLM by populating prompt templates. Prompt templates can include language that provides meaningful context to the LLM, scoping a particular task, and governing the overall flow of completing that task. Prompt templates can include placeholders that agents populate with context-specific information, whether gathered from a user or from other resources available to that agent. Prompt templates can also include response definitions that define the expected response to the prompt. For example, one response definition might indicate that the response should be a Yes or No while another response definition might indicate that the response should be executable code in a given programming language.

FIG. 1 depicts a high level overview of an SDS and environment according to some examples. An SDS 110 acts as an intermediary that interfaces with generative artificial intelligence (GAI) models, such as language models, on behalf of clients. Language models probabilistically generate natural language (e.g., the word "said" is more likely to appear after the word "he" than after the word "dolphin"). LLMs are one type of language model developed with a neural network architecture often including millions or even billions of model parameters, which are trained using datasets of documents that determine how the model behaves. The size of such datasets can include thousands, millions, or even more documents. Exemplary LLMs include OpenAI's GPT-3.5 and GPT-4, Google's PaLM or PaLM 2, etc. As an intermediary, the SDS 110 can manage client interactions with GAI models. For example, the SDS 110 can expand received prompts before submitting them to an LLM and can curate LLM responses. Expanding prompts can provide the LLM with additional information relevant to a particular task, including by adding additional context about the nature of the task and by adding context-specific details. With prompt expansion, the SDS 110 can improve the quality of LLM responses. Curating LLM responses verify LLM responses are within the scope of a given task, validate that the LLM responses are syntactically correct, etc. In some examples, the SDS 110 can manage some exchanges of information with a language model such as the LLM 199 without engaging or with limited engagement of a client or user 101. For example, when self-debugging code, the SDS 110 may generate and provide prompts to the LLM and receive responses from the LLM that are used as potential error solutions that may be applied as the code is self-debugged toward a final state of the code that is error-free.

One common environment for an SDS is a provider network 100. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users 101 (or "customers") of provider networks 100 can use one or more user accounts that are associated with a customer account, though these terms can be used somewhat interchangeably depending upon the context of use. Users 101 can interact with a provider network 100 via one or more interface(s), such as through use of application programming interface (API) calls, via a console implemented as a website or application, etc.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time, but close enough together to meet a latency requirement for intra-region communications. The data centers house physical computing devices (e.g., suitable types of servers) that host the bare metal and virtualized resources (e.g., compute, networking, & storage) on which cloud services and customer workloads run.

Furthermore, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users 101 of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users 101 of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

The SDS 110 can assist users 101 with various software development tasks. Example software development tasks include development of software project plans, subdividing a software development task into steps, troubleshooting software errors, transforming code from an old or out of date version to a current version of the code (e.g., Java 8 to Java 17), transforming code from one language or platform to another (e.g., .net to Linux), etc. Strung end-to-end, these tasks can represent a large portion of an overall software development effort, from planning to implementation and troubleshooting. Note that as used herein, a software system can refer to an individual program or to a collection of programs, context about the program(s) such as their operating environment and/or structure on which they are executed or distributed (e.g., cloud-level resources), mappings of communications or data flows between the programs (if applicable), etc.

As illustrated, the SDS 110 includes an interface 111, a prompt and response engineering system 113 that includes agents 122 and context aggregators 124, service data 115, and LLMs 199. The interface 111, typically an API, provides different entry points for clients to interact, via the SDS 110, with an LLM 199. A user 101 interacts with an SDS 110 via an electronic device 105. The electronic device 105 can display one or both of a chat-based interface 106 and a canvas interface 107. Interfaces 106, 107 send and receive data via the interface 111 of the SDS 110. The chat-based interface 106 can be part of a graphical user interface providing a "chat" type interface commonly associated with LLMs in which users can type text and receive responses.

The canvas 107 can provide the display of graphical architecture diagrams of software systems and allow users 101 to make modifications to their software systems. For example, the canvas 107 can use different icons to represent different resources (or clusters of similar resources such as autoscaling groups) of an application, and can connect these icons via lines to show network flows between the different resources. The SDS can maintain a model of the application architecture visualized in the canvas that it can translate into infrastructure as code ("IaC") definitions, and can also translate IaC definitions into visual architecture diagrams.

The interface 111 can also provide a more programmatic entry point for other applications or services such as an issue management service (also sometimes referred to as issue tracking service), a logging service of the provider network, or the application displaying the interfaces 106, 107 (e.g., a software development environment or issue management application executed by the electronic device 105). API calls via these type entry points can include, like the chat-based interface, free-form text (e.g., bug descriptions or change requests from an issue tracking system, error messages from the logging service, etc.) but further include additional contextual parameters available to the application or application environment issuing the call (e.g., an identification of the code repository associated with a particular software change request, an identification of the cloud-hosted instance generating a log entry, etc.).

Generally speaking, the SDS API 111 can provide for interactions with various clients, including human users such as user 101 via interfaces 106, 107, and with other applications such as software development environments, software management systems, issue tracking systems, etc. These application-based clients typically interact with the SDS API via calls having a more structured set of parameters (e.g., accepting a structured format file that includes identifications of various data sources) as compared to the freeform text found in calls from the chat-based interface 106, for example.

The SDS 110 can support multi-tenancy, allowing multiple clients to connect and interact with LLMs 199. Each client can have one or more sessions with the SDS 110, the sessions corresponding to sessions with an LLM 199. To do so, the SDS 110 can track, for a given session, the last N prompts sent to, and responses received from the LLM in a memory such as in service data 115. The memory can be implemented as a moving window or circular buffer: as new prompts are sent and responses received, the SDS 110 deletes or overwrites the oldest entries. For a given session, the prompt and response engineering system 113 may embed all or a portion of the session memory in prompts submitted to the LLM by any of the agents 122. For example, if a session includes session history X and a new prompt P, the prompt and response engineering system 113 can submit concatenate P to X or to the most M most recent prompts and responses (where M<N) and submit the result of the concatenation to the LLM.

The SDS 110 can assign a session identifier to new sessions, allowing clients to pause and resume sessions. By referencing a session identifier upon connecting to the SDS 110, a client can return to an existing session. The SDS 110 can permit access to sessions based on a permissions policy associated with a principal account credential provided in establishing a connection to connect to the SDS 110. The credential may be associated with a user or group of an organization. The permissions policy can permit sharing of a session across different entities within the organization. For example, a first client may initiate a first session with the SDS 110 and receive a session identifier X. Later, a second client may resume the first session with the SDS 110 by providing the session identifier X, provided the credential provided when the second client established the connection to the SDS 110 is permitted to do so.

The prompt and response engineering system 113 can also monitor client text inputs over a session for certain session-management instructions. Such session-management instructions can be associated with various session-level operations. One example session-level operation is SESSION_RESET to reset a session, clear the memory associated with that session, and reset the associated session(s) with LLMs 199. Another example session-level operation is SESSION_CLOSE to close a session with the SDS 110 and any associated session(s) with LLMs 199.

The prompt and response engineering system 113 includes agents 122 and context aggregators 124. Agents 122 include various task-specific agents as well as other general agents that support SDS interactions with an LLM 199. Task-specific agents formalize various software development effort workflows, operating to expand user prompts, curate LLM responses, and provide the LLM with additional context often without user intervention. Context aggregators 124 retrieve additional data that agents can use to expand prompts or to otherwise provide to an LLM as conversation context to improve the relevance of LLM responses. The context aggregators 124 can retrieve the additional data from other cloud-based services, such as compute services 190, storage services 192, other services 194, etc.

Service data 115 can include data such as prompt templates, response definitions, user preferences, session state data, etc.

GAI models 197 include LLMs 199 and other models 198. LLMs are artificial intelligence systems designed to understand and generate human-like text. These models are trained using machine learning techniques, typically on vast amounts of text data from the internet, books, articles, and other sources. Often, LLMs use a type of neural network called a transformer to process and understand the patterns and structures of language. In some examples, the SDS leverages an LLM trained on the documentation of provider network services as well as application documentation and code examples of applications hosted by or that interface with services of the cloud provider network. The SDS can also leverage a more general-purpose LLM trained on a larger variety of texts. Other models 198 can include code generation models, which may be within the same family as LLMs but trained and/or fine-tuned on a corpus more narrowly curated to software development documents (e.g., application code, comments, documentation, programming books, etc.) rather than general texts encompassing a range of other fields. A code generation model used to generate code for an SDS as described herein can include a reference tracker or origin tracker feature, which can identify when outputs of some threshold size (e.g. line(s) of code, number of words/tokens) are similar to or the same as instances of its training data and then provide metadata about that training data (e.g., author, license terms such as an open source license, link to original source repository) to the user. The SDS can receive such metadata and display it to the user so that the user can decide whether they would like to accept or modify the code suggestion or ask for a different generated suggestion.

In the illustrated example, the SDS 110 further includes an SDS user interface controller 114. The SDS UI controller 114 can manage interactions between the SDS 110 and a user interface such as the chase-based interface 106 or canvas 107 (e.g., to render a graphical view of a software system), interactions between the user interfaces 106 and 107 (e.g., to reflect chat-based inputs on the canvas or vice versa), and interactions between agent results and the user interfaces (e.g., to display the recommended changes associated with an LLM output on the canvas 107). Additional details regarding the SDS UI controller 114 are illustrated and described at least with reference to FIG. 25.

Figure 2:
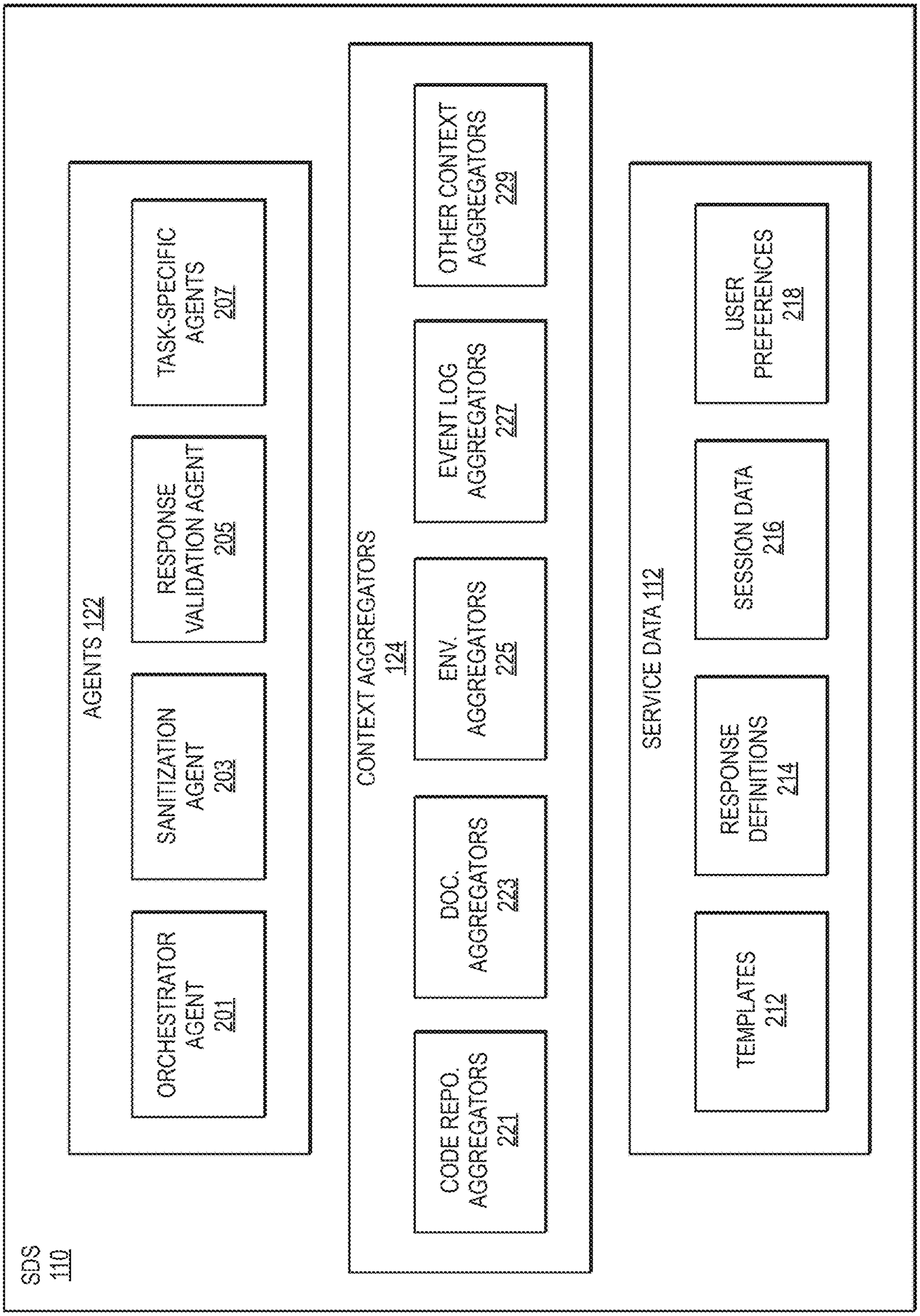
FIG. 2 depicts additional details of a software development service according to some examples.

FIG. 2 depicts additional details of a software development service ("SDS") according to some examples. Agents 122 include various task-specific agents 207 as well as other general agents that support SDS interactions with an LLM 199. Example general agents include an orchestrator agent 201 that can manage a session with a client, a sanitization agent 203 that can ensure prompts and responses are within the scope of various tasks or do not venture into sensitive or objectionable material, and a response validation agent 205 that can evaluate LLM responses against expected results. For example, the response validation agent may validate that the content of the response is not objectionable (e.g., does not include profanity), is not copyright protected, etc.

In some examples, the orchestrator agent 201 can be the default agent executed upon connection by an application to the SDS 110 with a chat-based interface. Depending on the initial user prompt, the orchestrator agent 201 can identify the task requested to be performed and invoke the associated task-specific agent. The orchestrator agent 201 leverages an LLM to determine whether a given prompt falls within a supported set of tasks and to identify which task-specific agent should be invoked.

In some examples, the sanitization agent 203 reduces the likelihood of the LLM providing objectionable or off-topic responses. Such responses may be artifacts of the LLM operations, resulting in what are sometimes referred to as "hallucinations." Having received a response, a sanitization agent can prompt the LLM (or another LLM, or another instance of the LLM without a saved context) with questions related to the nature of the response, such as to test whether the response contains objectionable material, whether the response is related to the expected field of use (e.g., software development, error resolutions, etc.).

In some examples, the response validation agent 205 (or "validation agent") verifies that an LLM response conforms with the response definition of the preceding prompt. The response validation agent can perform a variety of validations. Example validations include prompting the LLM (or another LLM, or another instance of the LLM without a saved context) with a question as to whether the received response conforms with the response definition of the previous prompt, testing whether the downstream software that processes the response can successfully parse it (e.g., parsing the response in a try-catch statement), and, in the case of code, executing the code in an isolated environment such as a sandbox. For example, a potential error solution provided by an LLM may be combined with code to generate a modified code and the modified code and executed in a sandbox environment to determine if the errors resulting in the modified code correspond to expected errors provided by the LLM that are expected to result with implementation of the potential error solution, as discussed further below.

Example task-specific agents 207 include agents that assist clients with a given task. For example, a system design agent can assist a client in gathering additional information to provide to the LLM to improve the LLM's response to a software development task, a development task agent can assist a client dividing a development task into sub-tasks or actions. An error resolution agent may automatically debug and resolve errors on behalf of the user and/or determine an efficient resolution to eliminate errors and provide guidance to the user. In some examples, the interface 111 of FIG. 1 can support requests that invoke a particular task-specific agent without relying on the orchestrator agent 201. For example, one API call can invoke the system design agent, another can invoke the development task agent, and another can invoke the error resolution agent.

Context aggregators 124 gather context about a given software system's environment to be provided to an LLM as part of the prompt expansion operations of the SDS 110. Such additional data can range from general documentation applicable to a prompt to specific source code associated with a given component of the software system. Agents 122 can invoke context aggregators, in some cases depending on a previous response from an LLM identifying which additional context would assist it in generating a response. Using the information obtained from the invoked context aggregator(s), agents 122 can provide at least some of that information as additional context in subsequent prompts sent to the LLM.

Some context aggregators 124 can retrieve information from other cloud-hosted services of a provider network or other reachable sources (e.g., sources with public facing APIs external to the provider network). One example of such information is source code and configuration data, which can provide relevant context to an LLM. Another service 194 of the provider network 100 may be a code repository service that stores source code, documentation, and other configuration data in repositories for various client applications. A code repository aggregator 221 can access the code repository service to obtain source code and/or configuration data associated with various components of an identified software system.

In some examples, context aggregators retrieve information about a particular software system. Such may be the case when a client of the SDS 110 has engaged it for a task associated with an existing system. The client can provide references to the various cloud-hosted services that include details about the system to the SDS 110, and the context aggregators can retrieve that data. In other examples, context aggregators retrieve information about other software systems owned by or otherwise accessible to a principal-typically the identity that was used to authenticate a client. The principal may be a user, group of users, organizational unit within a business, etc. The SDS 110 can leverage context aggregators to retrieve details about the other systems of the principal.

Often environmental parameters can have an effect on software program operations. Such environmental parameters can extend from the particulars of the operating system environment variables in which the application is running to the overall cloud-based environment, the latter particularly so when the application is hosted in a provider network. For example, another service 194 of the provider network 100 may be a permissions service (e.g., an identity and access management service). Such a permissions service can include policies that define the various actions that principals can take or that various actions that can be taken upon hosted resources, thus impacting application execution. An environment aggregator 225 can access the permissions service to obtain permissions data associated with an identified software program.

Logged events and/or errors can also provide context regarding a development task, particularly when troubleshooting bugs or other errors. Another service 194 of the provider network 100 may be a logging service in which events, errors, and other types of activity related to applications executing in the cloud are recorded. An event log aggregator 227 can access the logging service to obtain logs associated with an identified software system.

General documentation related to a service or API can also provide useful context without being specifically associated with a particular application or user. Other types of more specific documentation can also be helpful. Such documentation can include software project descriptions, software documentation, source code files, ticketing systems, and the like from other public software programs or systems. Another service 194 of the provider network 100 may be a documentation service that stores such documentation. A documentation aggregator 223 can use Retrieval Augmented Generation (RAG) techniques to identify documents of "relevance" to a given task. Initially, each of the available documents with the documentation service can be encoded as an embedding, those embeddings stored in a database. When invoked, the documentation aggregator can 223 use the encoder to generate an embedding from user text for the given task. The document aggregator 223 can then identify relevant documents based on the distance between the task embedding and document embeddings in the database, selecting the N nearest document embeddings, document embeddings within some distance threshold, or some other criteria to identify documents having embeddings in proximity to the task embedding. The documentation aggregator 223 can then access the documentation service to obtain the documents associated with those selected embeddings.

Other context aggregators 229 may generate annotated context from data obtained by other context aggregators. For example, some context aggregators can compile and annotate data retrieved by other aggregators into a summary. Such a context aggregator can indicate, for each of the other context aggregators that retrieved data or other information, a description of the source of the information. As another example, some context aggregators may generate structural summaries of a software system. Cloud-hosted software systems are often structured as a collection of interacting services with user code running on various resources to coordinate those interactions. A system map (or "architectural map" or just "map") can describe the structure of a software system. The structure can include details like programs, the cloud-level infrastructure or resources on which those programs are executed, the interconnection of those programs through various data transfers (e.g., API calls, passing JSON objects, etc.), environmental configuration data (e.g., environment variables available to the programs, variables that configure the resources on which programs execute, etc.), network-level configuration data (e.g., VPC configuration data, configuration data of virtual network components like routers or gateways, etc.). In some examples, a system map of the structure of a software system may have been previously defined (e.g., by the developer). In other examples, a system map context aggregator can generate a system map that provides a description of the software system. Additional details on the system map context aggregator are illustrated and described with reference to FIG. 3.

Service data 112 can include templates 212, response definitions 214, session data 216, and user preferences 218. Templates 212 can include templates that provide additional text cues beyond what might otherwise be provided by a user. For example, a user might provide a prompt such as "what is causing error X?" A prompt template can encapsulate the user's prompt with various cues that improve the quality of the response of the LLM. One pattern used by agents associated with various tasks described herein is a template to prompt the LLM to ask questions (e.g., "You will be asked to respond to the following prompt: 'what is causing error X?' What information would assist you in your response?"). Prompt templates can be used to expand prompts received from various clients (a human user typing a software error into an issue tracking system that later submits an API call to the SDS is likely to use the same abbreviated language as a human user typing an error into a chat session with an LLM). Templates 212 can also include response templates for responses to be sent to clients, populated with data received from the LLM and/or actions taken by the SDS (e.g., resolution of errors in code).

Response definitions 214 define how the SDS 110 will expect the response from the LLM to be formatted. Response definitions 214 can be used to regularize the responses from LLMs to improve the ability of the SDS 110 to parse those responses such that they can be stored, trigger follow on actions, etc. Example response definitions include instructing the LLM to respond in natural language forms such as with a Yes or No, a list of items, an enumerated list of items, etc. and also to respond with more structured forms (e.g., with Python code, with an SQL query, with a JSON object, etc.) Note that the interpretation of responses pursuant to response definitions is typically contingent on the phrasing of a prompt, tailored within a given agent (e.g., a negative response might indicate a pass for one prompt, a failure for another).

Session data 216 can include the historical dialogue with an LLM, as mediated by the SDS. Not all prompts that the SDS 110 submits to an LLM 199 originate from a client, nor does the SDS 110 send all responses from the LLM 199 to the client. For this reason, the session data can include metadata about LLM interactions (e.g., whether a prompt originated from the SDS 110 or a client, whether a response from the LLM was sent to a client). For example, while a client may submit a prompt of "can you fix error X?," the SDS may sent a prompt to the LLM of "please provide one or more potential solutions to resolve error X."

User preferences 218 can include stored user preferences based on prior dialogs with a client. In particular, the system design agent can elicit information from the client regarding preferences. Such preferences can include things such as preferred programming language (e.g., to instruct the LLM when requesting code suggestions), preferred compute options for cloud-hosted applications (e.g., whether a virtual machine, container, serverless function, etc.), permissions preferences (e.g., whether a certain set of principals can access the application), etc.

While not shown, the service data 112 can include other data such as the types of tasks the SDS 110 can support (typically those associated with the available task-specific agents) as well as the types of additional information or context that can be gathered (typically associated with the available context aggregators).

Figure 3:
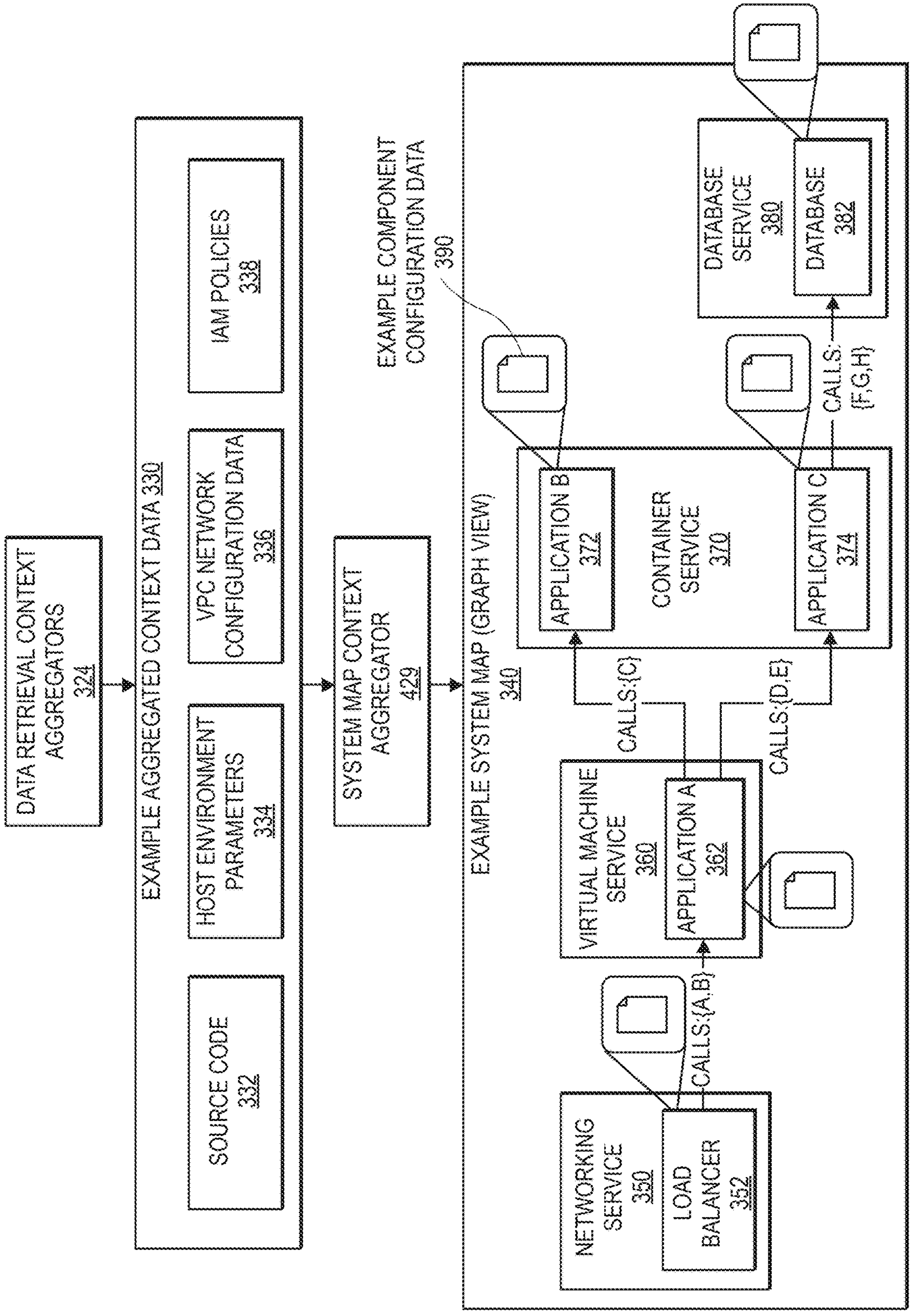
FIG. 3 depicts details of a system map context aggregator according to some examples.

FIG. 3 depicts additional details of a system map context aggregator according to some examples. A system map context aggregator 429 can analyze example aggregated context data 330, such as source code 332, host environment parameters 334, VPC network configuration data 336, IAM policies 338, etc., collected by various data retrieval context aggregators 324 (e.g., aggregators 221, 223, 225, 227, etc.) to identify components of a software system as well as the dependencies amongst those components. The system map context aggregator 429 can generate a system map 340, typically specified in a structured language format describing the components such as resources (e.g., networking service 350, virtual machine service 360, container service 370, database service 380) and mappings between resources. Common formats for the map include JSON, YAML, UML, etc. In an example map, each component can include an identification and description of the APIs it vends as well as an identification of the APIs it calls. Thus, a component vending an API "product_order ( ) would be a dependency to other components making calls to that API. The components can further include or reference the network policies that control the types of traffic that can be sent to or from the component. For components executed by a resource (e.g., containers, virtual machines, serverless functions, etc.), the map can include or reference the environmental parameters associated with an instance of that component. For data sources and sinks, the components can include a description of their formats (e.g., a schema for databases hosted by a database service).

An example graphical view of a system map 340 is illustrated. Components 352, 362, 372, 374, 382 are interconnected via API calls A through H as shown. Each component has an association with a service of the cloud provider network—for example the database 382 is hosted by a database service 380 of the provider network (e.g., another service 194). Each component also has a component configuration data 390, such as permissions policies, network policies, environmental configuration data, etc.

Figure 4:
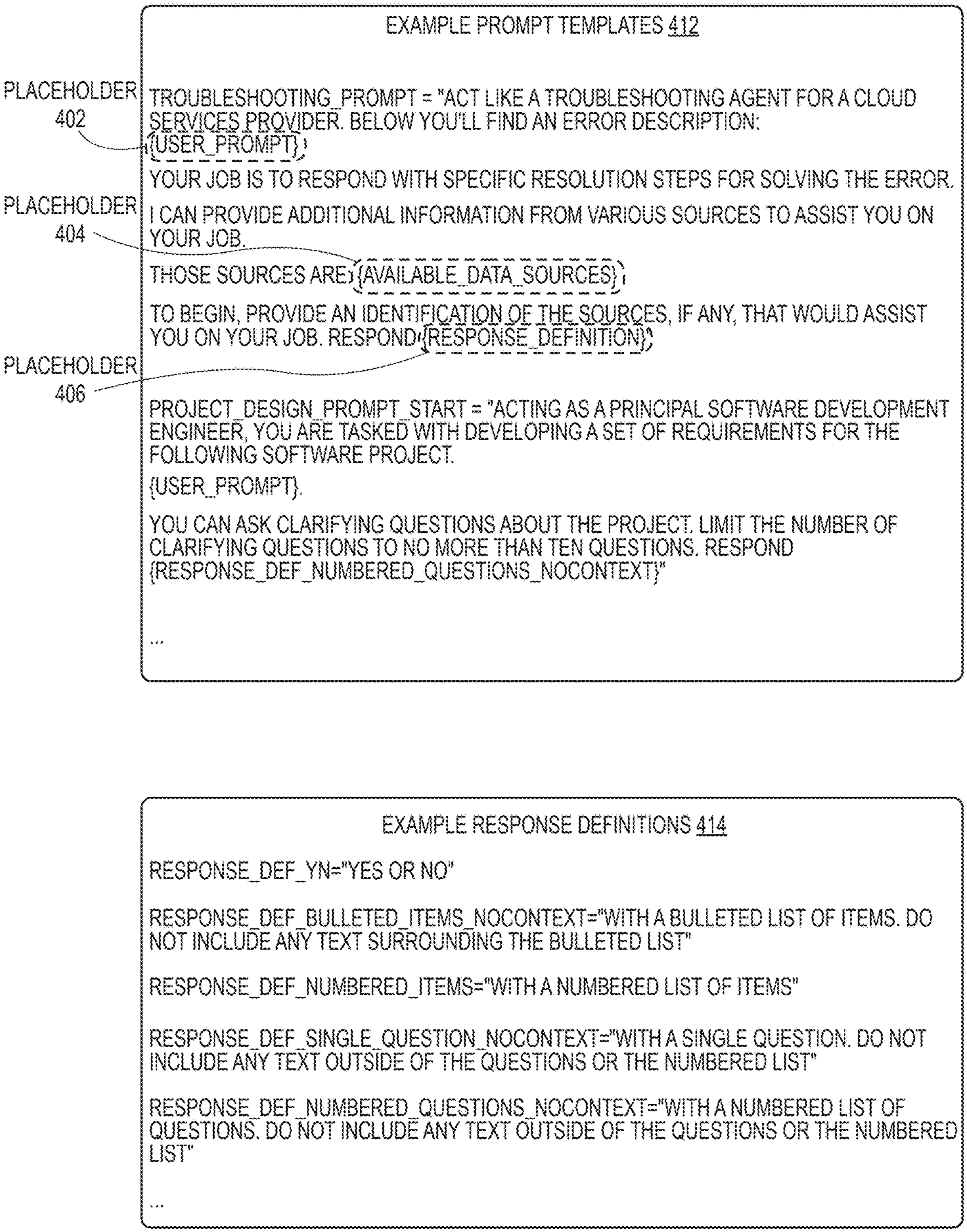
FIG. 4 depicts example prompt templates and response definitions according to some examples.

FIG. 4 depicts example prompt templates and response definitions according to some examples. Example prompt templates 412 include a troubleshooting prompt template and a project design prompt template. Example prompt templates 412 provide additional cues to an LLM about the scope and/or performance of various tasks. Prompt templates can include placeholders that can be populated with custom text, typically offset from the prompt text by special characters and identified by a variable name (indicated by braces surrounding a variable name in this and subsequent figures). In using a prompt template, agents 122 populate the placeholders prior to submitting the resulting prompt to an LLM. For example, the troubleshooting prompt template includes a placeholder 402 for a user prompt, a placeholder 404 for an identification of available data sources that the LLM has at its disposal, and a placeholder 406 for a response definition that describes the form of the expected response. Prompt templates can also be used for messages sent to a user (e.g., to wrap additional context around a response or responses from an LLM).

Example response definitions 414 include, in prose, descriptions of how an LLM should respond to a particular prompt. The illustrated examples include descriptions of a "yes or no" response, a response including only a set of bulleted items, a response including a set of numbered items, and a response including only a set of numbered items. A validation agent can leverage the response definition associated with an LLM prompt (or prompt template) and the associated response to perform various operations that evaluate the suitability of the response for continued SDS 110 operations (e.g., whether the SDS 110 can parse the response).

Figure 5:
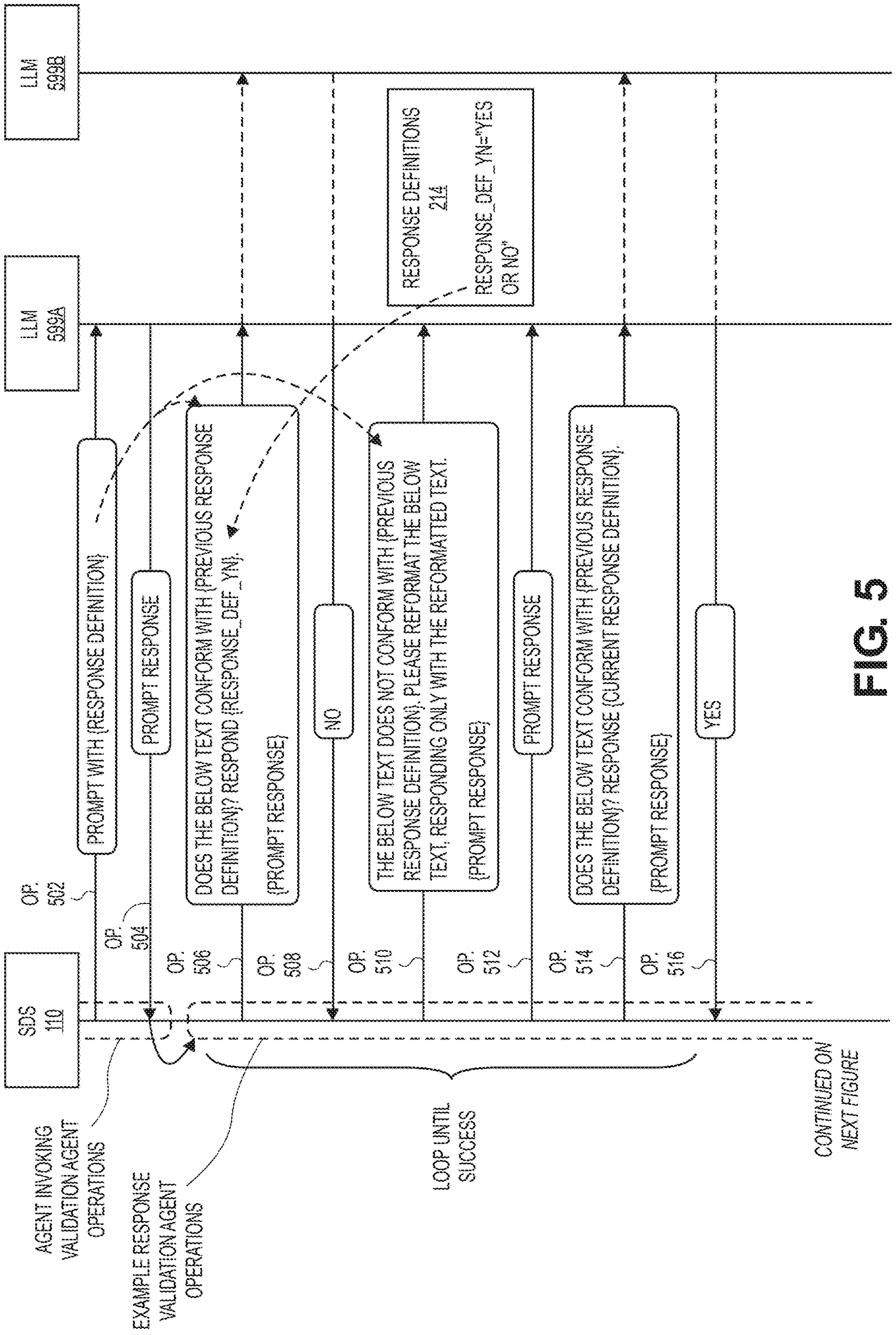
FIGS. 5 and 6 depict example operations of a validation agent according to some examples.
Figure 6:
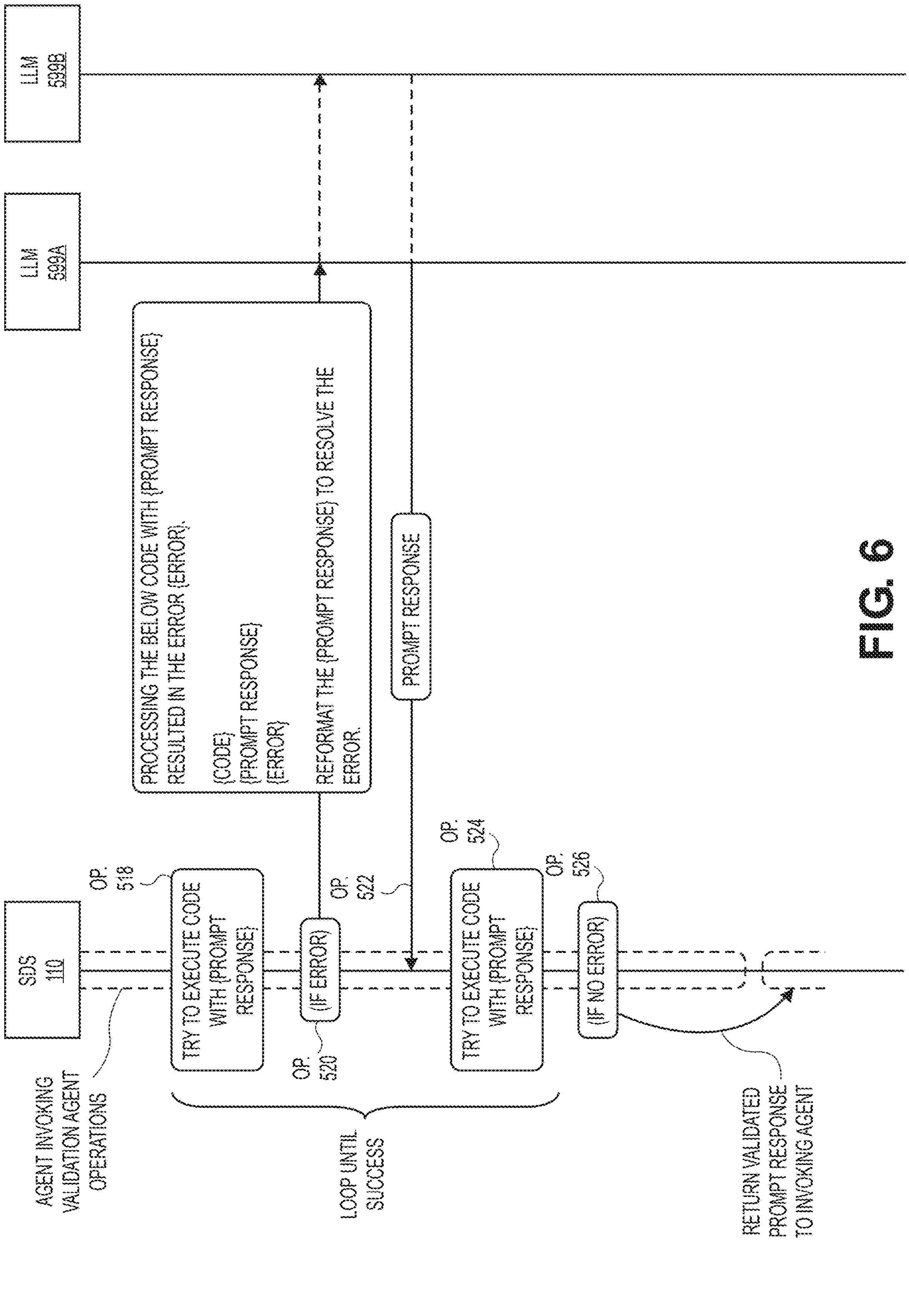

FIGS. 5 and 6 depict example operations of a validation agent according to some examples. A validation agent such as the response validation agent 205 can be called by other agents as needed to review the correctness of an LLM-generated response against response definitions. Initially, at operation 502, a task agent invoking a validation agent can send a prompt with a response definition to an LLM 599A. At operation 504, the task agent can receive a response to the prompt and invoke the validation agent.

The example operations of the validation agent can be broadly categorized as LLM-based validations (i.e., using an LLM to validate an LLM response) and execution-based validations (i.e., attempting to execute code using an LLM response). To illustrate LLM-based validations, at operation 506, the validation agent sends a prompt including the response and prompt definition, the prompt inquiring whether the response complies with the response definition. Note that the interactions of the validation agent can be with the same LLM 599A that generated the response or with a different LLM 599B (such as when the LLMs provide different levels of performance on given tasks).

At operation 508, the validation agent receives a response to the LLM-based validation prompt. At operation 510, given the negative response at operation 508, the validation agent sends a response correction prompt to the LLM 599A that generated the previous response that failed the validation, the response correction prompt to reformat the prior response. (In other examples, the validation agent can send a response correction prompt to another LLM such as the LLM 599B.)

In some examples, given a response indicating a previous response did not comply with a response definition, the validation agent can prompt the queried LLM to provide an explanation, which can be included in the response correction prompt (e.g., at operation 510).

At operation 512, the validation agent receives an updated prompt response from the LLM 599A. At operation 514, the validation agent sends a prompt like the one of that of operation 506. As indicated, the validation agent can loop through the LLM-based validations until an affirmative response is received from the LLM validator, such as at operation 516. In some examples, the validation agent maintains a count of the number of passes through the LLM-based validation loop and returns an error when that number exceeds a threshold.

Having completed the LLM-based validations, the validation agent can proceed to execution-based validations. Continuing on FIG. 6, at operation 518, the validation agent attempts to execute code using the prompt response, such as a potential error solution. The code used in the execution attempt can be in the form of an application developed to exercise a prompt response given a particular response definition. The executed validation agent can determine the code to execute based on the previous response definition. The code can generate no output or effect no changes or can be executed in a sandbox-type environment.

If the code execution fails, at operation 520, the validation agent sends a prompt including the code, the prompt response (e.g., from the LLM-validation operations), and/or the error to the LLM 599A or 599B to prompt the LLM to correct the prompt response. At operation 522, the validation agent receives the updated prompt response.

At operation 524, the validation agent performs another attempt at executing the code with the prompt response. As indicated, the validation agent can loop through the execution-based validations until the code executes without error, causing the validation agent to return the validated prompt response to the invoking agent, as indicated at operation 526. In some examples, the validation agent maintains a count of the number of passes through the execution-based validation loop and returns an error when that number exceeds a threshold. In other implementations, as discussed below, the agent may be the SDS and using SA to determine which of one or more potential resolutions to explore in an effort to resolve errors in the code before returning the error-free code to the user.

Prompts sent at operations 506, 510, 514, and/or 520 can be based on prompt templates in templates 212.

Validation agent and/or sanitization agent (described below) operations can be performed on responses 508, 512, 516, and/or 522 (note that the response definitions in the preceding prompts are not always expressly identified in the figures). In some examples, some or all of the validations that would otherwise take place on responses to validation prompts (e.g., to operations 506, 514) can be omitted, relying on the LLMs high degree of performance on well-defined tasks (e.g., answering "yes or no" prompts).

A validation agent can be invoked by other agents anytime the other agent receives a response from the LLM based on a prompt that included a response definition.

Figure 7:
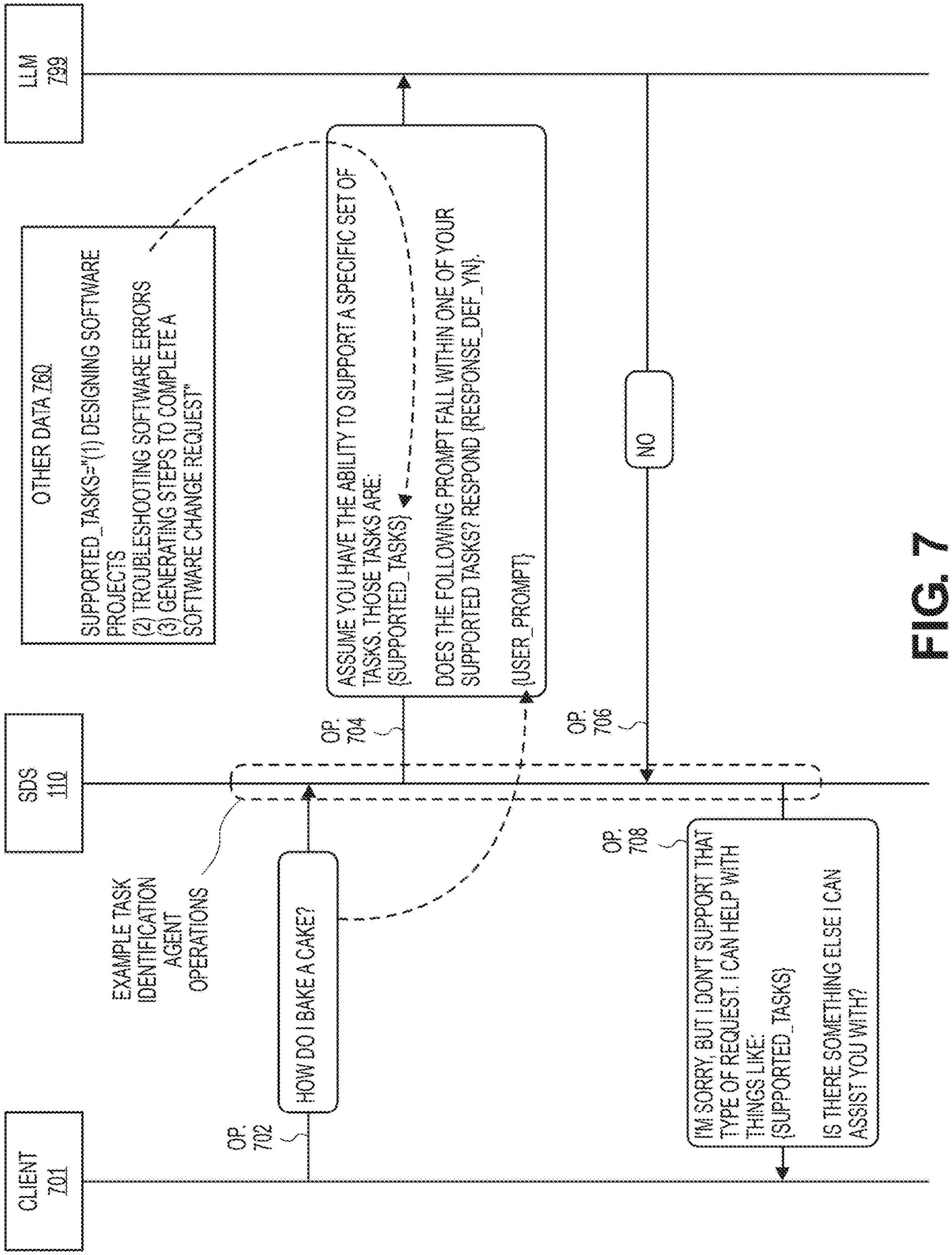
FIGS. 7 and 8 depict example operations of an orchestrator agent according to some examples.
Figure 8:
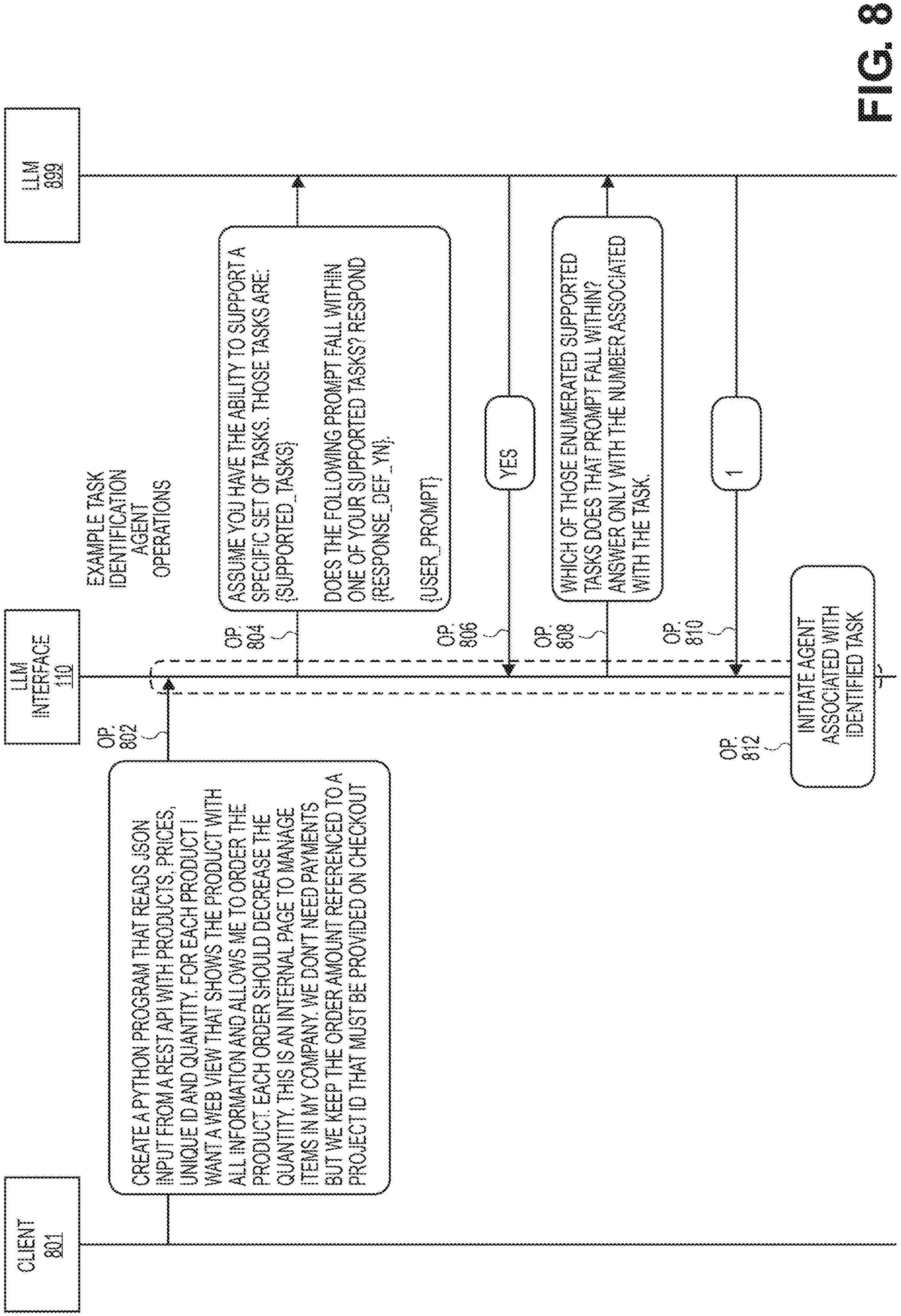

FIGS. 7 and 8 depict example operations of an orchestrator agent according to some examples. An orchestrator agent such as the orchestrator agent 201 serves to identify other task-specific agents 207 to be executed. FIG. 7 depicts example operations of an orchestrator agent processing a prompt including unsupported task. At operation 702, the orchestrator agent receives a prompt from a client 701. At operation 704, the orchestrator agent sends a prompt to an LLM 799 inquiring whether the included client prompt falls within a set of supported tasks, the set of supported tasks defined in other service data 760 (e.g., as part of service data 115). At operation 706, the orchestrator agent receives a negative response from the LLM 799. At operation 708, given the negative response at operation 706, the orchestrator agent sends a response to the client prompt indicating that the request appears to be unsupported.

FIG. 8 depicts example operations of an orchestrator agent processing a prompt including a supported task. At operation 802, the orchestrator agent receives a prompt from a client 801. At operation 804, the orchestrator agent sends a prompt to an LLM 899 inquiring whether the included client prompt falls within a set of supported tasks. At operation 806, the orchestrator agent receives an affirmative response from the LLM 899.

At operation 808, given the affirmative response at operation 806, the orchestrator agent prompts the LLM 799 to identify the task that the client prompt falls within. At operation 810, the orchestrator agent receives a response including an identification of the task associated with the client prompt (which can be validated using a validation agent provided the prompt at operation 806 included a response definition). At operation 812, the orchestrator agent initiates the agent associated with the identified task (e.g., a system design agent, a development task agent, and error resolution agent, etc.).

Prompts sent at operations 704, 804, and/or 808 can be based on prompt templates in templates 212. The response sent at operation 708 can be based on a response template in templates 212.

Validation agent and/or sanitization agent (described below) operations can be performed on responses 508, 512, 516, and/or 522 (note that the response definitions in the preceding prompts are not always expressly identified in the figures).

Figure 9:
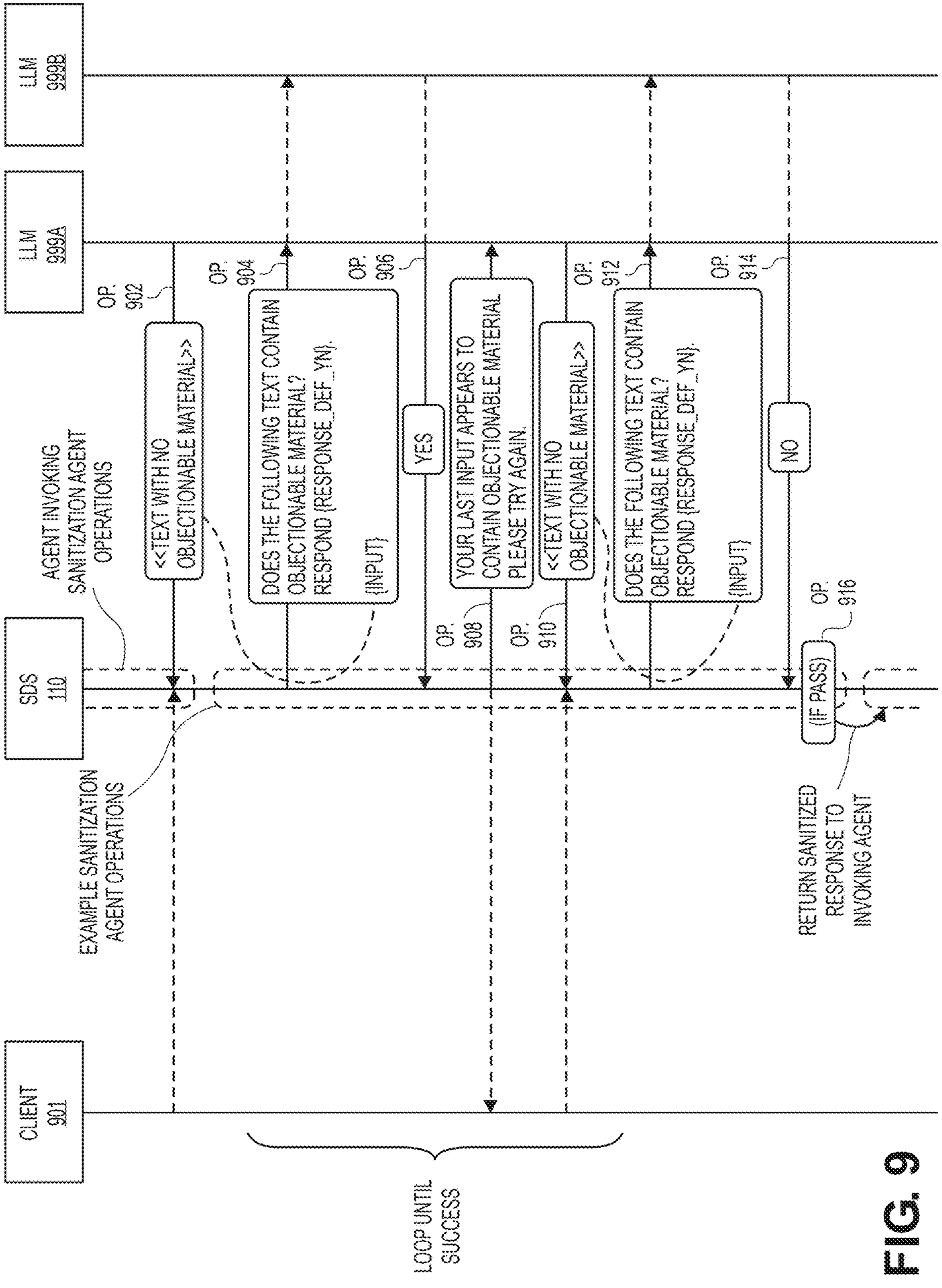
FIG. 9 depicts example operation of a sanitization agent according to some examples.

FIG. 9 depicts example operations of a sanitization agent according to some examples. A sanitization agent such as the sanitization agent 203 can be called by other agents as needed to review the scope and/or content of an LLM-generated response or even client-submitted text. At operation 902, an agent invoking a sanitization agent receives text from an LLM 999A. Here, the text is assumed to include objectionable or sensitive material. At operation 904, the sanitization agent sends a prompt to the LLM 999A inquiring whether the text, received from the invocation agent, contains sensitive material. In this example, the prompt includes a "yes/no" response definition.

At operation 906, the sanitization agent receives an affirmative response from the LLM 999A indicating that the text contained sensitive material. At operation 908, given the affirmative response at operation 906, the sanitization agent prompts the LLM 999A to rephrase its last response. In some examples, given a response indicating a text included objectionable material, the sanitization agent can prompt the LLM 999A to provide an explanation of the analysis, which can be included in the prompt to rephrase a response (e.g., at operation 908).

At operation 910, the sanitization agent receives text from an LLM 999A. Here, the text is assumed to be rephrased such as to not include objectionable or sensitive material. At operation 912, the sanitization agent sends a prompt to the LLM 999A like the one of operation 904. At operation 914, the sanitization agent receives a negative response from the LLM 199A indicating that the text did not contain sensitive material. As indicated, the sanitization agent can loop through the operations 904 through 910 until an acceptable response is received to the sanitization prompt, such as at operation 914. At operation 916, the sanitization agent returns the sanitized text to its invoking agent.

As indicated by the dashed lines between the client 901 and the SDS 110 at operations 902 and 908, the sanitization agent can perform operations on text received from the client and can prompt the client to rephrase questionable text.

As indicated by the dashed lines to and from an LLM 999B, the sanitization agent can vet texts with an LLM other than the one that generated the response under evaluation. Doing so can avoid increasing the amount of off-task context that is stored with the session state or leverage a differently trained LLM than the one that generated the response under question.

Prompts sent at operations 904, 908, and/or 912 can be based on prompt templates in templates 212 (possibly based on a response template if the rephrase request is sent to the client 901). A sanitization agent can use other prompt templates to ask an LLM other types of questions, such as a "scope" prompt to question whether a text includes material unrelated to the use case (e.g., software development, etc.). The sanitization agent can use the scope prompt template in operations such as those described above for prompt template used to detect objectionable material (e.g., repeating operations 904 through 914 but with the scope prompt template to test for out-of-scope text).

Validation agent operations can be performed on responses 906, 914 (note that the response definitions in the preceding prompts are not always expressly identified in the figures).

A sanitization agent can be invoked by other agents anytime the other agent receives an input (whether from an LLM or a client).

Figure 10:
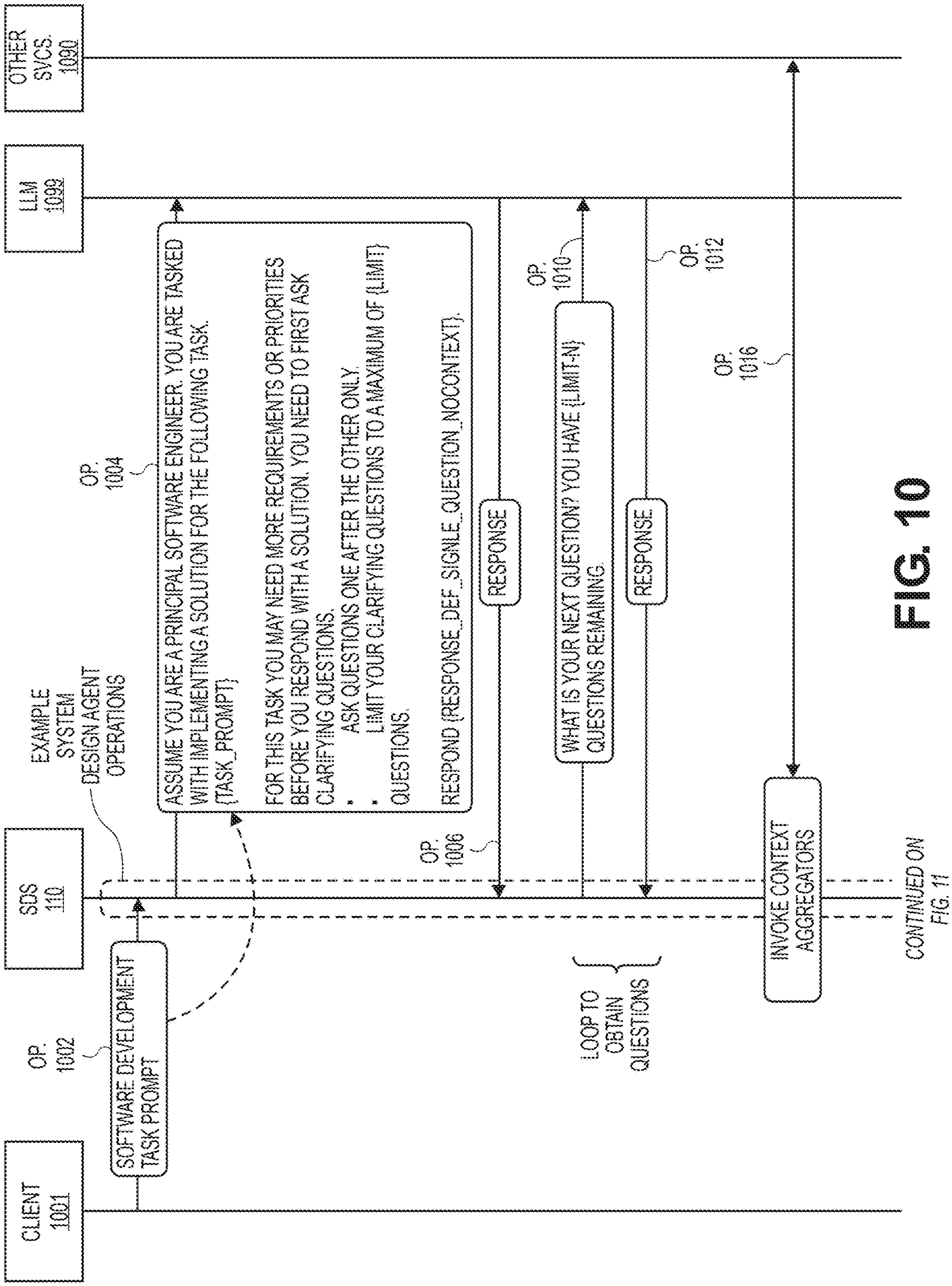
FIGS. 10 and 11 depict example operations of a system design agent according to some examples.
Figure 11:
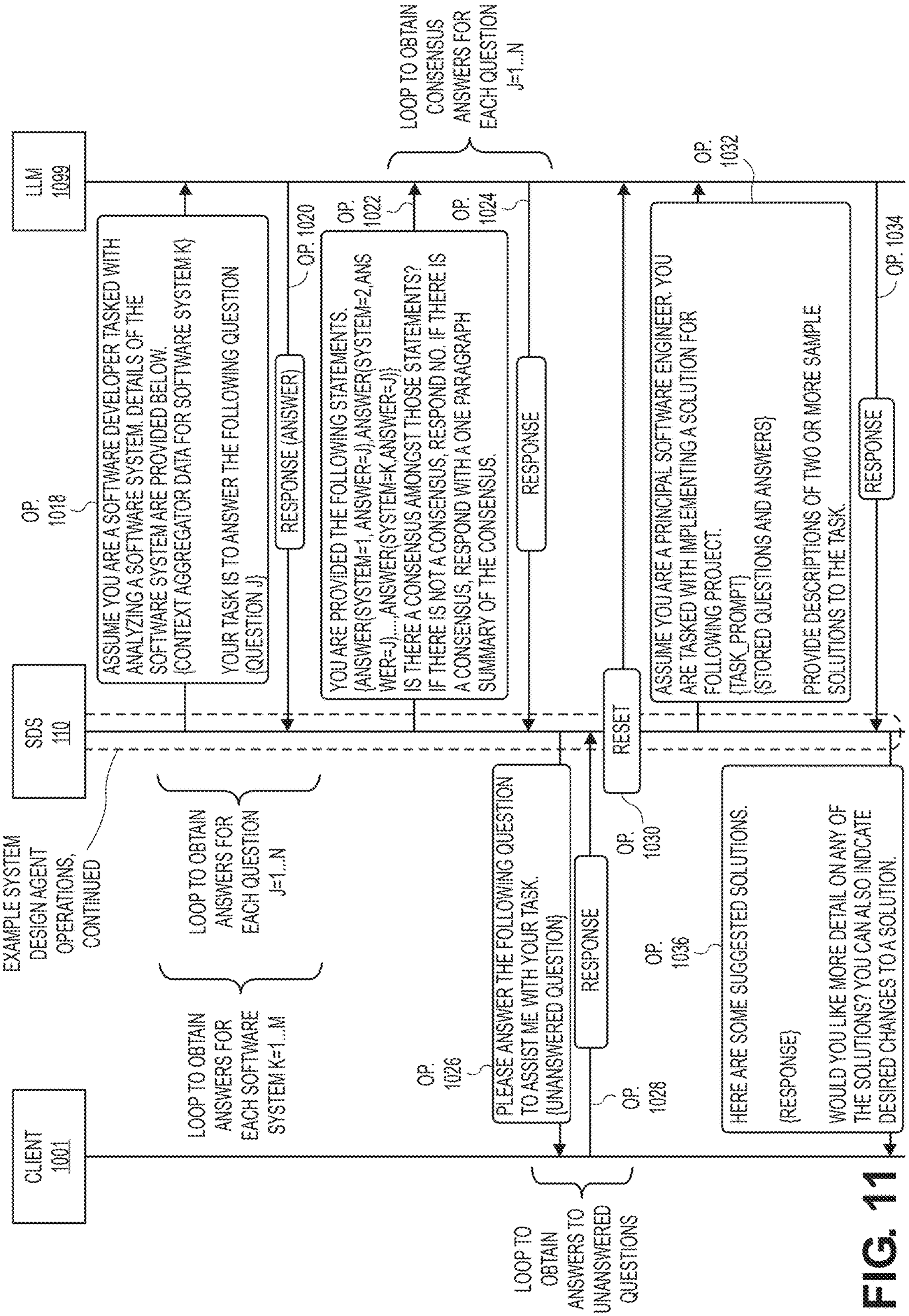

FIGS. 10 and 11 depict example operations of a system design agent according to some examples. A system design agent can improve LLM responses to software development tasks by providing additional information to the LLM. By gathering and providing additional information to the LLM, the system design agent can obtain details regarding design considerations such as particular preferences, requirements, priorities, trade-offs, and the like to further frame an LLM conversation to improve LLM-recommended task solutions. At a high level, the system design agent prompts the LLM to generate clarifying questions prior to providing recommended solutions to a task. The system design agent can then gather information about various software systems of the client and use that gathered information to answer the clarifying questions. In some examples, if a question remains unanswered, the system design agent can pass the question to the client. Using the gathered information, the system design agent can respond to the task. For example, at operation 1002, the system design agent receives a prompt from a client 1001 (by way of an orchestrator agent, for example), the prompt including a task prompt (typically in the form of a description of a software design task).

At operation 1004, the system design agent sends a prompt including the task prompt to an LLM 1099, the prompt requesting a set of clarifying questions related to design considerations of the task (e.g., requirements, priorities, preferences, etc.). The prompt can include an instruction to limit the number of questions to a threshold. In some examples, the limit may be a fixed threshold (e.g., based on empirical data related to the performance of the agent). In other examples, the system design agent may query the LLM to determine how many questions it estimates would scope the design considerations. If the LLM's response is over a threshold, the system design agent may limit the number of questions to that threshold. Otherwise, the system design agent can limit the number of questions to that estimated by the LLM. In other examples, the system design agent may prompt the client for the limit and set the limit in the prompt to the client-specified limit.

In this example, the system design agent prompts the LLM 1099 for the questions one at a time. At operation 1006, the system design agent receives a response from the LLM 1099 and stores it as a question. If there is more than one question, the system design agent continues to accumulate the questions. For example, at operation 1010, the system design agent prompts the LLM 1099 for the next question, the prompt including an indication on the number of questions remaining (assuming the limit has not been reached). At operation 1012, the system design agent receives a response from the LLM 1099 again stores it as a question. As indicated, the system design agent continues to obtain questions from the LLM 1099 until the limit has been reached. In other examples, the system design agent can prompt the LLM 1099 for a complete set of questions rather than obtaining them sequentially.

The system design agent attempts to answer the questions using tools at its disposal before soliciting additional information from the client. To do so, at operation 1016, the system design agent invokes one or more context aggregators. The context aggregators can be invoked to obtain information about software systems associated with the client principal. The client principal is the identity that the client used to authenticate with the SDS 110. The principal may have permissions (via user, group, role, organizational unit, etc.) to access data about one or more other software systems hosted by the provider network. For example, that data can include source code repositories, network policies, permissions policies, etc. for various software systems. Using the various context aggregators 124, the system design agent can gather data about the principal's software systems. The data for each of the software systems may be different depending on the principal's permissions. For example, for software system A, the system design agent may obtain network and permissions policies, while for software system B, the system design agent may also obtain source code. Using the context aggregators 124, the system design agent can gather data about software systems 1 through M.

The system design agent next attempts to answer the questions about the task using the obtained data. At operation 1018, the system design agent prompts the LLM 1099 to evaluate a question J given the obtained context about a system K. At operation 1020, the system design agent receives the LLM's answer. As indicated, the system design agent can loop through each of the questions J=1 . . . . N and each of the software systems K=1 . . . . M, building a set of answers to each question in the set of questions obtained at operations 1006, 1012.

Various approaches can be used to infer answers to the questions received at operations 1006, 1012 based on the answers received at operation(s) 1020. Some approaches can rely on consensus, such as when there are multiple other software systems that have been evaluated. Under a consensus based approach, at operation 1022, the system design agent prompts the LLM 1099 to indicate whether a consensus to the answers for a given question across the various software systems K. At operation 1024, the system design agent receives the response from the LLM. As indicated, the system design agent can determine whether consensus exists for each of the J questions. If consensus does not exist for a given question, the system design agent can treat the question as unanswered. As another example of a consensus based approach, the LLM 1099 can be prompted some number of times (for example 3, 5, or more) to generate a response and a similarity analysis can be performed to determine whether the responses generally agree with one another. For example, the LLM 1099 can be asked to identify whether the responses agree or whether there are any significant differences (e.g., architectural differences, different programming languages for generated code, different actions in an action list, and the like) between the responses. If the former, this is a signal that the LLM has enough information to generate a suitable output. If the latter, the topics on which differences occur can be treated as unanswered questions, and the LLM 1099 may be asked to generate a clarifying question to the user based on identified differences. In yet other examples of a consensus based approach, some number of LLMs (for example 3, 5, or more) can be independently prompted to generate responses and a similarity analysis can be performed to determine whether the responses generally agree with one another, such as described above.

At operation 1026, the system design agent prompts the client with the unanswered questions (e.g., those questions which have negative consensus). At operation 1028, the system design agent receives a response (e.g., an answer) from the client 1001. Again, the system design agent can loop through each of the unanswered questions.

Other approaches can rely on confidence scores to identify unanswered questions, such as when a single software system was evaluated. For example, the system design agent can request a confidence score in a prompt such as prompt 1018. If the confidence score satisfies a threshold, the system design agent can treat the question as answered (e.g., on a scale from 1 to 10 where 1 is not confident and 10 is extremely confident, with a threshold of greater than 6). Otherwise, the system design agent can treat the question as unanswered.

In some examples, the system design agent can send a summary of the inferred answers to the client, prompting the client to override any of the answers. The system design agent can send any response from the client along with the summary of the inferred answers to the LLM, prompting the LLM to update the summary based on the client response.

With answers to the set of questions obtained at operations 1006, 1012—whether based on inferences from obtained data about software systems or by prompting the client—the system design agent can proceed with providing a response to the prompt received at operation 1002.

At operation 1030, the system design agent can perform a reset operation to clear any context, state, or session data from the previous interactions between the SDS 110 and the LLM 1099 (e.g., to clear any memory maintained by the prompt and response engineering system 113, to reset a session with the LLM 1099). Such a reset operation can be used to refocus the session (e.g., to avoid circumstances where the LLM has been prompted with an indication of available data sources that are not included in the summary, to avoid the LLM revisiting tangents, etc.).

At operation 1032, the system design agent sends a prompt including the task prompt (from operation 1002) and the stored questions and answers (whether inferred obtained data about software systems or solicited from the client) the prompt requesting the LLM to generate a proposed solution (or multiple proposed solutions). At operation 1034, the system design agent receives the response. At operation 1036, the system design agent sends the proposed solution(s) to the client 1001, which can be part of a prompt that includes a solicitation of additional questions about the proposed solution(s).

In some examples, the system design agent can store the questions and responses as preferences in user preferences 218. When user preferences are stored, the system design agent can first use an LLM to evaluate whether any of the questions received from the LLM are already answered in the stored preferences (e.g., prior to operation 1018). If any questions are stored as preferences, the system design agent can omit those questions from subsequent operations and include them in the prompt at operation 1032.

Prompts sent at operations 1004, 1010, 1018, 1022, and/or 1032, can be based on prompt templates in templates 212. Responses sent at operations 1026 and/or 1036 can be based on response templates in templates 212.

Validation agent operations can be performed on responses 1006, 1012, 1020, 1024, and/or 1034 (note that the response definitions in the preceding prompts are not always expressly identified in the figures). Sanitization agent operations can be performed on inputs 1002, 1006, 1012, 1020, 1024, 1028, and/or 1034.

Figure 12:
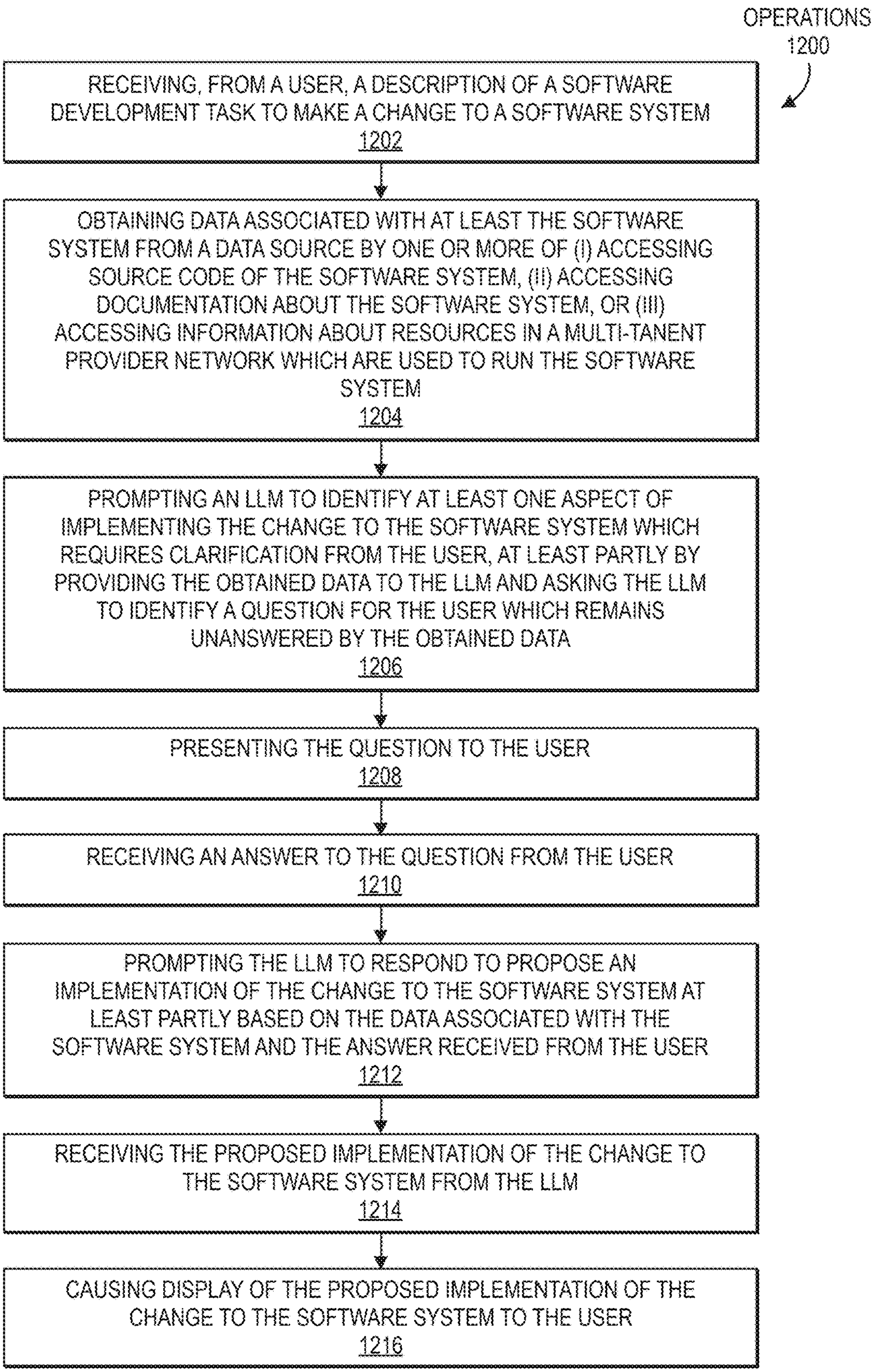
FIG. 12 is a flow diagram illustrating operations of a method for generating solutions to a software development task according to some examples.

FIG. 12 is a flow diagram illustrating operations of a method for generating solutions to a software development task according to some examples. Some or all of the operations 1200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1200 are performed by the SDS 110 of the other figures.

The operations 1200 include, at block 1202, receiving, from a user, a description of a software development task to make a change to a software system. The operations 1200 further include, at block 1204, obtaining data associated with the software system from a data source by one or more of (i) accessing source code of the software system, (ii) accessing documentation about the software system, or (iii) accessing information about resources in a multi-tenant provider network which are used to run the software system. As described above, the SDS can obtain the application source code, for example because the user has indicated where its source repository is and provides access to the SDS, and also access documentation about the application and/or the cloud provider resources it runs on (ex: compute instances, block storage, databases, etc.). For example, a user can assign an identity and access management role to the SDS in their account, so that the SDS can use the permission scope of the user to access such data associated with their software system. As another example of data associated with a software system, as described herein the SDS can query APIs of other cloud services on which the application runs to obtain information about the number, state, and configuration of the application resources, for example, using the role assigned to it in the user's account. A user can also provide a dictionary of their technical and business terms to the SDS as well as acronyms with definitions (referred to herein as a "business jargon dictionary"). With such information loaded, the SDS can use a combination of static analysis and artificial intelligence to understand a codebase and the relationships between components, as well as the relationships between network-connected services on which the application runs. For example, the SDS can extract the purpose or intent of an application from source code comments and documentation, and then present its understanding in natural language to the developer (who may of course edit the description to more closely match the application's intent). The intent is used as context in augmented prompts along with the architecture description.

The operations 1200 further include, at block 1206, prompting an LLM to identify at least one aspect of implementing the change to the software system which requires clarification from the user, at least partly by providing the obtained data to the LLM and asking the LLM to identify a question for the user which remains unanswered by the obtained data. The operations 1200 further include, at block 1208, presenting the question to the user. The operations 1200 further include, at block 1210, receiving an answer to the question from the user. The operations 1200 further include, at block 1212, prompting the LLM to respond to propose an implementation of the change to the software system at least partly based on the data associated with the software system and the answer received from the user. The operations 1200 further include, at block 1214, receiving the proposed implementation of the change to the software system from the LLM. The operations 1200 further include, at block 1216, causing display of the proposed implementation of the change to the software system to the user.

Figure 13:
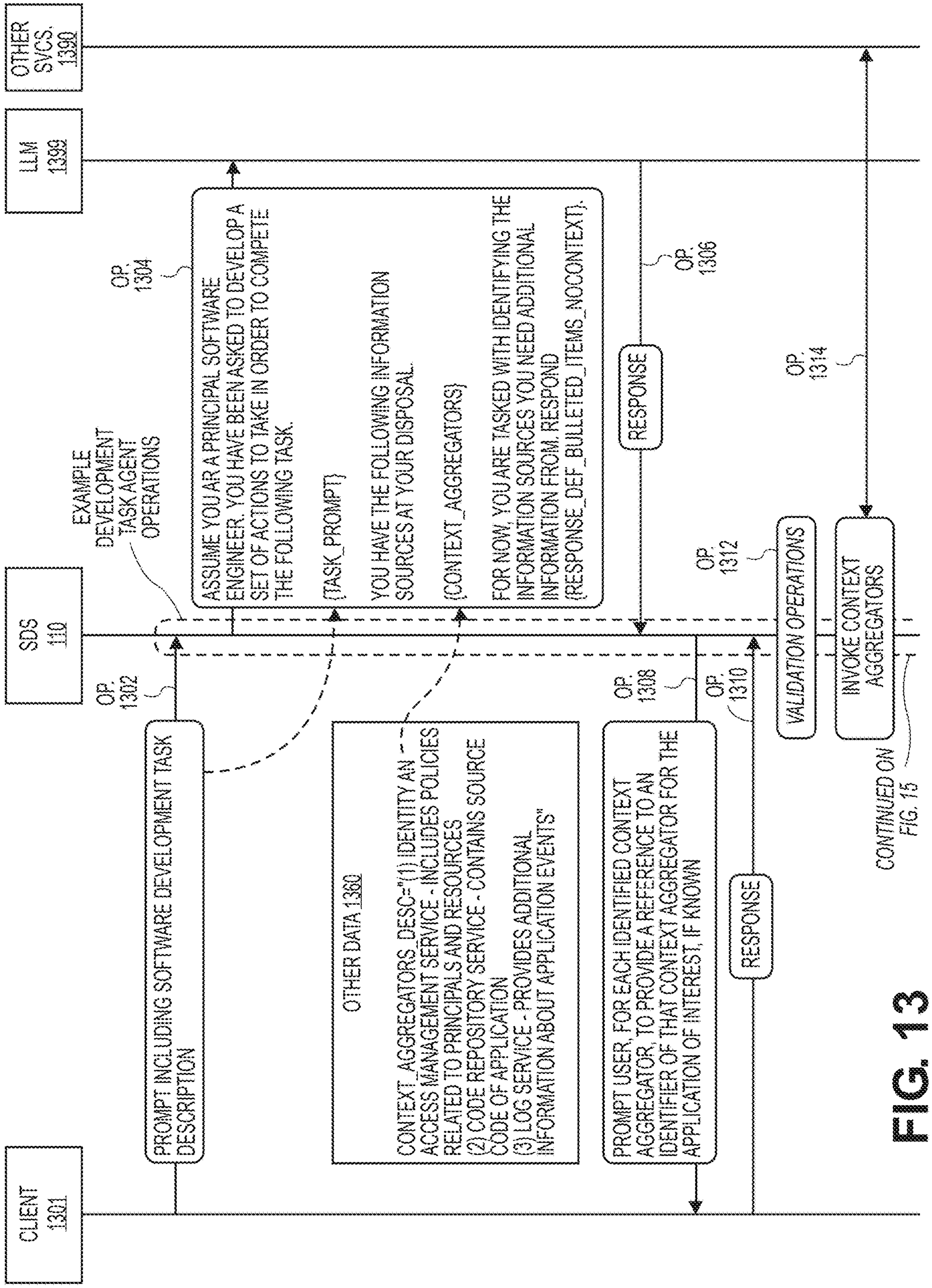
FIGS. 13 through 15 depict example operations of a development task agent according to some examples.
Figure 14:
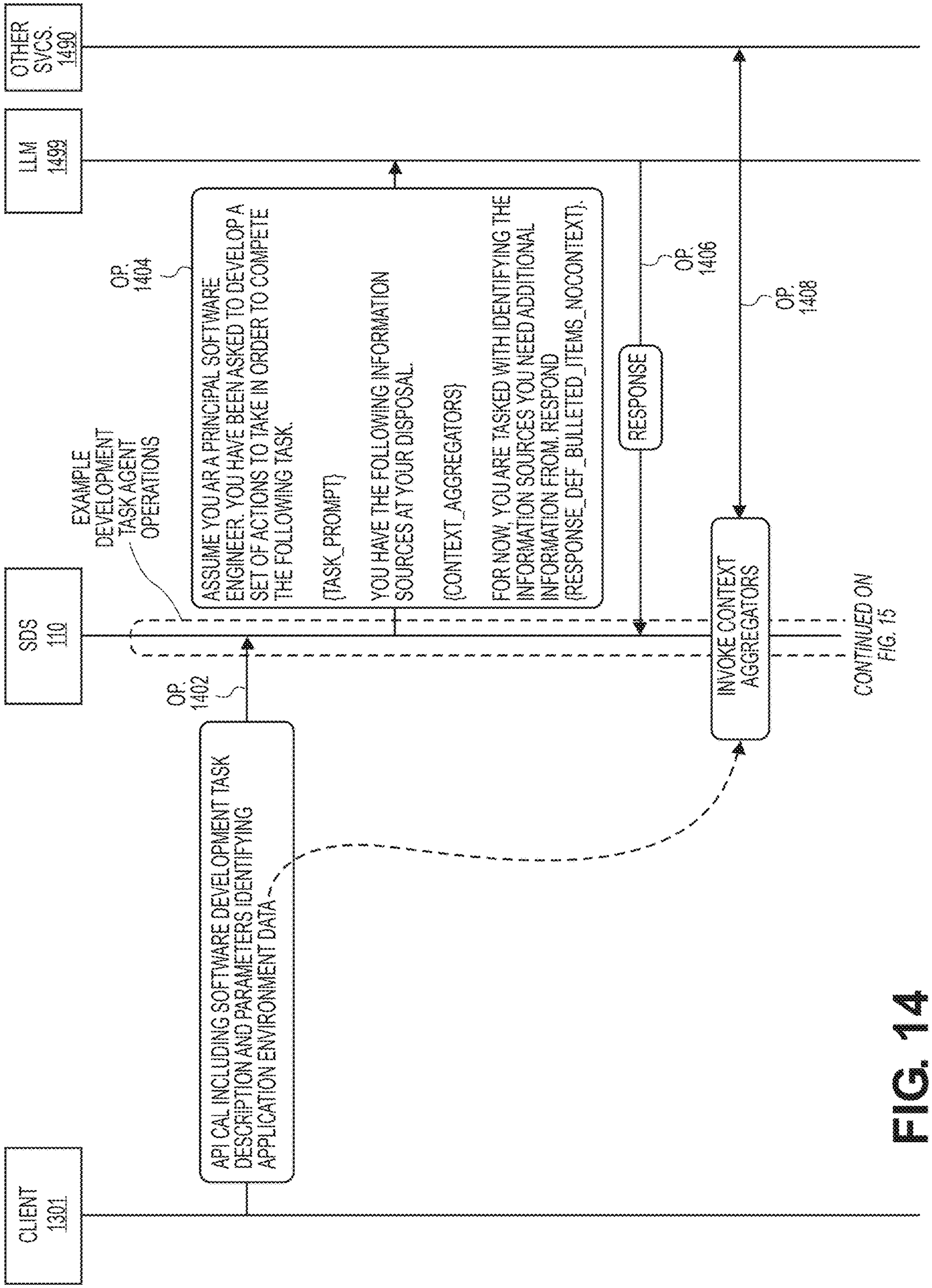
Figure 15:
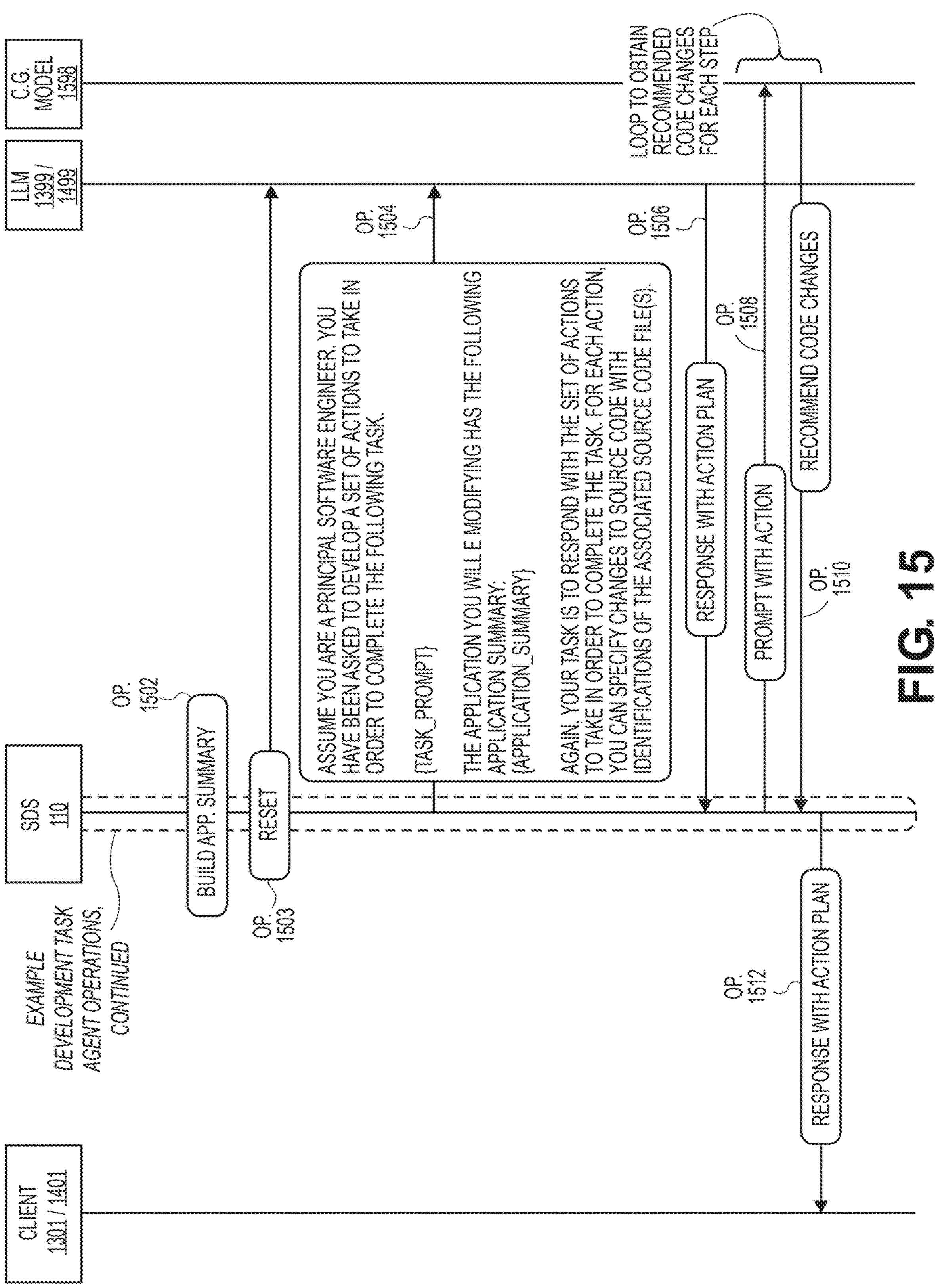

FIGS. 13 through 15 depict example operations of a development task agent according to some examples. A development task agent can break down a task prompt into a series of steps. Exemplary task prompts include change requests describing a feature addition, removal, bug fix, etc. The development task agent forms prompts that provide context regarding the task to the LLM. In some cases, that prompt may include information identified as useful or desirable by the LLM itself.

FIG. 13 depicts example operations when the development task agent is invoked without additional application context (e.g., without an identification of a particular software system to be modified). Such may be the case when a task prompt is provided via an API of a chat-based interface 106. At operation 1302, the development task agent receives a prompt from the client 1301 (by way of the orchestrator agent, for example), the prompt including a task prompt (typically in the form of a description or other indication of a desired change to a software program or system).

At operation 1304, the development task agent sends a prompt including the task prompt and available data sources to the LLM 1399, the prompt inquiring which if any additional context would aid the LLM in subdividing the task into a set of actions (also referred to as "an action plan"). In some examples, the context may be provided as a set of available data sources or context aggregators defined in other service data 1360 (e.g., as part of service data 115). At operation 1306, the development task agent receives a response from the LLM 1399, the response including an identification of the various additional information sources or context aggregators.

At operation 1308, the development task agent relays the contents of the response from the LLM 1399 to the client 1301, prompting the client to provide references to the identified sources, if known. At operation 1310, the development task agent receives a response from the client 1301. The response can include an identification of resources with various data sources, such as identifiers associated with a code repository, application environment, logs, etc. that can be used to obtain application specific context from other services 1390 (e.g., services 190, 192, 194 of FIG. 1).

At operation 1312, the development task agent performs various validation operations based on the response received at operation 1310. Given the freeform nature of the response, such operations may be tailored beyond what was described above with reference to the validation agent. For example, certain information in the received response may include self-identifying information or be of a format matching the parameters of an API for a given context aggregator. For example, a link to a code repository having a format identifying the code repository (e.g., github.com/project-name), which correlates with the code repository context aggregator. As another example, a provided reference may be of a certain file or resource type uniquely associated with a particular context aggregator. The development task agent can send a prompt to an LLM requesting that the responses be matched to the API(s) of the context aggregators in the form of API calls. The development task agent can try to invoke context aggregators with those LLM-provided calls, iteratively prompting the LLM to refine a call if the call failed.

At operation 1314, the development task agent invokes the context aggregators to gather data associated with the software system. Context aggregators gather information from data sources such as from other services 1390 (e.g., services 190, 192, 194 of FIG. 1).

FIG. 14 depicts example operations when the development task agent is invoked with an identification of application context (e.g., with an identification of a particular software system to be modified). Such may be the case when a task prompt is provided via an API call from a software application that includes various contextual identifications with the call. At operation 1402, the development task agent receives a request from the client 1401, the request including a task prompt (typically in the form of a description or other indication of a desired change to a software program or system). Accompanying the request may be one or more parameters identifying data sources (e.g., code repositories and the like).

At operation 1404, the development task agent sends a prompt including the task prompt and available data sources to the LLM 1499, the prompt inquiring which if any additional context would aid the LLM in subdividing the task into a set of actions (also referred to as "an action plan"). In some examples, the development task agent may modify the available data sources from a full set (e.g., as defined in other data 1360, not shown) to only those that were identified in the request received at operation 1402.

At operation 1406, the development task agent receives a response from the LLM 1499, the response including an identification of the various additional information sources or context aggregators. At operation 1408, the development task agent invokes the context aggregators to gather data associated with the software system. Again, context aggregators gather information from data sources such as from other services 1490 (e.g., services 190, 192, 194 of FIG. 1).

FIG. 15 depicts example operations once additional application context has been gathered. Continuing the example operations from either FIG. 13 or FIG. 14, at operation 1502, the development task agent generates an application summary. In some examples, a context aggregator invoked by the development task agent generates the application summary, the summary including an annotation or other description of the various context that has been gathered along with the context itself. An exemplary application summary can include source code files, API descriptions of public APIs, operating environment variables, other documentation excerpts scraped from source code comments, etc. Another exemplary application summary can be the application architecture map such as described above.

At operation 1503, the development task agent can perform a reset operation to clear any context, state, or session data from the previous interactions between the SDS 110 and the LLM 1399/1499, such as described elsewhere herein.

At operation 1504, the development task agent sends a prompt including the task prompt and the application summary to the LLM (be it the LLM 1399 or 1499), the prompt requesting that the LLM subdivide the task into a set of actions (also referred to as "an action plan"). At operation 1506, the development task agent receives a response from the LLM, the response including an action plan.

At operation 1508, the development agent can send a prompt including an action or step from the action plan to a code generation model 1598 (e.g., another generative AI model 197), the prompt including a request to generate code for the indication action or step and, optionally, context for the application (e.g., the application summary). At operation 1510, the development agent can receive the recommended code change(s). As indicated, the development agent can prompt the code generation model 1598 for recommended code changes for each action in the action plan. The development agent can store the recommended code change(s) associated with each action in the action plan.

In some examples, the development agent can obtain code diffs from another service of the provider network, providing the original source code and the recommended code change(s).

At operation 1512, the development task agent sends the action plan to the client (be it the client 1301 or 1401). The development agent can include within the action plan, for each action, the recommended code change(s), if any, obtained from the code generation model 1598.

Prompts sent at operations 1304, 1404, 1504, and/or 1508 can be based on prompt templates in templates 212. Responses sent at operations 1308 and/or 1512 can be based on response templates in templates 212.

Validation agent operations can be performed on responses 1306, 1406, and/or 1506 (note that the response definitions in the preceding prompts are not always expressly identified in the figures). Sanitization agent operations can be performed on inputs 1302, 1306, 1310, 1402, 1406, and/or 1506.

Figure 16:
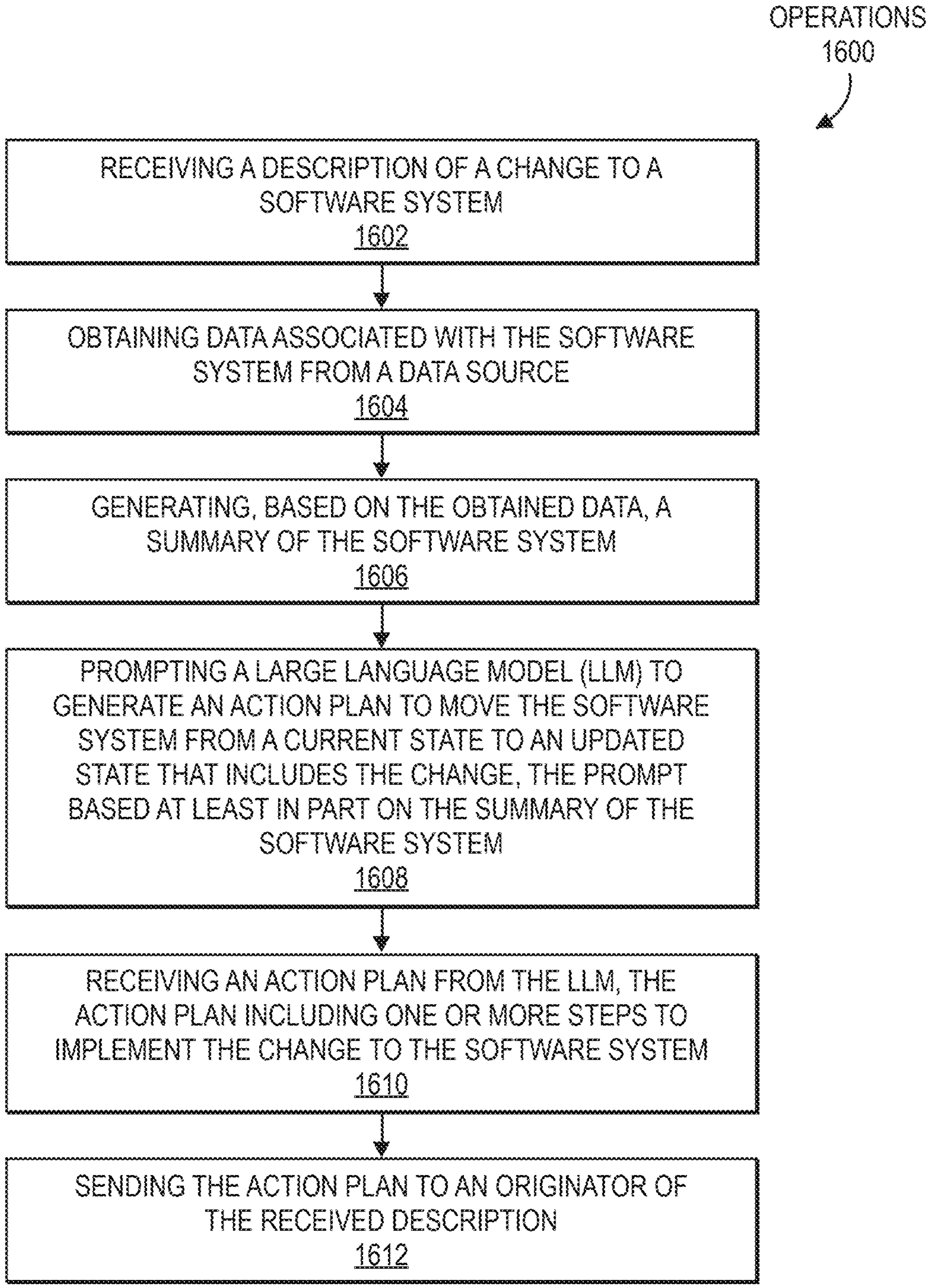
FIG. 16 is a flow diagram illustrating operations of a method for dividing a software development task into an action set according to some examples.

FIG. 16 is a flow diagram illustrating operations of a method 1600 for dividing a software development task into an action set according to some examples. Some or all of the operations 1600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1600 are performed by the SDS 110 of the other figures.

The operations 1600 include, at block 1602, receiving a description of a change to a software system. The operations 1600 further include, at block 1604, obtaining data associated with the software system from a data source (see for example the description of block 1208 for further details). The operations 1600 further include, at block 1606, generating, based on the obtained data, a summary of the software system. The operations 1600 further include, at block 1608, prompting a large language model (LLM) to generate an action plan to move the software system from a current state to an updated state that includes the change, the prompt based at least in part on the summary of the software system. The operations 1600 further include, at block 1610, receiving an action plan from the LLM, the action plan including one or more steps to implement the change to the software system.

The operations 1600 further include, at block 1612, sending the action plan to an originator of the received description. This step may further involve filtering or otherwise modifying the LLM output to be more suitable for presentation to the user. For example, the SDS can apply automated reasoning to prove its recommended changes meet the developer's intent, mathematically validating unambiguous actions such as identity and access management policy changes and smaller code changes before presenting them to the user. The action plan can include a step by step guide to accomplishing the developer's task, as well as any code and architectural changes that are needed for each step. Recommended actions that are provably correct can be identified as such in the source commit comments. These architectural changes can be visualized in a dynamic, interactive canvas as described herein. The developer can review the proposal and revise any provided code, as well as refine their requirements to loop back through steps 1608-1612. Such revisions and refinements can be used in reinforcement learning to improve the LLM's accuracy. For example, a developer could review the action plan and proposed changes and realize that they also require device authentication, and instruct the SDS to regenerate the action plan to include this. The SDS can be aware from its ingestion of cloud service information that a specific service supports mutual transport layer security ("TLS") authentication and would suggest enabling the feature and adding a certificate manager to the architecture. The SDS can also generate integration and end-to-end tests such as unit tests to verify the proposed changes.

Figure 17:
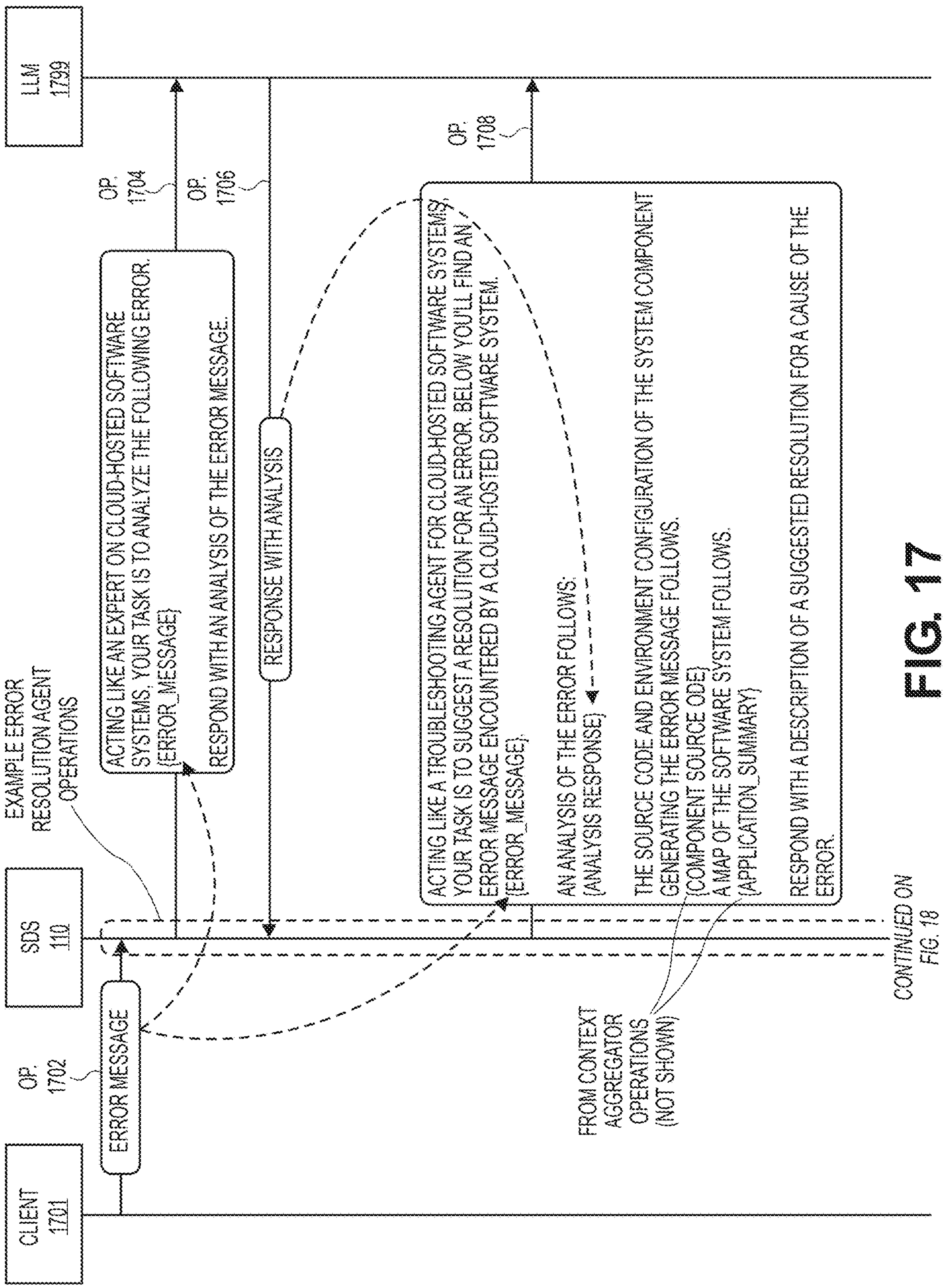
FIGS. 17 and 18 depict example operations of an error resolution agent according to some examples.
Figure 18:
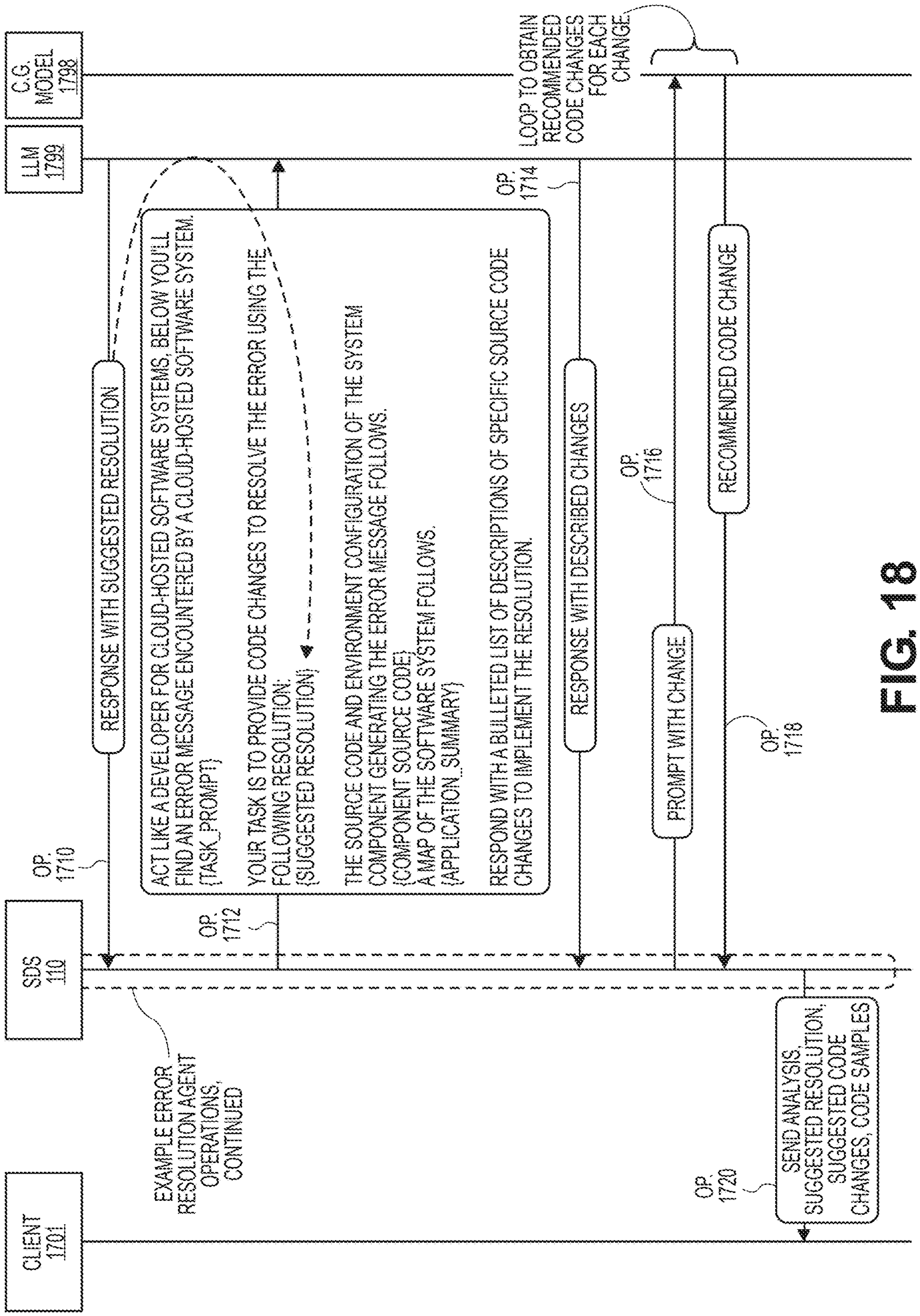

FIGS. 17 and 18 depict example operations of an error resolution agent according to some examples. An error resolution agent can leverage an LLM to analyze and suggest resolutions to errors generated by a software system.

At operation 1702, an error resolution agent receives a message including a description of an error message that can include the actual error generated by a software system. Although not illustrated, the message may be transmitted as a prompt or API call, similar to the task description received at operations 1302, 1402. The error resolution agent can also leverage context aggregators to gather data about the software system generating the error. For example, the error resolution agent can perform operations similar to those described above for the task development agent (e.g., operations 1304 through 1314 and operation 1402 or operations 1404 through 1408 and operation 1502; note the prompt templates can have adjusted language to indicate the task is error troubleshooting).

At operation 1704, the error resolution agent sends a prompt including the error message to the LLM 1799, the prompt requesting that the LLM generate an analysis of the error. At operation 1706, the error resolution agent receives a response from the LLM, the response including an error analysis.

At operation 1708, the error resolution agent sends a prompt including the error message and the analysis received at operation 1706 to the LLM 1799, the prompt requesting a suggested resolution to the error. The prompt can further include various software system data such as a system map and source code of the software system as generated or obtained by context agents.

Continuing to FIG. 18, at operation 1710, the error resolution agent receives a response from the LLM, the response including a description of a suggested resolution.

At operation 1712, the error resolution agent sends a prompt including the error message, the analysis received at operation 1706, and the suggested resolution received at operation 1710 to the LLM 1799, the prompt requesting descriptions of one or more source code changes to resolve the error. This prompt can be considered an "implementation" prompt to implement a change to correct a cause of the error message. Again, the prompt can further include various software system data such as a system map and source code of the software system as generated or obtained by context agents.

At operation 1714, the error resolution agent receives a response including the descriptions of source code changes.

At operation 1716, the error resolution agent can send a prompt including a change to a code generation model 1798 (e.g., another generative AI model 197), the prompt including a request to generate code for the indication action or step and, optionally, context for the application (e.g., the application summary). At operation 1718, the development agent can receive the recommended code change(s). As indicated, the development agent can prompt the code generation model 1798 for a recommended code change for each suggested change. The error resolution agent can store the recommended code change(s).

In some examples, the error resolution agent can leverage the LLM 1799 to generate the source code changes. In some examples, the error resolution agent can phrase the implementation prompt to provide the source code changes in addition to or instead of the descriptions of the changes.

At operation 1720, the error resolution agent sends a response to the client 1701. The response can include a summary of the error, the error analysis from operation 1706, the suggested resolution from operation 1710, and descriptions of each change and associated code changes (from operations 1714, 1718).

In some examples, upon receiving the response from the LLM at operation 1710, the error resolution agent can invoke a development task agent, leveraging the analysis and suggested resolution as a task prompt.

Prompts sent at operations 1704, 1708, 1712, and/or 1716 can be based on prompt templates in templates 212. The response sent at operation 1720 can be based on a response template in templates 212.

Validation agent operations can be performed on responses 1706, 1710, and/or 1714 (note that the response definitions in the preceding prompts are not always expressly identified in the figures). Sanitization agent operations can be performed on inputs 1702, 1706, 1710, and/or 1714.

Figure 19:
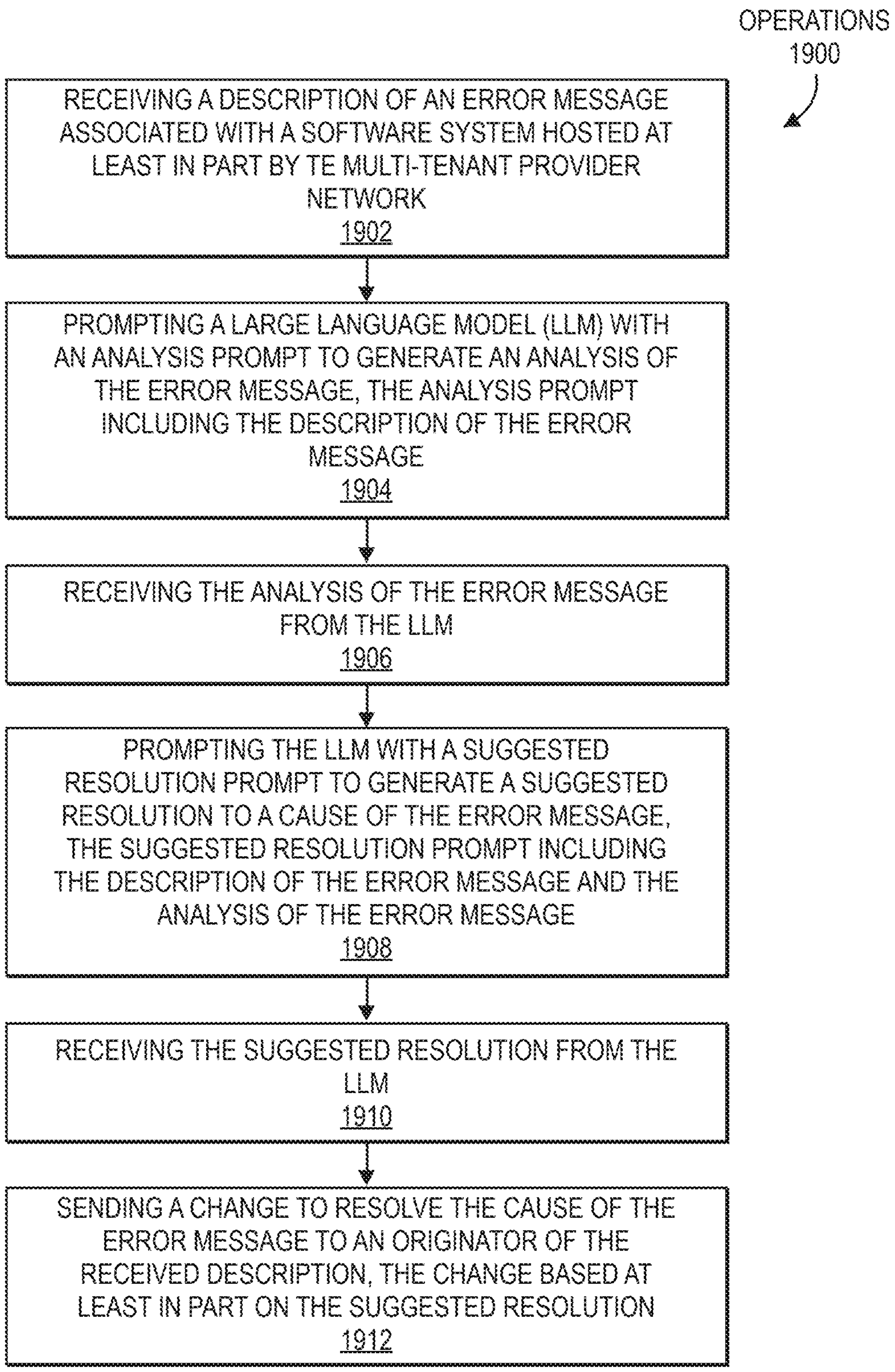
FIG. 19 is a flow diagram illustrating operations of a method for generating suggested resolutions to an error according to some examples.

FIG. 19 is a flow diagram illustrating operations of a method 1900 for generating suggested resolutions to an error according to some examples. Some or all of the operations 1900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1900 are performed by the SDS 110 of the other figures.

The operations 1900 include, at block 1902, receiving a description of an error message associated with a software system hosted at least in part by the multi-tenant provider network. In some scenarios this can be received from a user who has discovered the error and engages the SDS for resolution. For example, a developer may discover an error in their application metric logs. In some scenarios, the user may receive notification of the discovered error from another service or program, and can press a user interface button or otherwise select an option to resolve the error, which can trigger the SDS on the backend to generate the resolution on behalf of the user. Although not illustrated, in some scenarios a developer may first engage with the SDS with a request to generate a test that replicates the error. The SDS gathers the error information and the application context to generate a test that triggers the same bug or vulnerability. The code for the test can be sent as a pull request to the source management system, and the developer can collaborate with the SDS via code review comments in the pull request to refine the generated code. Once the pull request is merged, the developer can move over to an integrated development environment ("IDE") to quickly execute the new test, then pick up the conversation with the software development engineer ("SDE") in the IDE to generate the code required to resolve the bug. In other implementations, rather than provide the error resolution back to the developer, the SDS may self-debug and resolve the error without involvement of the developer and, for example, provide the resultant error-free code back to the developer.

It will be appreciated that such conversations in a source management system/IDE and other feedback on generated content described herein can be used via reinforcement learning to improve the SDS's accuracy. The SDS can look for "implied" acceptance or rejection from users, for example by mixing point-and-click visual interfaces in the SDS's answer, making it easier for users to take an action while unambiguously confirming the correct answers. For example, a user clicking the "apply" for one-click resolutions is a good indication that the SDS's proposed solution is correct.

The operations 1900 further include, at block 1904, prompting a large language model (LLM) with an analysis prompt to generate an analysis of the error message, the analysis prompt including the description of the error message. Block 1904 can also include augmenting the prompt to the LLM with context about the application and/or systems on which it runs, as described for example with respect to block 1908. The operations 1900 further include, at block 1906, receiving the analysis of the error message from the LLM. The operations 1900 further include, at block 1908, prompting the LLM with a suggested resolution prompt to generate a suggested resolution to a cause of the error message, the suggested resolution prompt including the description of the error message and the analysis of the error message. The operations 1900 further include, at block 1910, receiving the suggested resolution from the LLM. The operations 1900 further include, at block 1912, sending a change to resolve the cause of the error message to an originator of the received description, the change based at least in part on the suggested resolution.

In some implementations, additional guidance or information may be determined and included in the LLM prompt to improve the accuracy of the LLM in generating suggested error solutions and/or to enable validation of suggested error solutions returned by the LLM. Such implementations may be particularly beneficial when modernizing code, transforming code from one programming language to another, etc. However, the disclosed implementations are equally applicable to determining error solutions for any code or code development. For example, the disclosed implementations may be used to determine potential error solutions for code during initial code development, code modification, etc.

Figure 20:
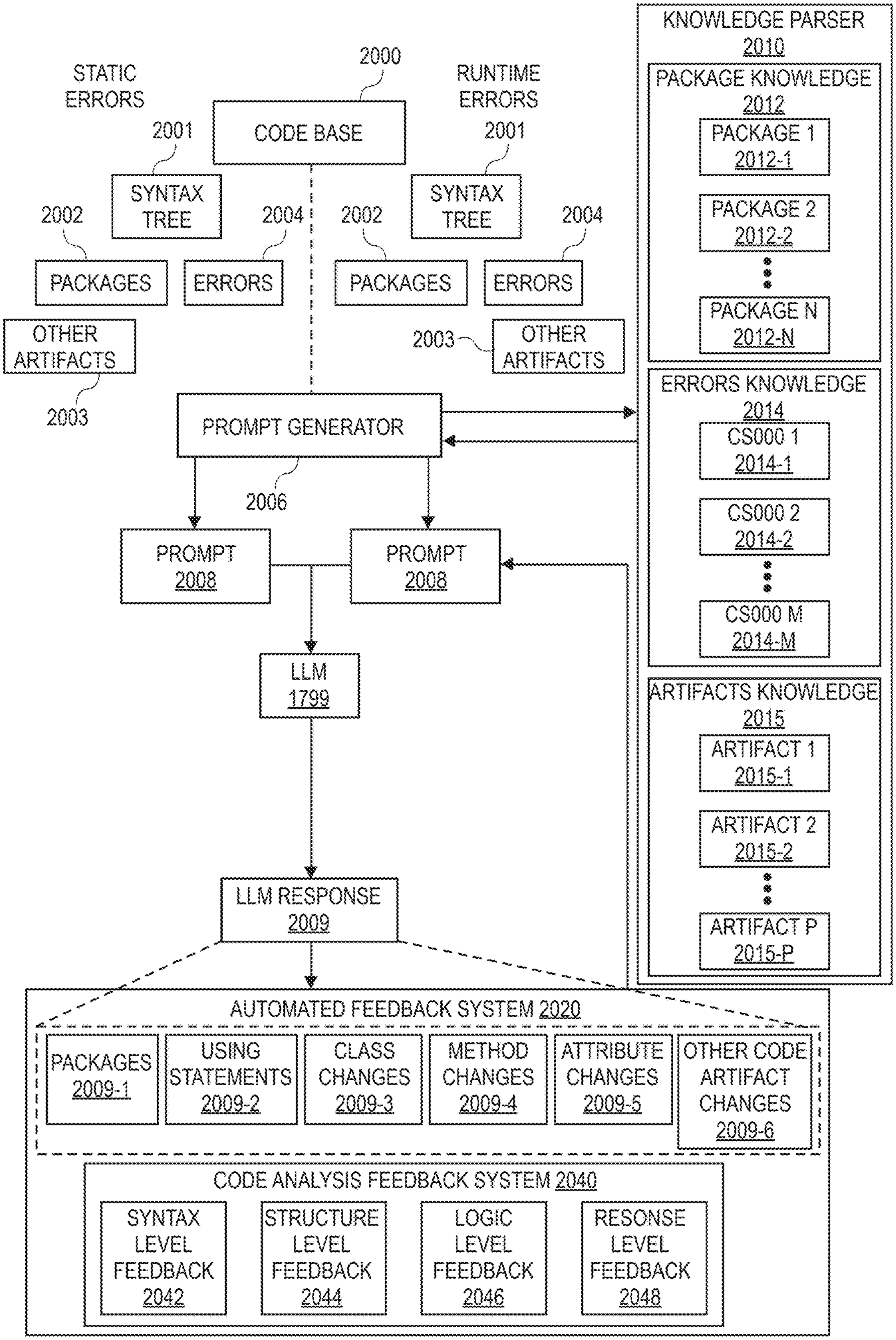
FIG. 20 is an example block diagram of an environment that generates automated error solutions, in accordance with disclosed implementations.

FIG. 20 is an example block diagram of an environment that generates automated suggested operation solutions, in accordance with disclosed implementations. As discussed herein, the disclosed implementations may be utilized to perform any of a variety of operations with respect to a code base, a snippet of code, a segment of code, code file, etc. For example, operations may include, but are not limited to, error resolution operation, a package replacement operation, a refactoring operation, a transformation operation, etc. One or more of the components discussed with respect to FIG. 20 may be included or part of the SDS discussed herein. In other implementations, some or all of the components discussed with respect to FIG. 20 may be separate and/or independent of the SDS and called or otherwise accessed by the SDS.

Upon receipt of a code base 2000, the code base may be divided up into syntax trees 2001 (code files) and a design time build operation may be performed on the code files to generate a list of all the symbols, packages, APIs, errors, and/or other artifacts inside the code files. As is known, the difference between a design time build and an actual build is that the code file doesn't need to be error free for the design time build to work. Likewise, in some implementations, errors or potential errors may be also or alternatively be detected during runtime and resolved with the disclosed implementations.

Upon generation of a design time build, a list of build errors 2004, packages 2002, APIs, and/or other code artifacts may be generated from the design time build. The list of errors, packages, APIs, and/or other code artifacts may then be processed to determine those that are relevant to the operation being performed (e.g., porting, modernization, transformation, error resolution, refactoring, package replacement). For example, in a porting operation, the relevant APIs/packages would be APIs/packages that are incompatible with the target hardware, operating system, programming language, etc., to which the code is being ported. As another example, in a general refactoring operation, the list of relevant build errors would be the ones related to syntax errors, references missing, etc. Accordingly, in some implementations, such as porting operation of code from a local environment to a cloud computing environment, may include identifying APIs, packages, and/or other code artifacts that function in the local environment but, when modernized to a cloud computing environment, will result in errors. In such an implementation, while an actual error is not current on the design time build, it may be determined that an error will result. Accordingly, an "error," as used herein, includes actual errors in the code or errors that are known or expected to result based on an operation being performed on the code. The disclosed implementations are designed to generate code that is error free, whether that be resolving errors currently existing in the code, updating segments of code that are known or expected to result in errors during an operation (e.g., modernization, porting, transformation), or resolving errors that occur during a runtime of the code.

Once an error, whether current or known/expected to occur, is identified, the relevant error, APIs/packages, and/or other artifacts related to the error are sent to a knowledge parser 2010 as a query to retrieve package knowledge, such as package 1 knowledge 2012-1, package 2 knowledge 2012-2, through package N knowledge 2012-N that corresponds to the determined relevant packages/APIs, error knowledge 2014, such as errors CS000 1 knowledge 2014-1, CS000 2 knowledge 2014-2, through CS000 M knowledge 2014-M that correspond to the determined error, and/or artifact knowledge 2015, such as artifact 1 2015-1, artifact 2 2015-2, through artifact P 2015-P. Queries to the knowledge parser for packages, errors, APIs, and/or other artifacts may be sent individually in parallel or serially or may be sent as a single query.

As discussed further herein, obtaining package knowledge, error knowledge, and/or other artifact knowledge from the knowledge parser relating to errors, packages/APIs, and/or other artifacts relevant to the performance of an operation is different from traditional systems. Other systems may utilize similarity scores, for example, by comparing packages and/or errors to other packages and/or errors to determine those that are most similar. In accordance with the disclosed implementations, querying of the knowledge parser may include comparing a code snippet, such as a code snippet corresponding to a package, to another code snippet to determine knowledge that is specific to that code snippet and not just determined to be similar. For example, the knowledge parser may include package knowledge and/or error knowledge generated from a prior processing (e.g., modernization, refactoring, transformation) of the same package, code, etc.

Utilizing the information from the knowledge parser 2010 that is specific to the relevant packages/APIs, errors, and/or other artifacts of the code, one or more LLM prompts 2008 may be generated by a prompt generator 2006. In some implementations, each prompt may be specific to an error determined in the code and/or specific to another operation to be performed with respect to the code/code file. In other implementations, an LLM prompt 2008 may include information for multiple errors and/or operations determined for the code.

With the disclosed implementations, rather than just providing an LLM prompt that requests that the LLM provide a solution, the LLM prompt may be specifically structured and the LLM may be instructed to provide a response according to a specific format or structure. For example, an LLM prompt 2008 may be divided into different sections, such as a static section, a dynamic section, and a constraint section. The static section may provide guidance/context to the LLM along with instructions as to how the response from the LLM is to be structured. For example, the static section may specify a role for the LLM, such as "You are an expert software programmer and you are doing refactoring . . . " As another example, the static section may state "You are an expert software programmer and you are debugging code that is being transformed from .net to Linux," etc. As discussed below, the instructions for responding to the LLM prompt may include specific sections for which information is to be provided and the structure of that information. As discussed, the information included in one or more of the defined sections of an LLM response may explain how to complete the task or operation set forth in the LLM prompt that was sent to the LLM. In some implementations, the specific sections may include a packages section, a using statements section, a class level changes section, a method level changes section, an attributes changes section, and an other code artifact changes section. In other implementations, the specific sections may include additional, fewer, and/or different sections than those discussed herein.

The dynamic section of the LLM prompt 2008 may be dynamically populated with the code or code snippet corresponding to the task or operation that is to be performed by the LLM, such as an error resolution operation, refactoring operation, etc., along with knowledge corresponding to the error, refactoring, etc., that is obtained from the knowledge parser 2010. The dynamic section may also include both the code file and any packages, etc., related to that code file. The constraint section of the LLM prompt may include one or more constraints that the LLM must follow when determining a response to the LLM prompt 2008.

As discussed further below, in accordance with the disclosed implementations, the LLM prompt 2008 may instruct the LLM 1799 to indicate changes to each of the specified sections set forth in the static section of the LLM prompt 2008 that are suggested by the LLM to perform the task or operation specified in the LLM prompt 2008. For example, when generating a suggested operation solution for an error resolution operation, the LLM may be instructed to indicate the changes to be made to each section (packages section, using statements section, class level changes section, method level changes section, attribute changes section, other code artifact changes section) as part of the suggested operation solution. In response, the LLM may indicate a change to be made to code that may correspond to the method section (e.g., adding and/or removing a method), a change to code that may correspond to the package section (e.g., adding and/or removing a package), etc.

The LLM 1799, in response to receiving an LLM prompt 2008, generates an LLM response 2009, also referred to herein as a suggested operation solution (also referred to herein as a suggested error solution) structured as instructed by the LLM prompt 2008 to include each of the specified sections. As illustrated, in this example, the LLM response 2009 includes a packages section 2009-1, using statements section 2009-2, class level changes section 2009-3, method level changes section 2009-4, attribute level changes section 2009-5, and an other code artifact changes section 2009-6. As will be appreciated, the specified sections are examples and in other implementations additional, fewer, and/or different sections may be specified. For example, property changes are included as part of the class level changes 2009-3 in the discussed example. In other implementations, an additional section specific to property level changes may be specified in the LLM prompt 2008 for inclusion in an LLM response 2009.

Because the LLM response 2009 is structured in sections, as specified in the LLM prompt 2008, the automated feedback system 2020 may automatically process and attempt to validate each section of the LLM response 2009. For example, the syntax level feedback component 2042 and the structure level feedback component 2044 may process each of the sections 2009-1 through 2009-6 to verify that the syntax and structure in each section of the LLM response 2009 is valid. For example, if there is a method level change 2009-4, the syntax level feedback component 2042 and the structure level feedback component 2044 may process the information included by the LLM 1799 in the method level changes section 2009-4 of the LLM response 2009 that explains how to complete the task to validate that the information includes opening and closing phrases, parameters, and a specific format. As another example, if the LLM prompt 2008 includes the task of providing a suggestion for refactoring the code and a method change is expected, the logic level feedback component 2046 may verify that the returned method is appropriate for the refactoring. For example, the logic level feedback may determine that a method added in the LLM response 2009 (in the method level change section 2009-4) already exists. As such, the code analysis feedback system 2040 may include that in an updated LLM prompt with instructions that the LLM 1799 needs to select a different method. As still another example, the response level feedback component 2048 may apply the suggested error solution provided by the LLM (the LLM response) to determine if the suggested error solution actually resolves the errors, whether the modified code has additional errors, etc. For example, if the response level feedback component 2048 determines that additional errors are created and/or if the suggested error resolution does not actually resolve the errors, the code analysis feedback system 2040 may provide an updated response to the LLM 1799 with instructions that the suggested error solution did not resolve the error(s), created additional errors, etc. Additionally, in some implementations, the response level feedback component 2048 may also verify that the response is not objectionable (e.g., does not include profanity), is not copyrighted material, is properly attributed, etc.

As discussed further below, if all of the sections 2009-1 through 2009-6 are not validated by each of the feedback components 2042-2048 of the automated feedback system 2020, an updated LLM prompt may be generated that describes any of the issues determined by the respective validation components. That updated LLM prompt may be provided back to the LLM with instructions to resolve the issues and provide an updated LLM response. Validation and updating may be done in an iterative manner until all sections of the LLM response are validated. Once validated, the LLM response may be applied to the code and/or provided to other systems as recommendations for error solutions to the error(s) in the code.

As illustrated, the disclosed implementations, provide a technical improvement to the functioning of computing systems by enabling specific section validation of an LLM response and detecting instances in which an LLM response is inaccurate, hallucinating, does not resolve the request, etc.

Figure 21A:
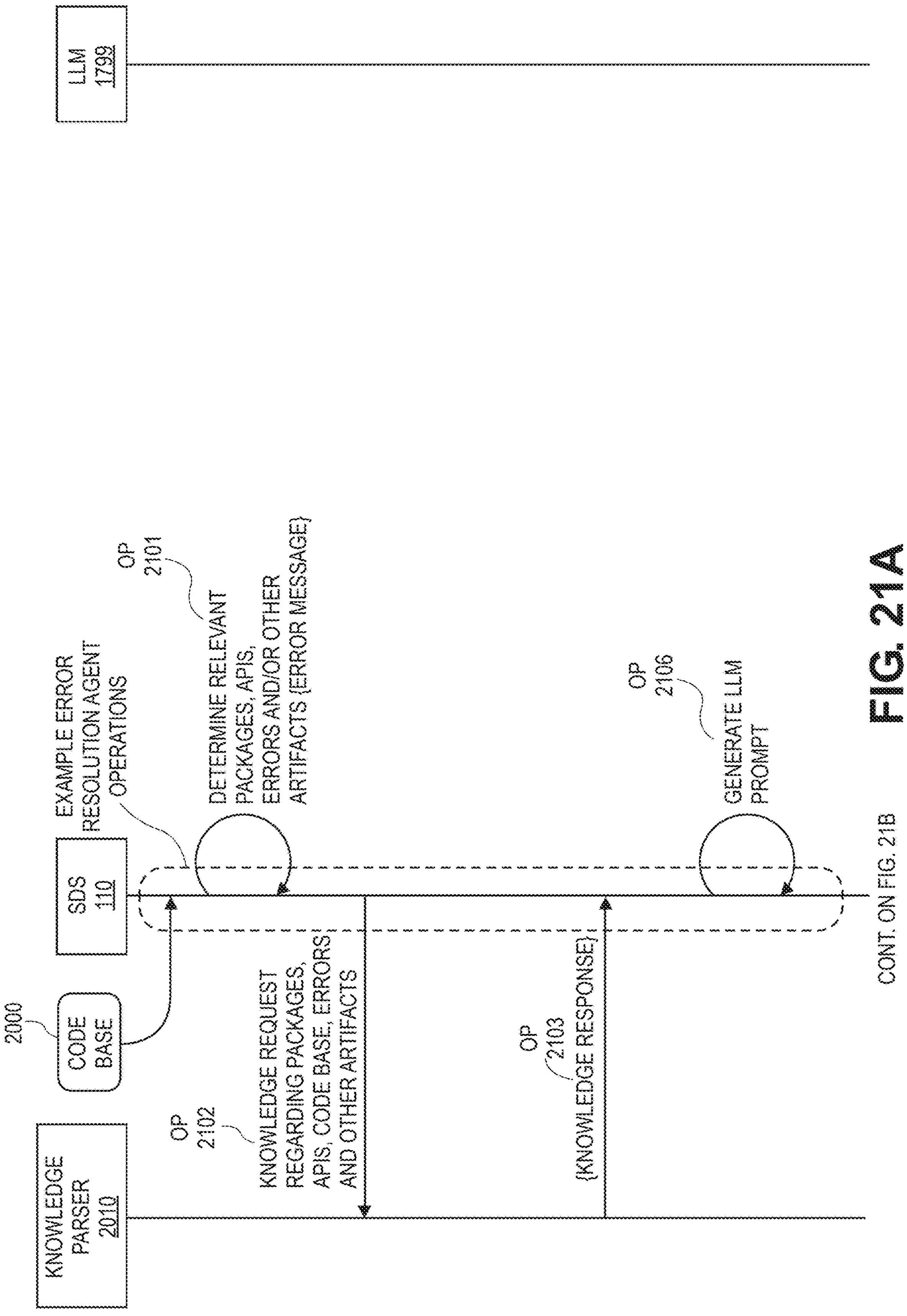
FIGS. 21A through 21C depict example operations of an error resolution agent, in accordance with disclosed implementations.
Figure 21B:
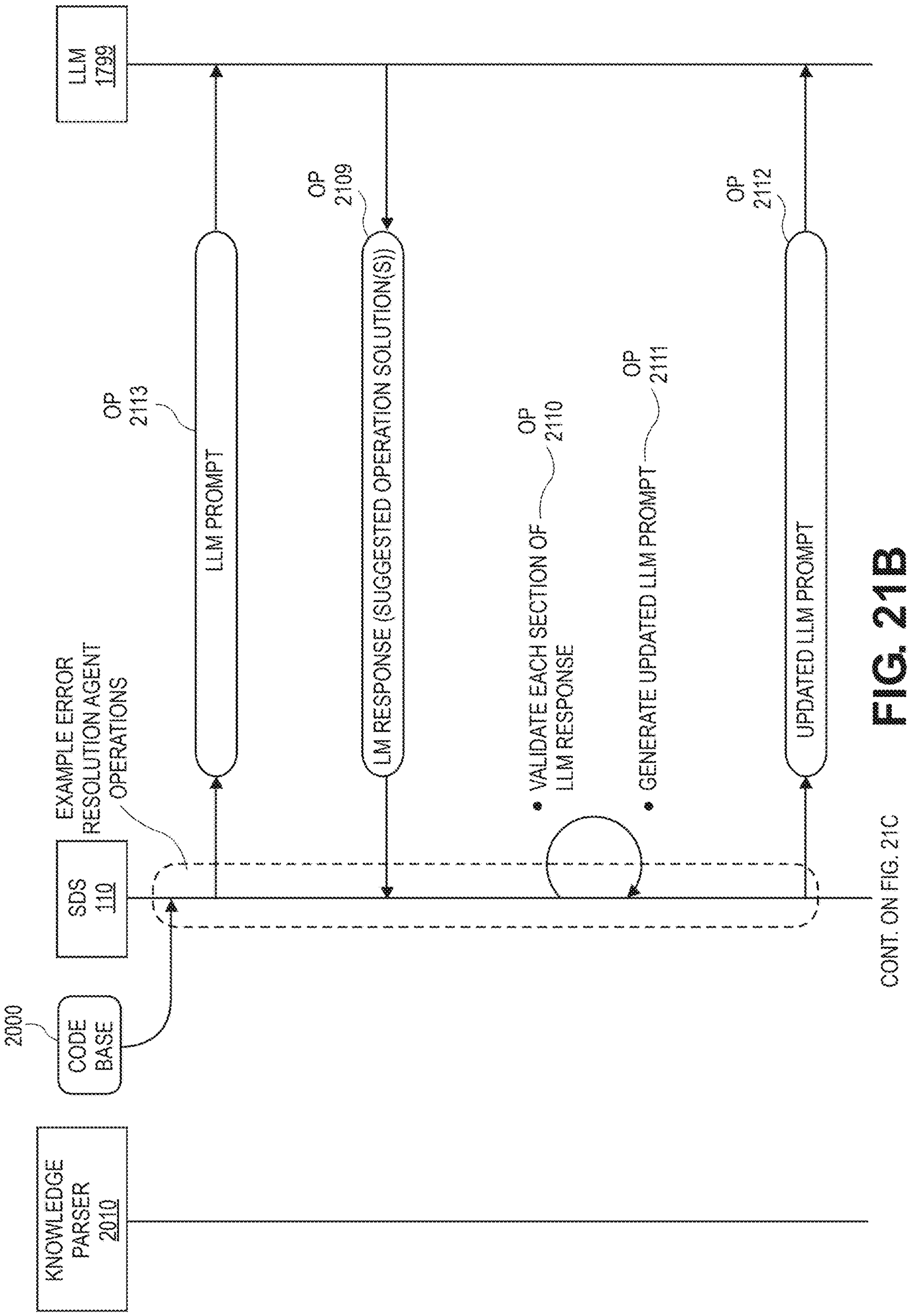
Figure 21C:
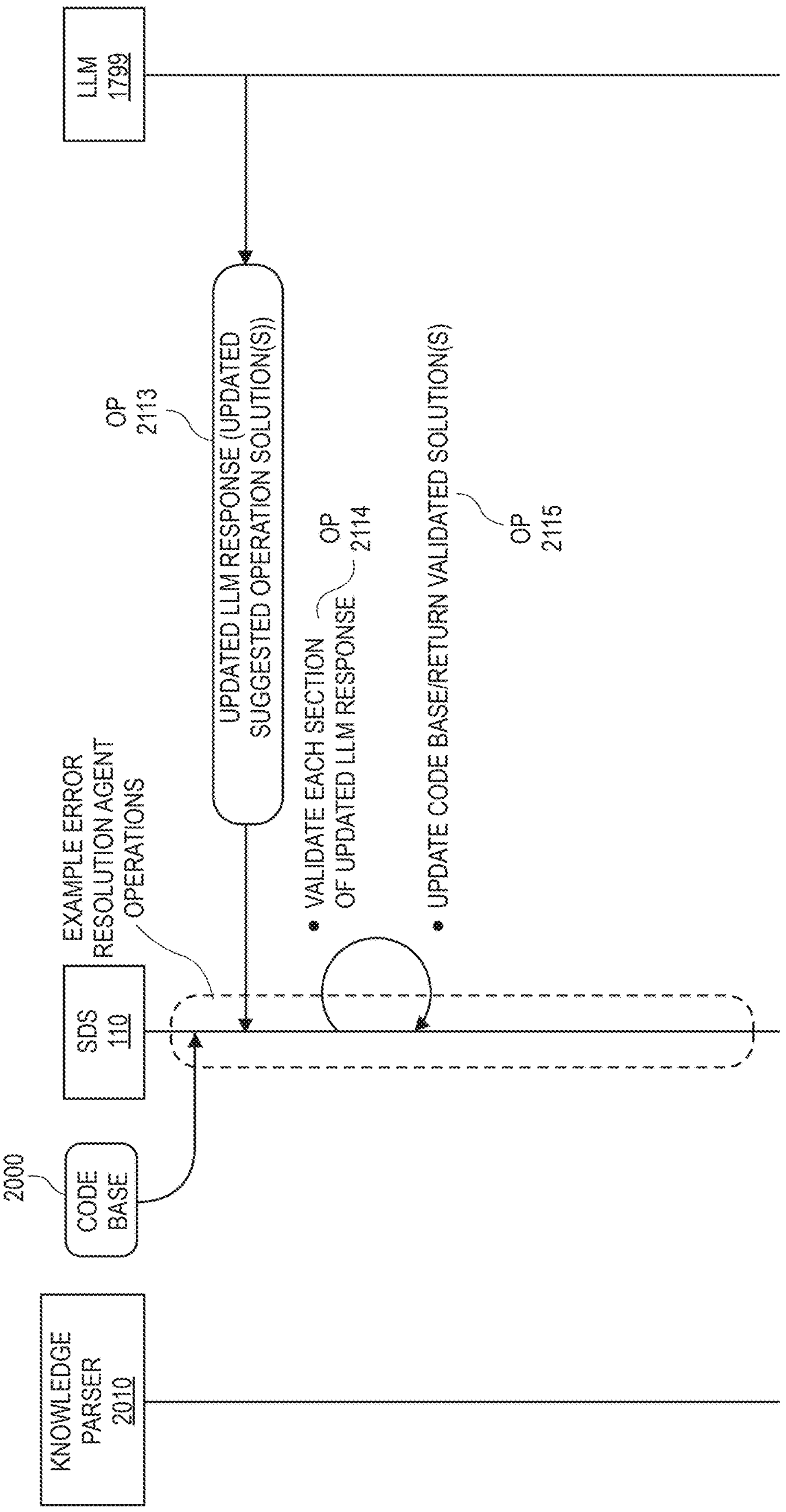

FIGS. 21A through 21C depict example operations of an error resolution agent, in accordance with disclosed implementations. FIGS. 21D and 21G illustrate example sections of an LLM prompt that may be generated as part of the example operations of the error resolution agent discussed with respect to FIGS. 21A through 21C, in accordance with disclosed implementations. The example operations discussed with respect to FIGS. 21A through 21G correspond to the system discussed with respect to FIG. 20 and is an illustration of an example exchange between an error resolution agent and an LLM as part of an automated error resolution process.

Turning first to FIG. 21A, upon receipt by the SDS 110 of a code base 2000, code file, or other form of software code that is to be processed by the error resolution agent, a first operation 2101 is performed with respect to the code to determine relevant packages, APIs, errors, and/or other artifacts in the code. For determined packages/APIs, errors, and/or other artifacts a knowledge request operation 2102 is sent to the knowledge parser 2010. As discussed above, the disclosed implementations may determine segments of the code, code files, packages, APIs, artifacts, etc., and determine knowledge that is specific to those segments that has been stored by the SDS 110 based on knowledge learned from prior processing of the code, packages, etc. For example, if a code segment is being transformed from one programming language to another programming language and the original code segment includes or references a first API or first package, the knowledge parser may have knowledge as to the API or package that is to be used to replace that first API or first package as part of the transformation. This knowledge may be based on, for example, a prior transformation of the same or different code that included or referenced that first package. In response to the knowledge request, the knowledge parser 2010 provides package knowledge to the SDS 110 as part of operation 2103. In some implementations, multiple requests or queries may be sent to the knowledge parser 2010 in parallel or serially. For example, a first request relating to an error may be sent to the knowledge parser, a second request relating to one or more packages may also be sent to the knowledge parser, a third request relating to other artifacts may also be sent to the knowledge parser, etc. In other implementations, each of the queries for knowledge (e.g., error, package, API, artifacts, etc.) may be sent as a single request to the knowledge parser.

Utilizing the packages, APIs, errors, other artifacts, error messages, and/or knowledge returned from the knowledge parser, the error resolution agent of the SDS 110 may generate an LLM prompt as part of operation 2106. As discussed herein, the LLM prompt may include three sections-static section, dynamic section, and constraint section. In some implementations, the constraint section may be optional. Referring first to FIGS. 21D, 21E, and 21F, illustrated are portions of a static section 2170-1 and a constraint section 2170-2 of an LLM prompt 2170 generated by the error resolution agent.

As illustrated, the static section may be static and used for each LLM prompt that is generated by the error resolution agent. Generally, the static section may be considered a static portion of a template that is utilized by the error resolution agent to generate an LLM prompt. In some implementations, one template with the same static section may be used to generate all LLM prompts. In other examples, there may be multiple templates any one of which may be selected by the error resolution agent depending on the request or task/operation being sent to the LLM. For example, a first template may be defined for error resolution, a second template for refactoring, a third template for transformation, etc. In such examples, the role and/or tasks may be different in some or all of the templates and/or the examples provided for each of the portions 2173-1-2173-6 may be different. However, in some examples, each template may include instructions that the LLM is to respond in a manner that includes each of the first portions 2173-1 through 2173-6 so that the LLM response can be consistently processed and validated.

In the illustrated example, the static section 2170-1 of the LLM prompt 2170 includes a role 2171, a task 2172, and defined sections 2173-1, 2173-2, 2173-3, 2173-4, 2173-5, 2173-6 that are to be conformed to and completed by the LLM when responding to the LLM prompt. The role 2171 portion of the static section may be used to provide context to the LLM that is relevant to the LLM prompt. In the illustrated example, the role 2171 portion may state, for example, "You are an expert programmer debugging a .NET software program." As will be appreciated, the role portion may include additional, less, and/or different contextual or background information to provide role relevant information to the LLM. The task 2172 portion of the static section may be used to provide the task to be performed by the LLM and how the LLM is to respond to the LLM prompt 2170. In the illustrated example, the task 2172 portion includes the following instructions:

You are given the file and an error message from that file.

You are also given the line number in the file where the error exists.

You are also given the package reference used in the project where the file exists.

Your task is to help fix the error using the below explanation:

Following the task 2172 portion, each of the six sections 2173-1 through 2173-6, along with examples for each are listed. As illustrated, the six sections include a packages section 2173-1 that is specified to include information of the LLM response that corresponds to any changes related to adding or removing of a package from the source code, a using statements section 2173-2 specified to include information of the LLM response that corresponds to any changes relating to adding new statements to the source code, a class level changes section 2173-3 specified to include information of the LLM response that correspond to any class level changes that are outside a method change, a method level changes section 2173-4 specified to include information of the LLM response that corresponds to any changes inside a method of the source code, an attribute changes section 2173-5 specified to include information of the LLM response that corresponds to any attribute changes of the source code, and an artifact changes section 2173-6 specified to include information of the LLM response that corresponds to any other artifact changes of the source code. Each of those six defined sections 2173-1-2173-6 may include guidance to the LLM as to how to respond to that section along with example responses that are appropriate for the respective structured section.

The constraints section 2170-2 may list any number of constraints that must be followed by the LLM when determining a response to the LLM prompt. Any number of constraints may be specified in the constraints section. Example constraints include, but are not limited to "Do not remove unused code;" "If you have a list of previous fixes attempted, do not send the same fix again;" "Do not merge multiple methods together;" etc.

Referring to FIG. 21G, which is a continuation of the LLM prompt 2170, the dynamic section 2170-3 is dynamically populated with the relevant code, errors, APIs, packages, other artifacts, etc., that the error resolution agent determines are specific to the task to be performed by the LLM when responding to the LLM prompt.

Turning now to FIG. 21B, upon generation of the LLM prompt at operation 2106, the error resolution agent/SDS 110 sends the LLM prompt, such as the LLM prompt 2170, to the LLM 1799 as part of operation 2113. The LLM, upon receipt of the LLM prompt processes the LLM prompt and the information and instructions included in each of the sections of the LLM prompt and determines a response that completes the task(s) instructed in the LLM prompt. An LLM response that conforms to the defined sections 2173-1-2173-6 that explains the determined response is then generated and sent from the LLM to the error resolution agent/SDS 110 as part of operation 2109 as an LLM response, also referred to herein as a suggested operation solution(s).

The error resolution agent/SDS 110, upon receipt of the LLM response, and as part of operation 2110, may validate each section of the LLM response received from the LLM. For example, and as discussed above with respect to FIG. 20, each of a syntax level feedback component, structure level feedback component, logic level feedback component, and/or response level feedback component of a code analysis feedback system 2040 of the SDS may process the LLM response/suggested operation solution in an effort to validate the information provided in each of the defined sections 2173-1-2173-6. In the example illustrated in FIG. 21B, it is determined that one or more of the defined sections 2173-1-2173-6 cannot be validated. Accordingly, at operation 2111, the error resolution component/SDS 110 generates an updated LLM prompt that may again include the static section 2170-1, constraint section 2170-2, and dynamic section 2170-3. However, in the updated LLM prompt, the dynamic section may include, in addition to or as an alternative to the content originally included in the dynamic section, feedback generated by one or more components 2042-2048 of the code analysis feedback system, thereby providing specific guidance to the LLM as to what the LLM needs to do in an effort to fix the one or more aspects of the LLM response that were not validated. In some implementations, the dynamic section of the updated LLM prompt may also include the LLM response previously provided by the LLM. In other implementations, the LLM may maintain context and maintain the prior LLM response internally for use with the updated LLM prompt. The generated updated LLM prompt may then be sent as part of operation 2112 from the error resolution component/SDS 110 to the LLM 1799.

Turning finally to FIG. 21C, the LLM 1799, upon receipt of the updated LLM prompt, processes the updated LLM prompt and the information and instructions included in each of the sections of the updated LLM prompt and determines a response that completes and corrects the task(s) instructed in the updated LLM prompt. An updated LLM response that conforms to the defined sections 2173-1-2173-6 that explains the determined response and how the prior response is corrected is then generated and sent from the LLM to the error resolution agent/SDS 110 as part of operation 2113 as an updated LLM response, also referred to herein as an updated suggested operation solution(s).

The error resolution agent/SDS 110, upon receipt of the updated LLM response, and as part of operation 2114, may again attempt to validate each section of the updated LLM response received from the LLM. This iteration of generating LLM prompts and LLM responses may be performed any number of times until all sections of the LLM response can be validated by the code analysis feedback system. In some implementations, there may be a limit to the number of iterations that are performed before it is determined that the error cannot be resolved. For example, in some implementations, the iterations between the error resolution agent and the LLM may be limited to five LLM prompts/LLM responses. In other implementations, the number of iterations may be higher or lower.

In the example illustrated in FIG. 21C all sections of the updated LLM response are validated as part of operation 2114. Once validated, the suggested error solution(s) may be automatically applied to the code to generate modified code as part of operation 2115. In other implementations, the suggested error solution(s) may be returned and/or provided to other components of the SDS 110, such as for use as part of a SA process (discussed further below).

Figure 22:
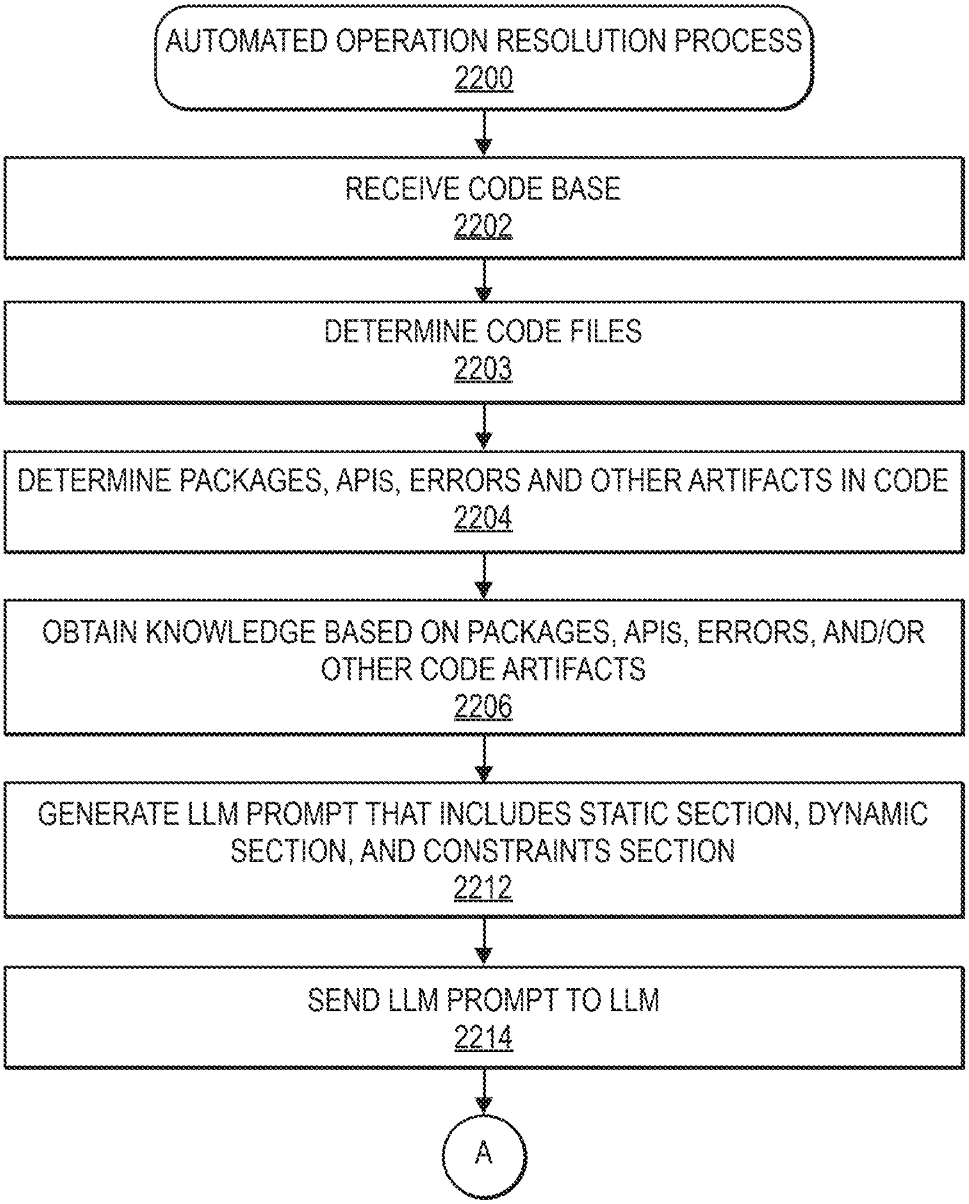
FIG. 22 is an example automated operation resolution process, in accordance with disclosed implementations.
Figure 22:
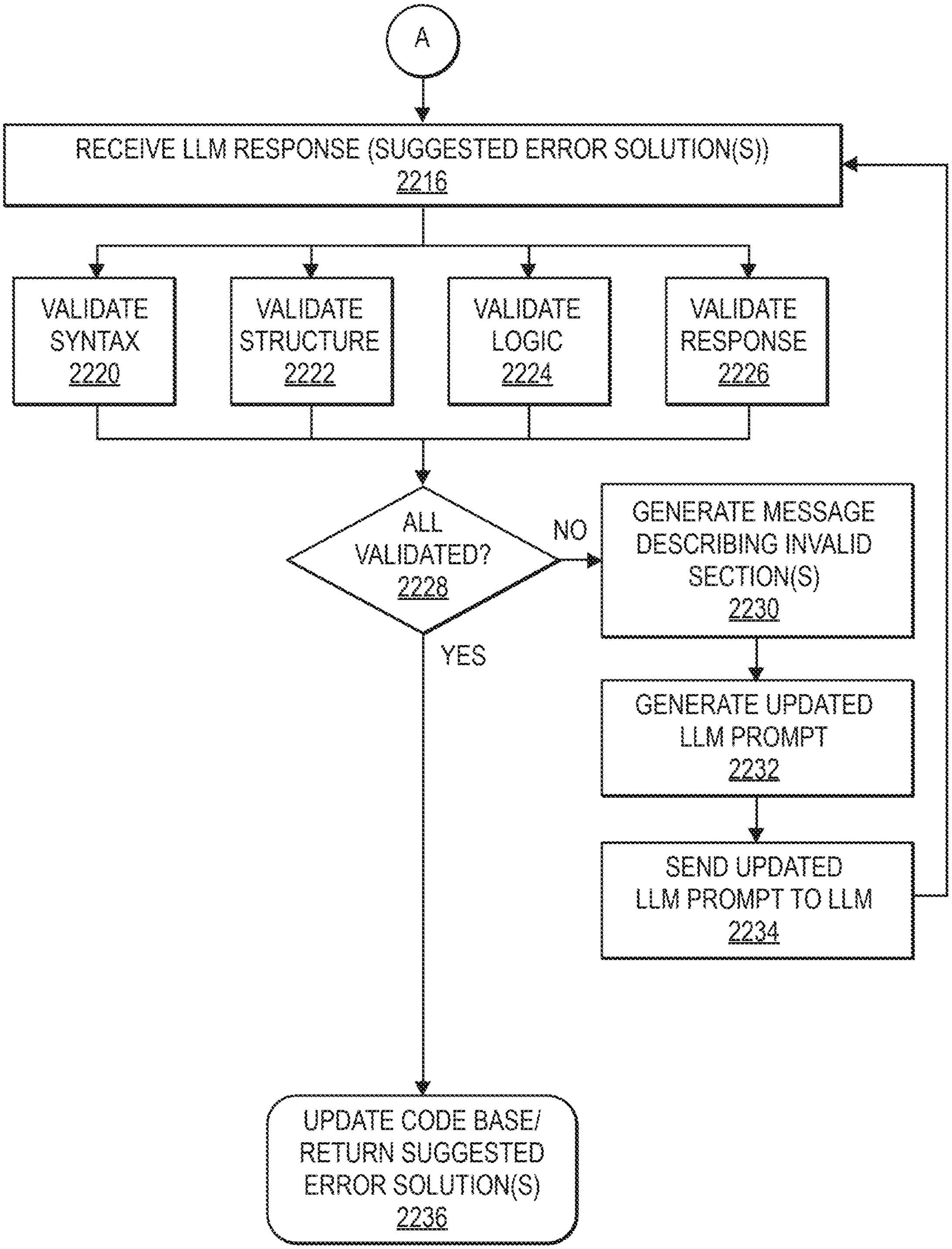

FIG. 22 is an example automated operation resolution process 2200, in accordance with disclosed implementations. The example process 2200 may be performed by the error resolution agent/SDS 110.

The example process 2200 begins upon receipt of a code base, as in 2202. While the example is discussed with respect receipt of a code base, the disclosed implementations are equally applicable to receipt and processing of a portion of a code base, code file, program file, sub-program, application, and/or any other form of software code for which error resolution is to be performed.

The code base may then be processed into syntax trees or code files, as in 2203, and one or more of those code files may be processed to determine packages, APIs, errors and/or other artifacts present in the code files, as in 2204. For example, a design time build operation may be performed on one or more of the code files to generate a list of all symbols and errors of the code file(s). In some implementations, the packages, APIs, and/or errors may be ranked based on, for example, a level of complexity in resolving, dependencies, etc., and further processed in accordance with example process 2200 based on the ranking.

For determined packages, APIs, errors, and/or other artifacts of the code base, the example process 2200 obtains package knowledge that is specific to the packages, APIs, errors, and/or other artifacts, as in 2206. As discussed above, the knowledge parser of the SDS may maintain knowledge regarding packages/APIs, errors, and/or other code artifacts that may be accumulated, for example, from prior processing (e.g., modernization, transformation, debugging, etc.) of other code files. As discussed above, the package knowledge, error knowledge, and/or other code artifact knowledge may be specific to the package/API, error, and/or other artifact and not just a closest similarity.

The example process 2200 may then generate an LLM prompt that includes a static section, dynamic section, and a constraints section (optionally), the LLM prompt specific to one or more of the errors or tasks that are to be performed with respect to the code file(s), as in 2212. As discussed, the LLM prompt may include a static section that includes a description of a role to be performed by the LLM (e.g., you are an expert software programmer), a task to be performed by the LLM, and a series of defined sections indicating how the LLM response is to be structured. For example, the defined sections may include a packages section, a using statements section, a class level changes section, a method level changes section, an attribute changes section, and an artifacts changes section. In other implementations, there may be fewer, additional, and/or different defined sections. The dynamic section of the LLM prompt may include information specific to the task, the code file, relevant packages and/or APIs, other code artifacts, package knowledge, the error message, error knowledge, and/or other information that may be useful to the LLM in completing the task specified in the LLM prompt. The constraints section of the LLM prompt, which may be optional, may specify one or more constraints that are to be followed by the LLM when determining and generating the LLM response to the LLM prompt. The LLM prompt and corresponding sections are discussed above in further detail with respect to FIGS. 20 through 21E.

Once generated, the LLM prompt may be sent to an LLM, as in 2214. After sending the LLM prompt to the LLM, the example process 2200 receives an LLM response that is responsive to the task indicated in the LLM prompt and structured according to the defined sections specified in the static portion of the LLM prompt, as in 2216.

Upon receipt of the LLM response, the example process 2200 may attempt to validate each section of the defined sections that are included in the LLM response. For example, the syntax of each section of the defined sections may be validated, as in 2220, and the structure of each of the defined sections may be validated, as in 2222. For example, if there is a method level change, the information included by the LLM in the method level changes sections of the LLM response may be processed to validate that the information includes opening and closing phrases, parameters, and a specific format. Likewise, the logic of each section of the defined sections included in the LLM response may be validated, as in 2224. For example, if the LLM prompt includes instructions to provide a suggestion for refactoring the code and a method change is expected, logic validation may be performed to verify that method is appropriate for the refactoring. The example process 2200 may also perform response validation of each defined section, as in 2226. For example, response validation may include application of the LLM response (suggested operation solution) provided by the LLM (the LLM response) to determine if the suggested error solution actually resolves the errors, whether the modified code has additional errors, etc. Likewise, the response validation may also verify that the content of the response is appropriate, does not include offensive language, does not include copyrighted material, is properly attributed, etc.

After syntax validation, structure validation, logic validation, and response validation, a determination may be made as to whether any validations of any of the defined sections failed (i.e., was not validated), as in 2228. If it is determined that one or more validations of the defined sections was not successfully completed, a message describing the invalid section(s) and the reason for the invalidation is generated, as in 2230, and an updated LLM prompt is generated, as in 2232. In some implementations, the updated LLM prompt may have the same three-part structure as the LLM prompt (static section, dynamic section, and constraints section). In such an implementation, the message describing the invalid section(s) may be included in the dynamic section as additional information for the LLM to consider when responding. The updated LLM response may also include the prior LLM response, the error, packages, etc. In other implementations, the LLM may maintain context with respect to the prior LLM prompt and LLM response. The updated LLM response is then sent back to the LLM, as in 2234, and the example process 2200 returns to block 2216 and awaits an updated LLM response from the LLM that is responsive to the updated LLM prompt.

If it is determined at decision block 2228 that all validations of all sections of the LLM response are valid, the example process 2200 may update the code base with the suggested operation solution(s) and/or may return the suggested operation solution(s) to other components of the SDS for further consideration and processing, as in 2236.

In some implementations, rather than providing suggested operation solutions to a user for implementation, the SDS may perform self-debugging of code and automatically, without user involvement, debug programming code to an error-free state. For example, as part of a code transformation from one language to another (e.g., .net to Linux, Java 8 to Java 17, etc.) compiling errors, build errors, etc., are common. Blindly trying different solutions, utilizing a greedy approach that solves the most prevalent errors first, etc., may lead to dead ends in which no error-free solution can be produced. For example, a segment of code, such as source code, may contain multiple errors. In some cases, the errors are independent of each other. However, in other cases, some of the errors may be inter-dependent. The complexity arises because fixing one error can lead to additional new errors, uncover other existing errors, and/or lead to a dead end because the fix is not the optimal path to reduce the overall number of errors in the code segment.

The following two examples illustrate the complexity of debugging source code with multiple errors that may be independent or inter-dependent. First, fixing one error could create additional new errors. This may be the right direction to get to an error-free final state or it may be the wrong direction that eventually leads to a dead-end solution in which there is no way to fix new errors, thereby preventing convergence to an error-free final state. Second, while fixing an error may not introduce new errors, it may result in a dead-end for other existing errors such that they cannot be resolved. In such a scenario, while the targeted error is resolved, it may lead to a sub-optimal solution because the solution blocks the path of other error resolutions such that there is no way to fix the other errors, thereby preventing convergence to an error-free final state.

Rather than requiring a user or agent to parse through the errors or generating suggested solutions, for example using an LLM without a more strategic plan, the disclosed implementations improve the functioning of a computing system by generating a debugging strategy that utilizes SA algorithm and SA temperature to progressively iterate through potential error solutions strategically and produce an error-free final state of the transformed code.

As discussed, the disclosed implementations balance between finding immediate fixes for errors and exploring more radical changes that could lead to increases in errors in the short term and finally an error-free final code in the long term. The SA algorithm and SA temperature allows for a high degree of exploration initially (accepting potential error solutions that may introduce additional errors) and then gradually becomes more restrictive in exploration (preferring potential error solutions that reduce errors) through SA temperature controlling. The disclosed implementations improve and enable self-debugging of code by the SDS by allowing the early exploration that might introduce new errors so that deeper problems in the code can be uncovered and resolved. As the SA temperature is decreased, for example with each iteration or each error resolution, the probability of accepting worsening changes decreases. As a result, the self-debugging process becomes more focused and less likely to introduce new errors as it converges on an error-free solution.

Simulated annealing ("SA") is metaphorically linked to the physical annealing process of heating and then slowly cooling a material, a process used to alter the material's properties, such as reducing hardness, increasing ductility, and removing internal stresses. The material is heated to a high temperate where the particles gain sufficient energy to move more freely, allowing the material's structure to reach a state of high entropy (disorder). This corresponding to the initialization phase utilized in the disclosed implementations, where the SDS starts with a high "temperature" parameter, allowing the SDS to explore potential error solutions widely, making it more likely to accept potential error solutions that result in higher costs (e.g., additional errors). After the material is heated, it is slowly cooled. As the temperature decreases, the particles have less energy and move less, gradually forming a more stable, low-energy structure. In the context of the disclosed implementations and the use of SA, this slow cooling is simulated by gradually reducing the SA temperature value in the SA algorithm. As the SA temperature value decreases, the SDS becomes less likely to accept potential error solutions that have a high cost (e.g., increase the number of errors in the code).

Figure 23A:
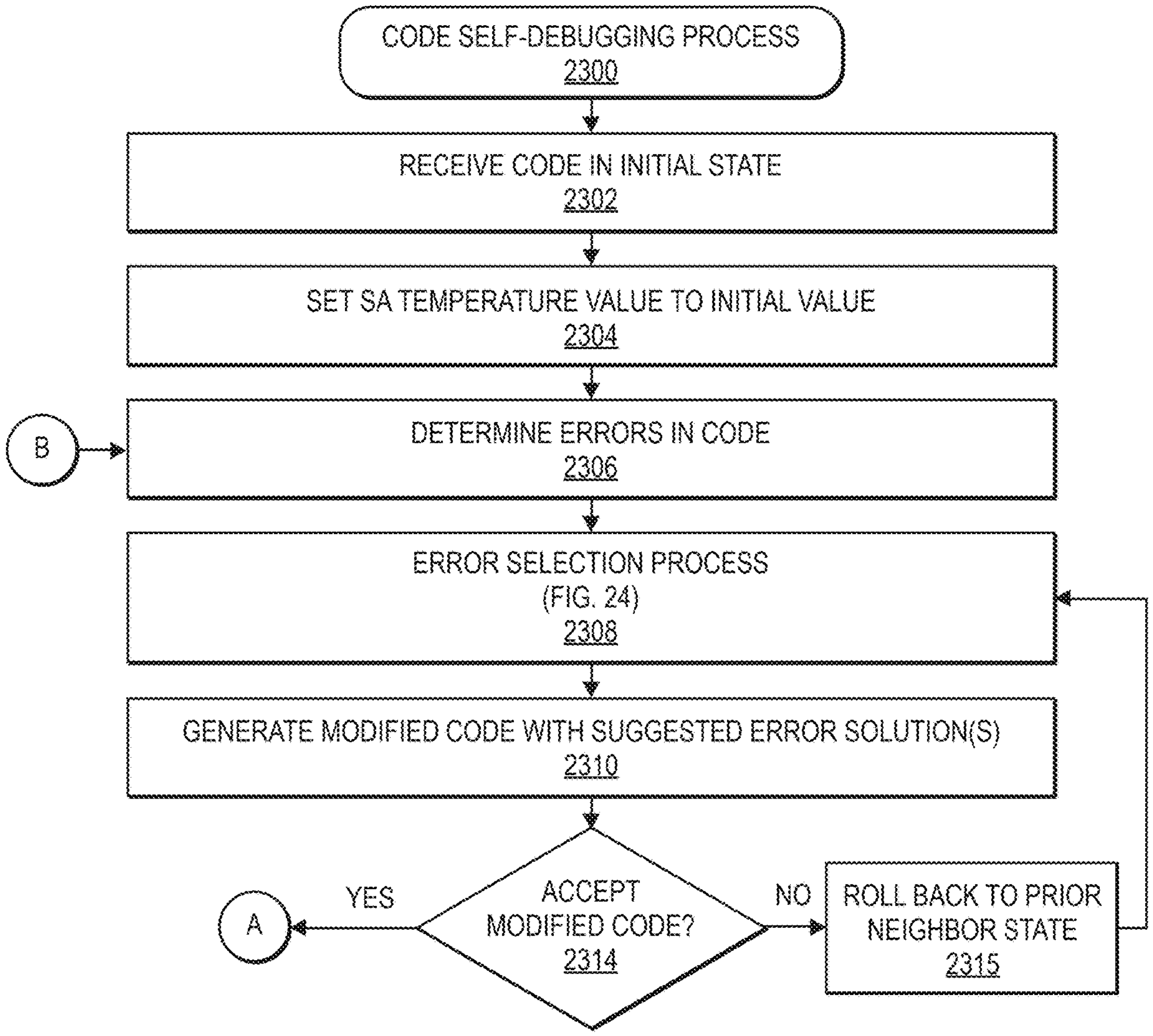
FIG. 23A is an example code self-debugging process, in accordance with disclosed implementations.
Figure 23A:
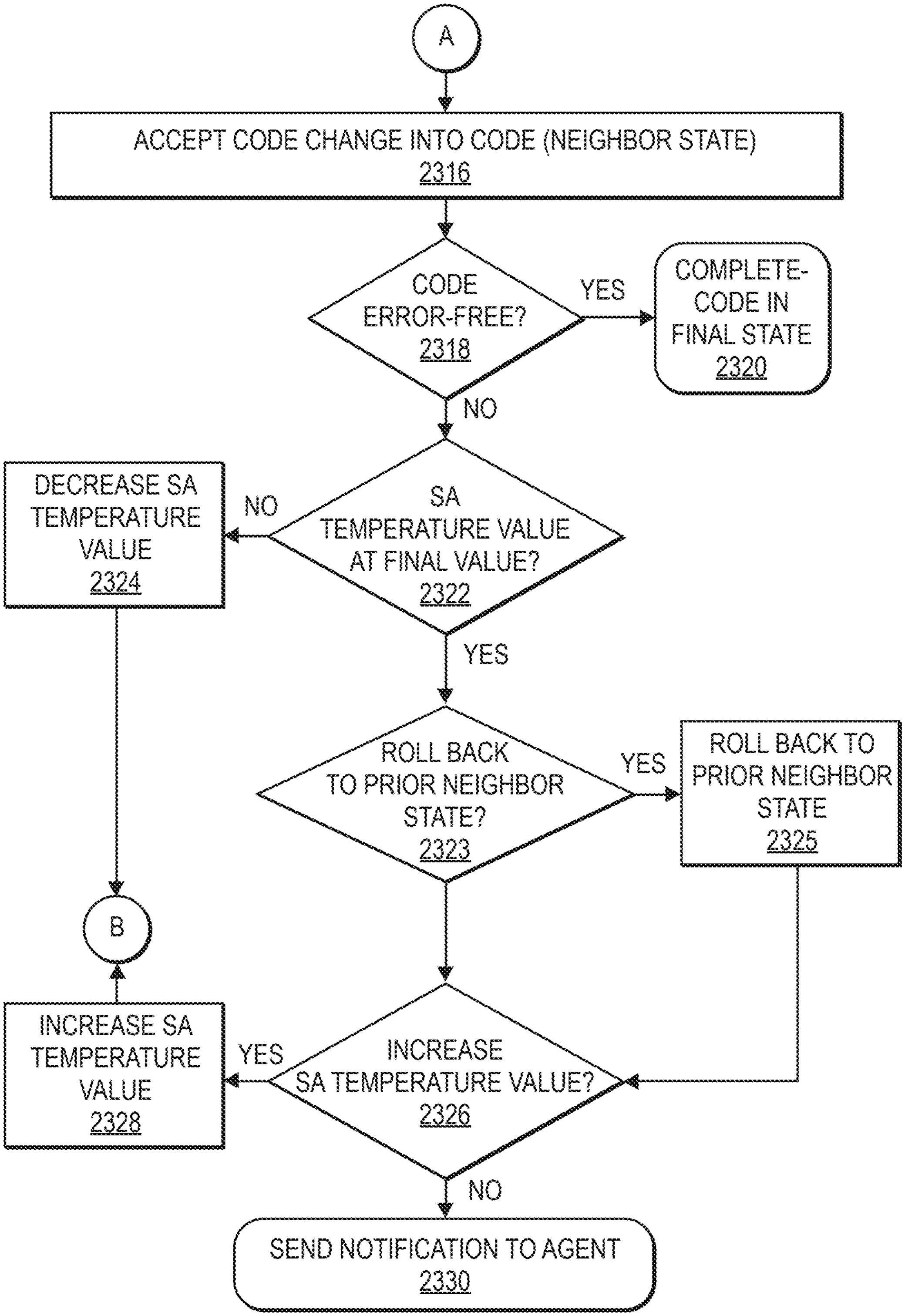

FIG. 23A is an example code self-debugging process 2300, in accordance with disclosed implementations. In some implementations, the example process 2300 may be performed by the resolution agent of the SDS.

The example process 2300 begins by receiving code in an initial, buggy state, such as transformed code that includes one or more errors, as in 2302. While the disclosed implementations focus primarily on transformed code in which errors/bugs remain, the disclosed implementations are equally applicable to self-debugging of any code that includes errors. For example, the disclosed implementations may be used to debug code during initial code development, code modification, etc.

As part of the initialization process, the SA temperature is set to an initial temperature value, as in 2304. For example, the disclosed implementations may utilize a plurality of different SA temperatures from an initial high temperature that allows exploration and selection of potential error solutions that may result in an increase in errors in the modified code to a low or final temperature that restricts selection of potential error solutions to only those that result in a decrease in errors, or no errors, in the resulting modified code. In other implementations, as discussed below, there may be no defined or set final temperature value. In such an example, the initial temperature value may be set at a first temperature value and the SA temperature value adjusted in accordance with disclosed implementations. There may be any number or level of SA temperature values in the plurality of SA temperature values.

While the disclosed implementations are described with respect to SA temperature values, it will be appreciated that the SA temperature values may be any values or indicators to determine how restrictive selection of potential error solutions is allowed to be as part of a self-debugging process and does not relate to an actual temperature or any specific value. For example, the plurality of SA temperature values may be any numerical value between 0 and 1, each value corresponding to a different degree of restriction in potential error solution selection. Other values or plurality of indicators may likewise be used for SA temperature values and SA temperature values are described herein as a convenience to simplify discussion and aid in understanding of the disclosed implementations. Accordingly, in the context of the disclosed implementations and generative AI, "temperature" refers to a parameter or value that controls the randomness or "creativity" in the output generated by the LLM. A higher temperature value increases the randomness and diversity of the generated output, while a lower temperature value makes the output more predictable and focused, sticking closer to a most likely or "safe" option.

Returning to the example process 2300, the code, for example transformed source code, may be processed to determine errors in the code, as in 2306. For example, the validation agent discussed above may process the transformed source code, for example by executing the source code in a sandbox, to determine errors in the code.

Upon determination of errors in the code, the error selection process 2400 is performed to select one or more errors and corresponding potential error solution(s) determined for those one or more errors, as in 2308. An example error selection process is discussed further below with respect to FIG. 24.

The suggested one or more potential error solution(s) or batch of potential error solutions returned from the example error selection process 2400 are then utilized to update the received code to generate a modified code that resolves the selected error(s) and includes the suggested one or more potential error solution(s), as in 2310.

A determination is then made as to whether the modified code is to be accepted, as in 2314. For example, the example process may determine the number of errors in the modified code and generate a probability score based on the number of errors in the modified code, the number of errors in the prior state of the code (prior neighbor state), and the SA temperature value. In one implementation, the difference between the number of errors in the prior code and the number of errors in the modified code is divided by the SA temperature value to determine the probability score. In other implementations, the probability score may be determined in a different manner.

If the probability score is below a defined threshold, which may vary depending on the SA temperature value, it may be determined at decision block 2314 that the modified code is to be rejected. In comparison, if the probability score exceeds the defined threshold, it may be determined at decision block 2314 that the modified code is to be accepted. If it is determined that the modified code is not to be accepted, the modified code is rejected, the code is rolled back to the prior neighbor code state, as in 2315, and the example process 2300 returns to block 2308 to select another one or more errors or another one or more potential error solutions for one or more errors in the code. If it is determined that the modified code is to be accepted, the code change (the potential error solution(s)) is accepted into the code and a modified code is generated and saved as a neighbor state between the initial state of the code and an ultimate final state of the code, as in 2316.

A determination may then be made as to whether the modified code is error-free, as in 2318. If it is determined that the modified code is error-free, the example process 2300 completes, indicating that the modified code is in an error-free final state, as in 2320. However, if it is determined at decision block 2318 that the modified code is not error-free, a determination is made as to whether the SA temperature value is at a final temperature value, as in 2322. As discussed above, the example process may utilize any number of a plurality of SA temperature values between an initial SA temperature value that is less restrictive than all other SA temperature values and a final SA temperature value that is more restrictive than all other SA temperature values of the plurality of SA temperature values.

If it is determined that the SA temperature is not at the final SA temperature value, the SA temperature value is decreased, as in 2324. For example, if there are five different SA temperature values in the plurality of SA temperature values and it is determined at decision block 2322 that the SA temperature value is at the initial high SA temperature value, the SA temperature value may be decreased to the next highest SA temperature value, thereby slowly decreasing the temperature with each iteration and error resolution. As another example, if it is determined at decision block 2322 that the SA temperature value is at the second to lowest SA temperature value of the plurality of SA temperature values, at block 2324, the SA temperature value may be decreased to the lowest SA temperature value of the plurality of SA temperature values.

Returning to decision block 2322, if it is determined that the SA temperature value is already at the lowest SA temperature value, a determination may be made as to whether the modified code is to be rolled back to a prior neighbor code state, as in 2323. For example, if the number of errors does not change between neighbor code states after a defined number of iterations through the example process 2300 and/or if the SA temperature value is at a final value and error(s) remains in the modified code, it may be determined that the modified code is to be rolled back to a prior neighbor code state. If it is determined that the modified code is to be rolled back to a prior neighbor state, the modified code is rolled back to a prior neighbor state, as in 2325.

After rolling the modified code back to a prior neighbor state or after determination at decision block 2323 that the modified code is not to be rolled back to a prior neighbor state, a determination is made as to whether to increase the SA temperature value, as in 2326. For example, if the SA temperature value is already at the lowest SA temperature value and errors remain, it may be determined that the SA temperature value is to be increased, for example to a next highest SA temperature value, so the example process has more freedom to select other potential error solutions that may lead to an error-free final state. In some examples, there may be a counter or defined number of times that the SA temperature value may be increased before it is determined that an error-free solution is not possible. In one implementation, the example process may allow an increase in SA temperature value from the final SA temperature value a maximum of three times. In other implementations, the number of times the SA temperature value may be increased may be greater or less than three times.

If it is determined that the SA temperature value is to be increased, the SA temperature value is increased, as in 2328. In some implementations, if it is determined that the SA temperature value is to be increased, the SA temperature value may be increased one level (e.g., to the second to lowest SA temperature value). In other implementations, the SA temperature value may be increased more than one level, thereby further increasing the flexibility allowed in exploring other potential error solutions. In some instances, the amount of the SA temperature value increase may be dependent upon the number of times the SA temperature value is allowed to be increased and/or the number of times the SA temperature value has already been increased. For example, if the SA temperature value is allowed to be increased a defined number of times, it may be further specified that the amount of the SA temperature value increase decreases each time the SA temperature value is allowed to be increased. In other implementations, it may be specified that the amount of the SA temperature value increase is to increase each time the SA temperature value is allowed to be increased. In still other examples, the amount of the SA temperature value increase may be randomly selected for each instance in which the SA temperature value is allowed to be increased.

After decreasing the SA temperature value at block 2324 or after increasing the SA temperature value at block 2328, the example process returns to block 2306, and continues as discussed above.

If it is determined at decision block 2326 that the SA temperature value is not to be increased, a notification may be generated and sent to the agent or user for which the code is being debugged informing them that the example process was unable to debug the code, as in 2330. Such a notification may include an indication or information as to why the example process was not able to self-debug the code.

Figure 23B:
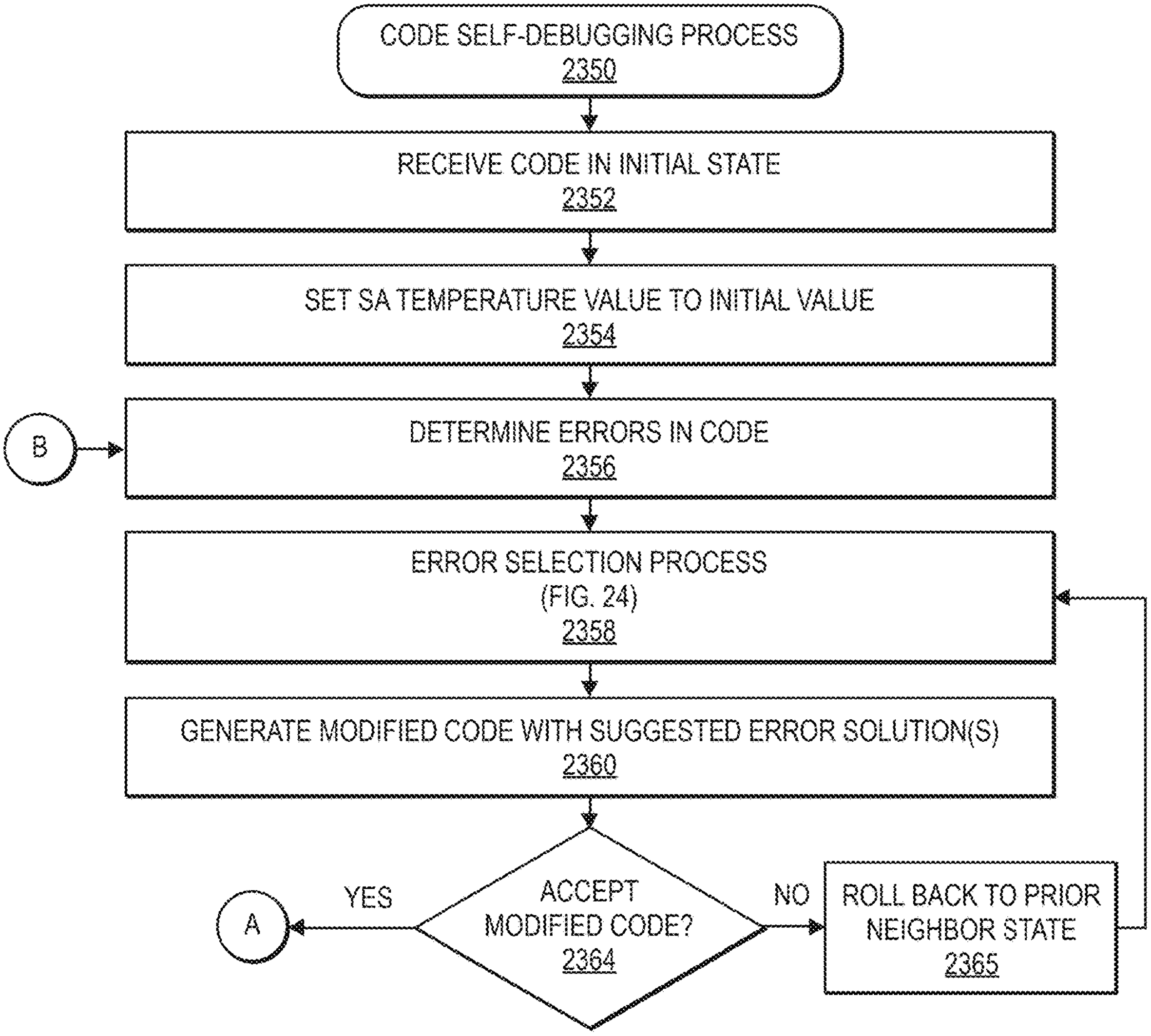
FIG. 23B is another example code self-debugging process, in accordance with disclosed implementations.
Figure 23B:
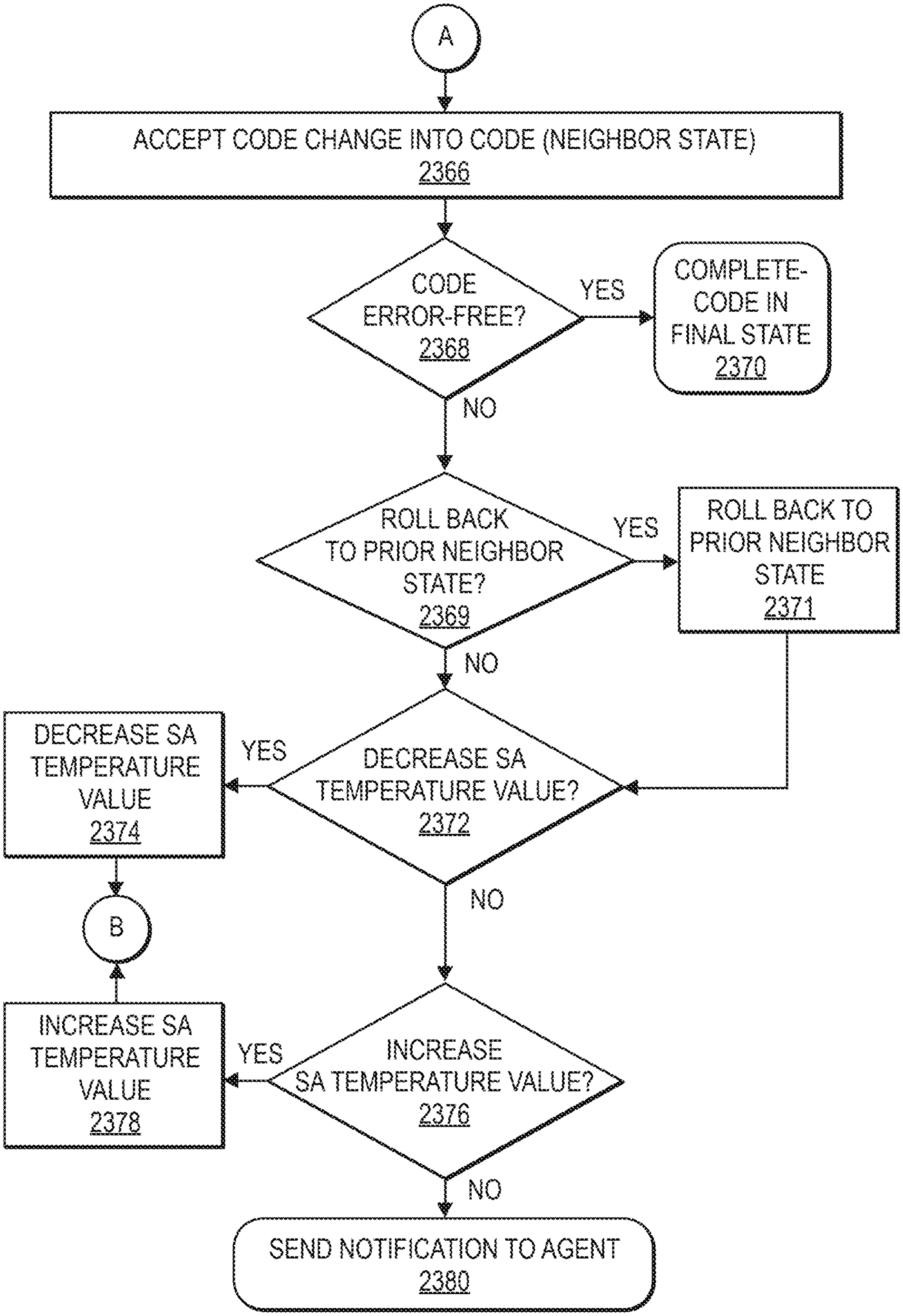

FIG. 23B is another example code self-debugging process 2350, in accordance with disclosed implementations. In some implementations, the example process 2350 may be performed by the resolution agent of the SDS.

The example process 2350 begins by receiving code in an initial, buggy state, such as transformed code that includes one or more errors, as in 2352. While the disclosed implementations focus primarily on transformed code in which errors/bugs remain, the disclosed implementations are equally applicable to self-debugging of any code that includes errors. For example, the disclosed implementations may be used to debug code during initial code development, code modification, etc.

As part of the initialization process, the SA temperature is set to an initial temperature value, as in 2354. In this example, as discussed, the SA temperature value may be decreased a plurality of times to different SA temperature values but there may be no defined final temperature value. Similar to the example discussed with respect to FIG. 23A, the disclosed implementations may utilize a plurality of different SA temperatures that allow exploration and selection of potential error solutions that may result in an increase in errors in the modified code at higher SA temperature values and lower SA temperature values that restrict selection of potential error solutions to only those that result in a decrease in errors, or no errors, in the resulting modified code. In such an example, the initial temperature value may be set at a first temperature value and the SA temperature value adjusted in accordance with disclosed implementations. Accordingly, there may be any number or level of SA temperature values in the plurality of SA temperature values.

While the disclosed implementations are described with respect to SA temperature values, it will be appreciated that the SA temperature values may be any values or indicators to determine how restrictive selection of potential error solutions is allowed to be as part of a self-debugging process and does not relate to an actual temperature or any specific value. For example, the plurality of SA temperature values may be any numerical value between 0 and 1, each value corresponding to a different degree of restriction in potential error solution selection. Other values or plurality of indicators may likewise be used for SA temperature values and SA temperature values are described herein as a convenience to simplify discussion and aid in understanding of the disclosed implementations.

Returning to the example process 2350, the code, for example transformed source code, may be processed to determine errors in the code, as in 2356. For example, the validation agent discussed above may process the transformed source code, for example by executing the source code in a sandbox, to determine errors in the code.

Upon determination of errors in the code, the error selection process 2400 is performed to select one or more errors and corresponding potential error solution(s) determined for those one or more errors, as in 2358. An example error selection process is discussed further below with respect to FIG. 24.

The suggested one or more potential error solution(s) or batch of potential error solutions returned from the example error selection process 2400 are then utilized to update the received code to generate a modified code that resolves the selected error(s) and includes the suggested one or more potential error solution(s), as in 2360.

A determination is then made as to whether the modified code is to be accepted, as in 2364. For example, the example process may determine the number of errors in the modified code and generate a probability score based on the number of errors in the modified code, the number of errors in the prior state of the code (prior neighbor state), and the SA temperature value. In one implementation, the difference between the number of errors in the prior code and the number of errors in the modified code is divided by the SA temperature value to determine the probability score. In other implementations, the probability score may be determined in a different manner.

If the probability score is below a defined threshold, which may vary depending on the SA temperature value, it may be determined at decision block 2364 that the modified code is to be rejected. In comparison, if the probability score exceeds the defined threshold, it may be determined at decision block 2364 that the modified code is to be accepted. If it is determined that the modified code is not to be accepted, the modified code is rejected, the code is rolled back to the prior neighbor code state, as in 2365, and the example process 2350 returns to block 2358 to select another one or more errors or another one or more potential error solutions for one or more errors in the code. If it is determined that the modified code is to be accepted, the code change (the potential error solution(s)) is accepted into the code and a modified code is generated and saved as a neighbor state between the initial state of the code and an ultimate final state of the code, as in 2366.

A determination may then be made as to whether the modified code is error-free, as in 2368. If it is determined that the modified code is error-free, the example process 2350 completes, indicating that the modified code is in an error-free final state, as in 2370. However, if it is determined at decision block 2368 that the modified code is not error-free, a determination may be made as to whether the modified code is to be rolled back to a prior neighbor code state, as in 2369. For example, if the number of errors does not change between neighbor code states after a defined number of iterations through the example process 2350, it may be determined that the modified code is to be rolled back to a prior neighbor code state. If it is determined that the modified code is to be rolled back to a prior neighbor state, the modified code is rolled back to a prior neighbor state, as in 2371.

After rolling the modified code back to a prior neighbor state or after determination at decision block 2369 that the modified code is not to be rolled back to a prior neighbor state, a determination is made as to whether the SA temperature value is to be decreased, as in 2372. As discussed above, the example process may decrease the SA temperature value any number of times, with each decrease in SA temperature value resulting in a more restrictive allowance as to the acceptance of errors in modified code states. In one example, it may be determined that the SA temperature value is to be decreased if the number of errors between the two prior neighbor code states changed. In comparison, it may be determined at decision block 2372 that the SA temperature value is not to decrease if the number of errors in the code between the two prior neighbor code states is unchanged. As still another example, the example process 2350 may determine at decision block 2372 to decrease the code a defined number of iterations through the example process 2350.

If it is determined that the SA temperature is to be decreased, the SA temperature value is decreased, as in 2374. For example, the SA temperature value may be decreased by a defined amount, such as a five percent decrease in temperature value. In other implementations, the amount of the decrease may vary based on, for example, one or more of, the number of times the SA temperature value has already been decreased, the number of errors remaining in the modified code, the type of errors remaining in the modified code, the difference in the number of errors between the modified code and a prior neighbor state of the code, etc. Returning to decision block 2372, if it is determined that the SA temperature value is not to be decreased, a determination is made as to whether to increase the SA temperature value, as in 2376. For example, if the change in errors between neighbor code states is unchanged, it may be determined that the SA temperature value is to be increased, for example to a next highest SA temperature value, so the example process has more freedom to select other potential error solutions that may lead to an error-free final code state. In some examples, there may be a counter or defined number of times that the SA temperature value may be increased before it is determined that an error-free solution is not possible. In one implementation, the example process may allow an increase in SA temperature value from the final SA temperature value a maximum of three times. In other implementations, the number of times the SA temperature value may be increased may be greater or less than three times.

If it is determined that the SA temperature value is to be increased, the SA temperature value is increased, as in 2378. In some implementations, if it is determined that the SA temperature value is to be increased, the SA temperature value may be increased by the same amount that the SA temperature value is decreased (e.g., five percent). In other implementations, the SA temperature value may be increased by a different amount than the amount of decrease in SA temperature value. In some instances, the amount of the SA temperature value increase may be dependent upon the number of times the SA temperature value is allowed to be increased, the number of times the SA temperature value has already been increased, the number of errors remaining in the modified code, the types of errors remaining in the modified code, etc. For example, if the SA temperature value is allowed to be increased a defined number of times, it may be further specified that the amount of the SA temperature value increase decreases each time the SA temperature value is allowed to be increased. In other implementations, it may be specified that the amount of the SA temperature value increase is to increase each time the SA temperature value is allowed to be increased. In still other examples, the amount of the SA temperature value increase may be randomly selected for each instance in which the SA temperature value is allowed to be increased.

After decreasing the SA temperature value at block 2374 or after increasing the SA temperature value at block 2378, the example process returns to block 2356, and continues as discussed above.

If it is determined at decision block 2376 that the SA temperature value is not to be increased, a notification may be generated and sent to the agent or user for which the code is being debugged informing them that the example process was unable to debug the code, as in 2380. Such a notification may include an indication or information as to why the example process was not able to self-debug the code.

Figure 24:
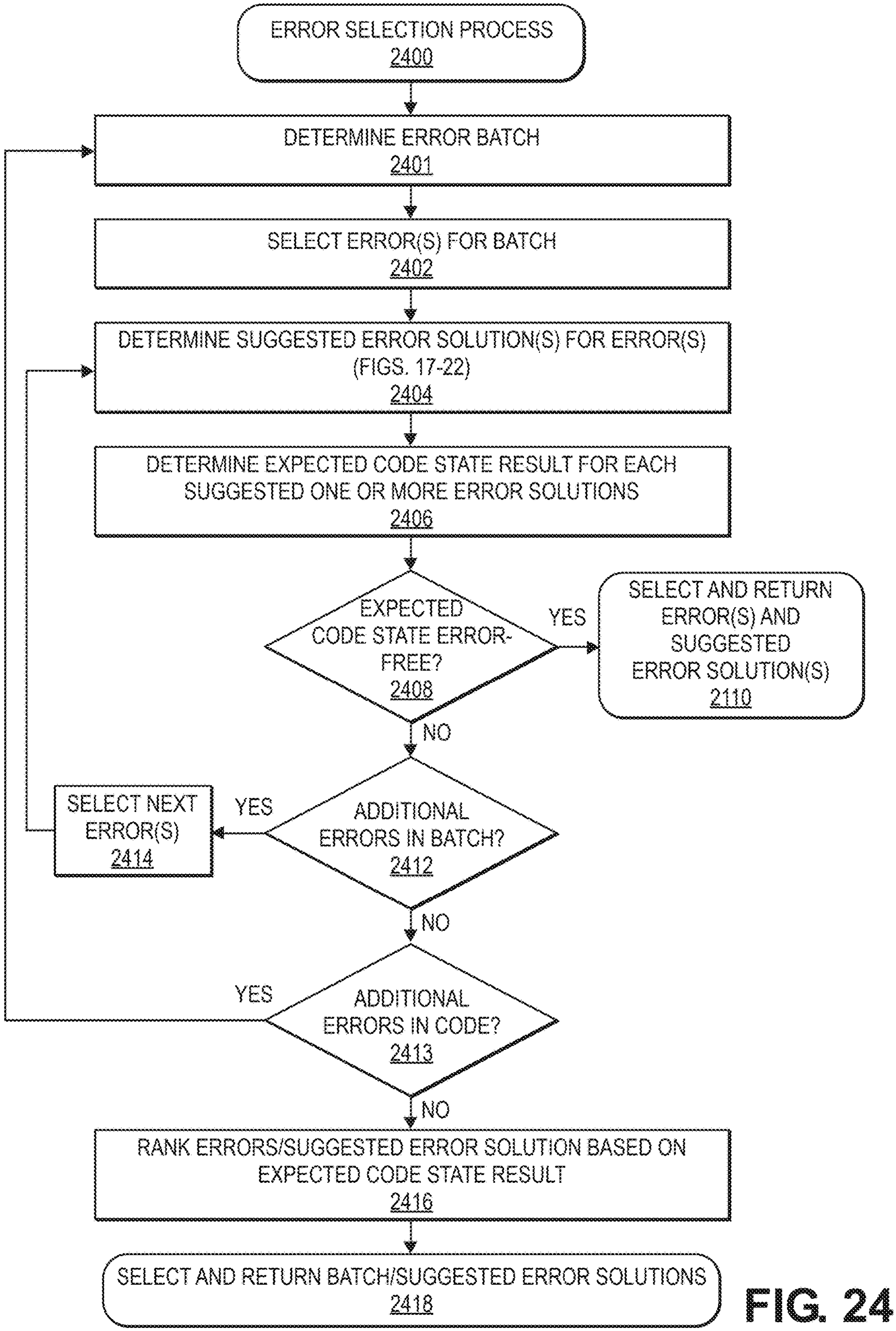
FIG. 24 is an example error selection process, in accordance with disclosed implementations.

FIG. 24 is an example error selection process 2400, in accordance with the disclosed implementations. As discussed, the example error selection process 2400 may be called by the example code self-debugging process 2300/2350 discussed above with respect to FIG. 23A or FIG. 23B.

The example process 2400 begins by determining an error batch or the number of potential error solutions that are to be returned by the example process 2400 based on errors included in the code that is being self-debugged by the example self-debugging process 2300/2350, as in 2401. The error batch may be any number of errors, from a single error, to all errors in the code. In some examples, the error batch may vary based on the types of errors that are to be resolved. For example, the example process 2400 may group related errors into an error batch. For example, file level errors may be grouped into an error batch. In other examples, the error batch may be determined to include errors with similar dependencies or a similar number of dependencies. Alternatively, independent errors may be batched together in an error batch. In still another example, an error batch may only include a single error.

The example process may then select one or more errors from the error batch, as in 2402. In some implementations, an error may be selected at random. In other implementations, the errors of the error batch may be ranked based on information known about the errors, such as the simplicity in fixing the error, the frequency with which the error appears, etc. In some examples only a single error may be selected from the error batch. In other implementations, all errors of the error batch may be processed together by the example process 2400.

For the selected one or more errors, one or more suggested error solutions for the one or more errors may be determined, as in 2404. For example, and as discussed above with respect to FIGS. 17-19, in some implementations, an error and information about the error and/or the code may be provided to an LLM with instructions that the LLM determine and provide one or more potential error solutions that will resolve the error. In other examples, rather than providing only a single error to the LLM, more than one error from the error batch (e.g., all errors from the error batch) may be provided to the LLM with instructions that the LLM determine and provide one or more potential error solutions that will resolve all the errors provided to the LLM.

In some examples, the LLM may also generate code that may be automatically applied to implement the potential error solution(s) and/or indicate the expected modified code state after the potential error solution(s) are applied to the code (e.g., errors expected to result from application of the potential error solution). In some implementations, the LLM may be called multiple times to obtain multiple potential error solutions for the selected error. In other implementations, the LLM may be instructed to determine and provide one or more potential error solutions for the provided error.

For each potential one or more error solution(s) received from the LLM, an expected code state of the code after the potential error solution is applied may be determined, as in 2406. As noted above, in some implementations, the LLM may provide an indication of the expected code state of the code after a potential one or more error solution(s) are applied. In other implementations, the potential one or more error solution(s) provided by the LLM may be applied to the code in a memory and tested to determine the code state of the code after the potential one or more error solution(s) are applied. For example, the validate agent may process the code with the potential error solution (modified code) to validate the modified code.

Regardless of how the expected modified code state is determined for a potential one or more error solution(s), a determination may be made as to whether one of the expected code states results in an expected error-free code state, as in 2408. If it is determined that one of the expected code states results in an expected error-free code state, the potential one or more error solution(s) that result in the expected error-free code state is selected and returned, as in 2410. If it is determined at decision block 2408 that none of the expected code states resulting from the suggested one or more error solutions result in an expected error-free code state, a determination is made as to whether additional errors determined for the error batch remain for processing by the example process 2400, as in 2412.

If it is determined that one or more errors of the error batch remain, a next one or more errors from the error batch is selected, as in 2414, and the example process 2400 returns to block 2404 and continues with the next selected one or more errors. If it is determined that potential error solutions have been generated for each error of the error batch, a determination is made as to whether additional errors in the code exist that have not been added to an error batch and processed, as in 2413. If it is determined that additional errors remain in the code, the example process 2400 returns to block 2401, determines another error batch based on the errors remaining in the code that have not already been included in a batch, and continues.

If it is determined at decision block 2413 that no additional errors remain in the code, the error batches and suggested error solutions for those errors are ranked, for example based on the expected code state of each modified code after the corresponding suggested error solutions of the error batch have been applied, as in 2416. For example, the errors and potential error solutions may be ranked based on the number of expected errors that are expected to result after the code is modified with the potential error solutions of the error batch.

Finally, an error batch and corresponding potential error solutions may be selected and returned to the example process 2300/2350. In some implementations, the example process 2400 may consider the SA temperature value to determine which error batch and corresponding error solutions should be returned. For example, if the SA temperature value is at an initial or highest SA temperature value, an error batch and corresponding error solutions may be selected that result in a higher number of errors in the modified code than the number of errors in the current code. As another example, if the SA temperature value is lower, an error batch and corresponding potential error solutions may be selected from only those error batches and potential error solutions that are expected to result in fewer errors than the current errors of the code or modified code.

In some examples, if there are multiple error batches and corresponding potential error solutions that are available for selection, the example process may randomly select an error batch and corresponding error solutions from those that comply with the restrictions of the current SA temperature value. In other examples, if there are multiple error batches and corresponding potential error solutions that are available for selection, the example process may select an error batch and corresponding potential error solutions that result in a highest number of expected errors, provided the error batch and potential error solution(s) comply with the restrictions of the SA temperature value. In still other examples, the example process may select an error batch and corresponding potential error solutions from those that comply with the current SA temperature value but would not comply with the next lowest SA temperature value. As a simple, illustrative example, if there are three SA temperature values, the first or initial SA temperature value may allow selection of an error batch and corresponding potential error solutions that are expected to result in modified code with a larger number of errors than the current code/current modified code. The second SA temperature value may allow selection of an error batch and corresponding potential error solutions provided that the expected modified code has less expected errors than the current code/current modified code. The third or final SA temperature value may allow selection of an error batch and corresponding potential error solutions provided that the expected modified code is expected to be error-free. In such an example, if the SA temperature value is at the first or initial SA temperature value, the example process may only select from error batches and potential error solutions that result in an expected modified code that is expected to include more errors than the current code/current modified code.

Figure 25:
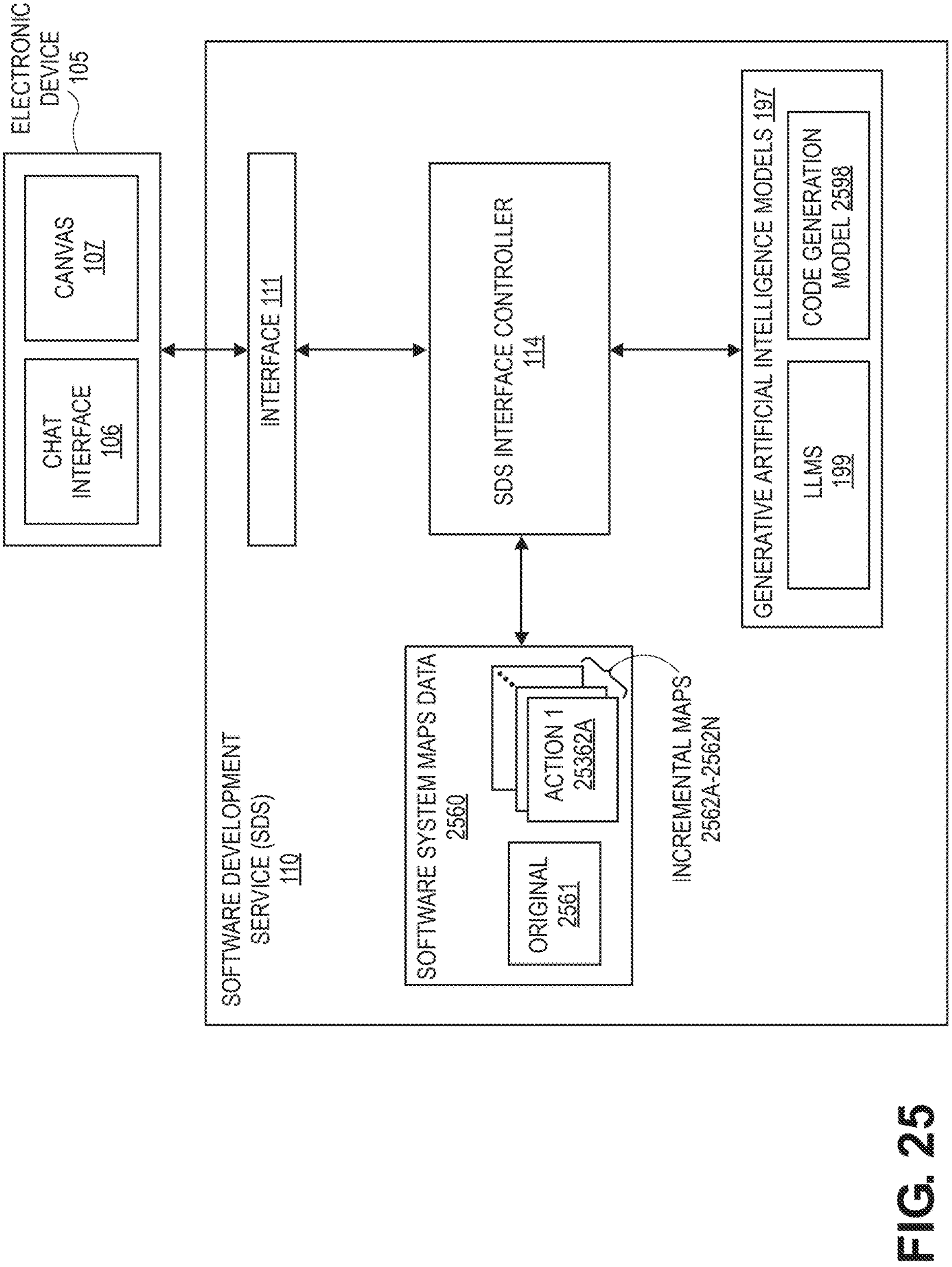
FIG. 25 depicts an interface controller of the software development service according to some examples.

FIG. 25 depicts an interface controller of the software development service according to some examples. In addition to providing the chat-based interface that can be evaluated by the various agents described herein, the SDS 110 can include an SDS user interface controller 114 to manage user interactions via user interfaces such as the chat-based interface 106 and the canvas interface 107. The canvas 107 can provide a graphical view of a software system with various resources represented as nodes and connections or dependencies between those resources represented as edges or connections between the nodes. An exemplary canvas 107 can be provided as part of a web-based interface in which the SDS UI controller 114 generates the HTML, CSS, JavaScript, etc. that can be rendered by a web browser or other application (e.g., a software development application) executing on the electronic device 105.

The canvas 107 can provide an interface through which users can edit their software systems graphically rather than in a code editor. Exemplary edits can include adding, removing, or changing cloud based resources used by the system, editing code of components, editing data flows between resources, etc. An example graphical interface is illustrated and described in FIG. 26.

A software system can be represented with a system map stored in a structured language. Software system maps data 2560 for a given software system can store various maps of the system given changes to the system as part of a development effort. The system maps data 2560 can be stored in a data store backed by storage infrastructure of the provider network (e.g., an object storage service, a database service, etc.). In some examples, users can make edits to an original system map 2561 via the interfaces 106, 107, the edits tracked in incremental maps 2562A-2562N. For example, if the user loads an original map 2561 and makes a change, that change can be stored in action 1 map 2562A. If the user makes another change, that change can be stored in action 2 map 2562B, and so on. The original system map 2561 may be user defined or generated by the context aggregator 429. Incremental maps may contain data in the form of changes from a prior map or a complete representation of the system in standalone form.

In some examples, the SDS UI controller 114 invokes an LLM 199 to generate new system maps (e.g., actions 2562) given a change. For example, the SDS UI controller 114 can receive a description of a change from the chat-based interface 106 or from the canvas interface 107 and prompt the LLM 199 to generate an updated system map given the previous system map (e.g., the original system map 2561) and the description of the change. In some examples, the SDS UI controller 114 can first validate a requested change. For example, the SDS UI controller 114 controller can submit a prompt including a system map before a change and a description of the change, requesting that the LLM 199 indicate whether the change is permitted (e.g., with a yes or no). Based on its learned knowledge of system architectures, APIs, etc., the LLM 199 can respond. If the response indicates the change is permitted, the SDS UI controller 114 can request the generation of an updated system map. If not, the SDS UI controller 114 can prompt the LLM 199 for an explanation, which can be provided to the user via the interface(s) 106, 107.

In some examples, the SDS UI controller 114 can allow a user to step through actions. For example, the original system map 2561 may be step 0, the action 1 system map 2562A may be step 1, the action 2 system map 2562B may be step 2, and so on. In displaying step 2, the SDS UI controller 114 can generate data to cause the canvas 107 to render graphical indications of the differences between step 1 and step 2.

In some examples, rather than tracking actions by the user as the user edits the system map via the interfaces 106, 107, the SDS UI controller 114 can load a software system and an action plan (e.g., generated by a development task agent), with the steps of the action plan corresponding to actions 2562A-2562N.

In some examples, the SDS UI controller 114 synchronizes the interfaces 106, 107. For example, if a user enters text into the chat-based interface 106 to modify a software system, the SDS UI controller 114 can provide the response to the text from the LLM and also update the display of the software system on the canvas 107. Likewise, if a user modifies a software system via inputs on the graphical view of a software system in the canvas 107, the modification can be formalized as a command reflected in the chat-based interface, and the result can be reflected both in a text-based response to the command and in an update to the graphical view of the software system displayed in the canvas 107. For example, a user may enter "add a load balancer in front of my web server" into a chat-based interface 106, which can then be reflected in the canvas 107 once the SDS 110 has generated a proposal for the change (e.g., via the development task agent operations described above).

Figure 26:
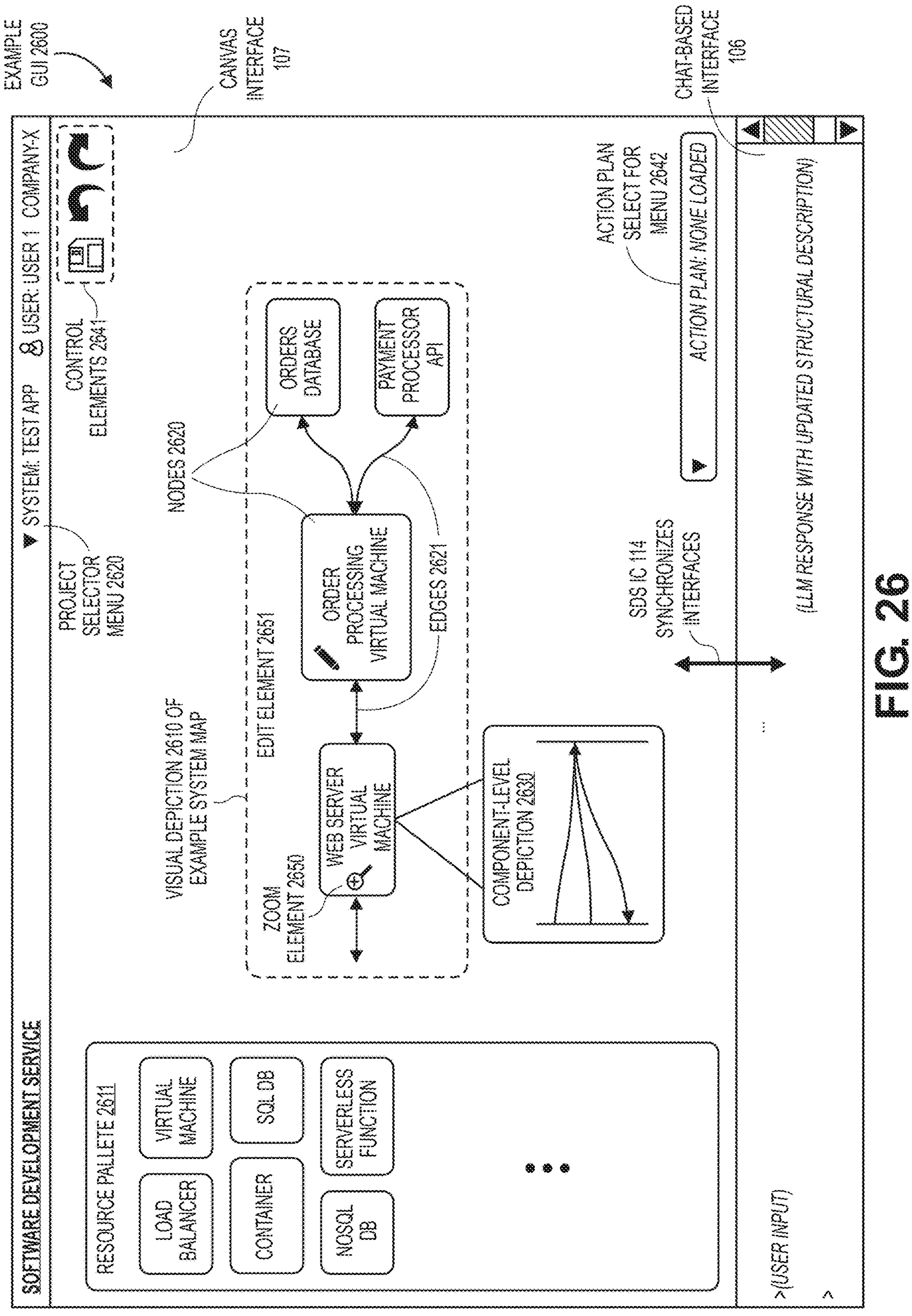
FIG. 26 illustrates a graphical user interface of the software development service according to some examples.

FIG. 26 illustrates a graphical user interface of the software development service according to some examples. The SDS user interface controller 114 can generate the data to cause an electronic device to render the example GUI 2600 and various GUI elements described below. The example GUI 2600 displays a visual depiction 2610 of an example system map in a canvas interface 107 along with a chat-based interface 106. The visual depiction 2610 includes nodes 2620 representing resources of the system and edges 2621 representing connections or dependencies amongst resources. Users can interact with these map components, e.g., by dragging them with a mouse cursor, selecting them and deleting them with a context menu (e.g., displayed via a right click, not shown) or delete keypress on a keyboard, etc.

In some examples, the GUI 2600 includes a resource palette 2611 that includes various resources of a cloud provider network available to a user. The user can drag resources from the palette onto their system map as new nodes. The user can also create connections between nodes. For example, the nodes 2620 can include handles (not shown) that the user can select and drag to other nodes to create new edges 2621.

In some examples, the GUI 2600 can display an edit element 2651 on nodes and/or edges. The edit element 2651 can be displayed upon selection of the node or edge, for example. Selecting the edit element 2651 allows users to edit the properties of the associated node or edge, such as variable names, function calls, functions, etc.

In some examples, the GUI 2600 can display a zoom element 2650 on nodes and/or edges. The zoom element can allow a user to view in greater detail the underlying system component. For example, selecting the zoom element 2650 of the web server virtual machine can cause the display of a component-level depiction 2630 that shows the dataflows at the application level.

In some examples, some nodes and edges may be a collapsed view of multiple other nodes or edges. Selecting the zoom element 2650 allows users to explode the collapsed view into its constituent components. For example, a cluster having a leader and workers may be displayed as a single node. Selecting a zoom element of that cluster can display the leader and workers. As another example, an edge might represent multiple API calls collapsed into a single edge. Selecting a zoom element of that edge can display each of the various calls along with their parameters.

In some examples, the GUI 2600 includes a project selector menu 2640 that allows a user to select a software system. In some examples, the GUI 2600 includes control elements 2641. Control elements can include a save, undo, and redo buttons to perform the associated operations. In some examples, the save button causes the SDS UI controller 114 to save the existing state of the software system as an action, such as 2562A (FIG. 25). In some examples, the GUI 2600 includes an action plan selector menu 2642. The SDS 110 may store previously generated action plans, and the GUI 2600 allows a user to select one of those action plans for review in the GUI 2600.

In some examples, the SDS UI controller 114 can reflect inputs and outputs between interfaces 106, 107, as indicated by the bold arrow between the canvas interface 107 and the chat-based interface 106.

In some examples, the SDS UI controller 114 reflects changes to a software system with colors on system components (e.g., green for additions, red for deletions). In such cases, the SDS UI controller 114 can provide support for multiple color schemes to support colorblind users.

FIGS. 27 through 31 illustrate a progression of changes to a software system with the software development service according to some examples. The graphical user interface 2600 of FIG. 26 can be used to display visual differences between states (or versions) of a software system. To illustrate these visual differences, FIGS. 27 through 31 illustrate various visual differences associated with the incremental actions. Such actions may be created by the user or as part of an action plan, such as the one obtained from an LLM by a development task agent as described above.

Figure 27:
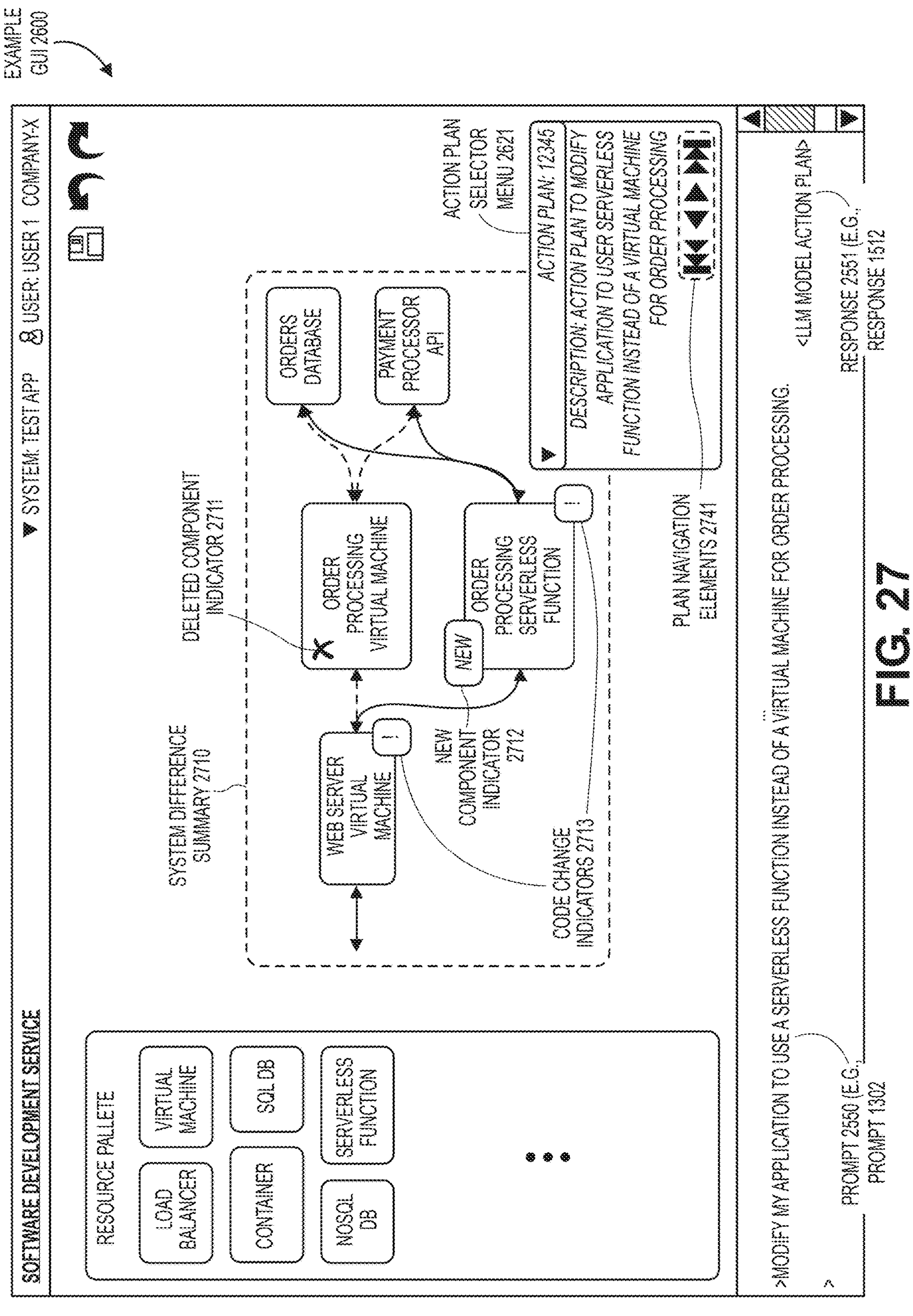
FIGS. 27 through 31 illustrate a progression of changes to a software system with the software development service according to some examples.

Beginning with FIG. 27, the GUI 2600 displays an overview of the action plan 12345. A user may have loaded the action plan via the action plan selector menu 2642 or generated an action plan via the development task agent as indicated by the prompt 2750 and response 2751, causing the SDS UI controller 114 to send data to cause the updated GUI display. The canvas displays a system difference summary 2710 that shows differences that are part of the action plan (e.g., from the initial visual depiction 2610 shown in FIG. 26 through the final step of the action plan). A description of the action plan can also be displayed. The differences can be highlighted with various indicators, such as a deleted component indicator 2711 indicating that the "order processing virtual machine" is deleted, a new component indicator 2712 indicating that the "order processing serverless function" is added, and code change indicators 2713 indicating that the "web server virtual machine" and the "order processing serverless function" will have code changes. Indicators can take on a variety of forms, such as the icons (as shown), border line weights, border line types, colors, shading, etc.

Figure 28:
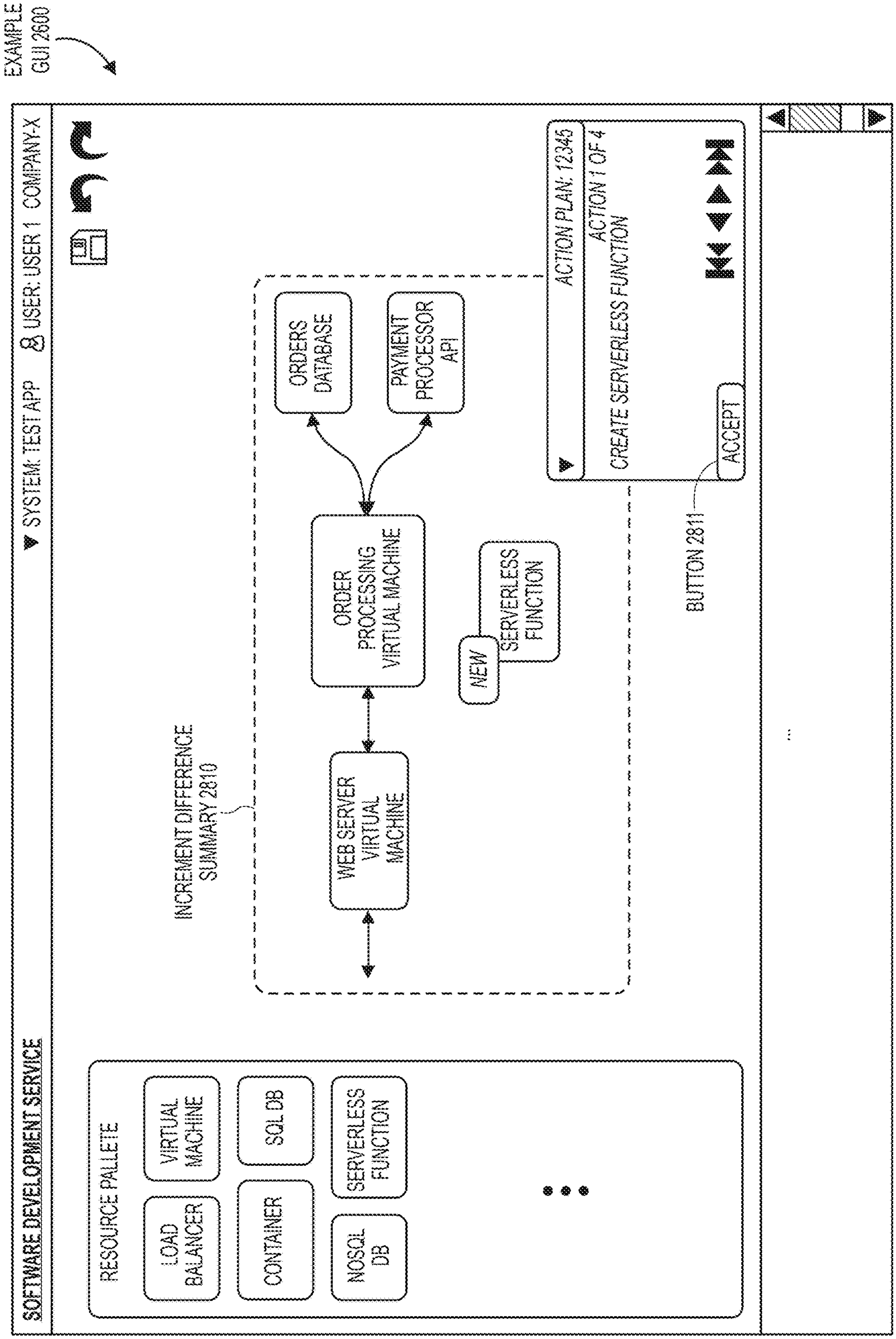

In some examples, the GUI 2600 includes plan navigation elements 2741 to step through the action plan. The user selecting a next action button causes the SDS UI controller 114 to display the next incremental difference, as shown in FIG. 28.

Figure 29:
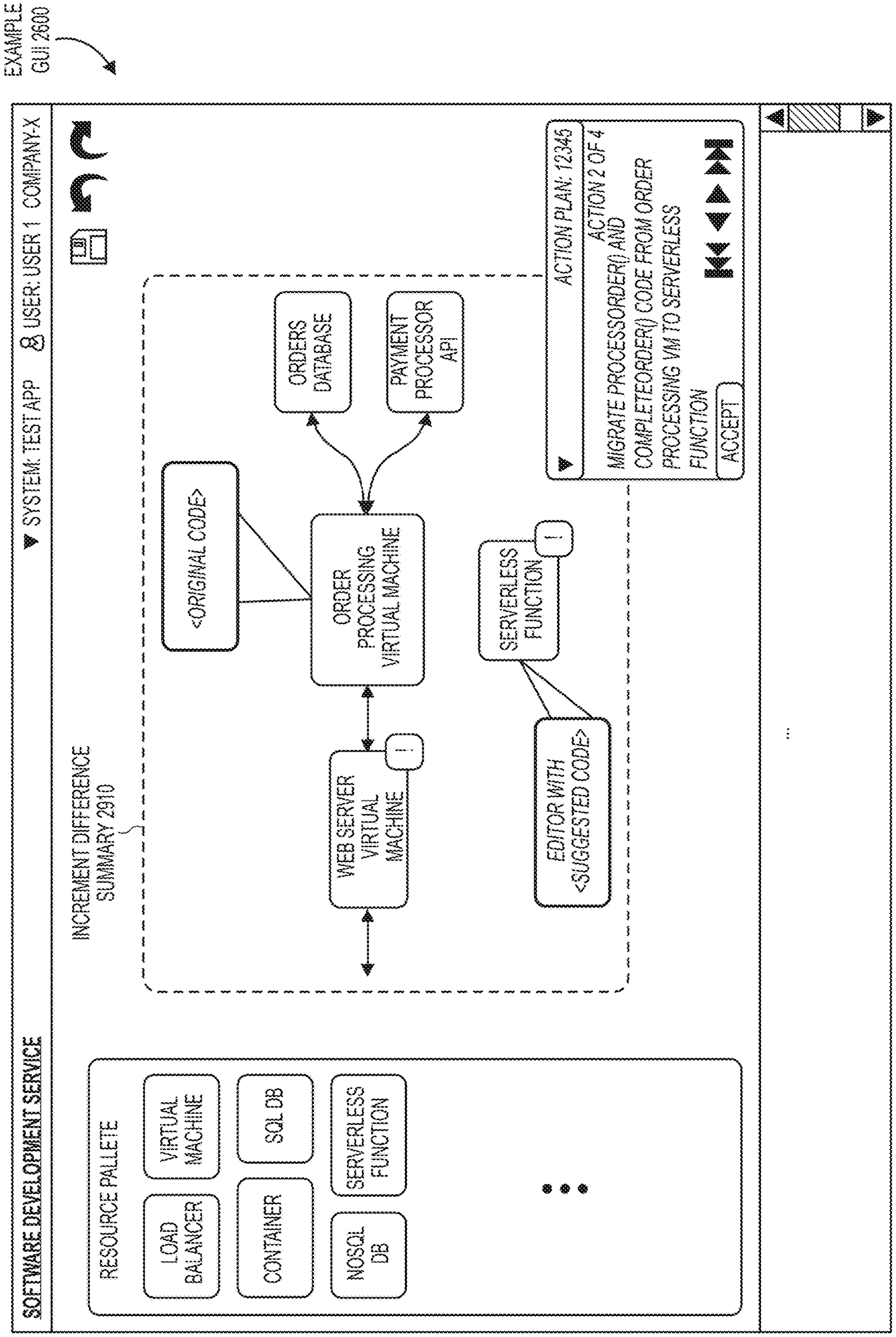

There, the SDS UI controller 114 causes the display an incremental difference summary 2810 associated with an action (in this case, action 1 of 4) based on a difference between the prior system map and the post-action system map (e.g., the original system map 2561 and the first action system map 2561A). The incremental difference summary 2810 includes the change associated with the step, here, adding a new serverless function. The GUI 2600 includes an accept button 2811 that the user can use to accept the change associated with the displayed step. The user selecting the next action button causes the SDS UI controller 114 to display the next incremental difference, as shown in FIG. 29.

Figure 30:
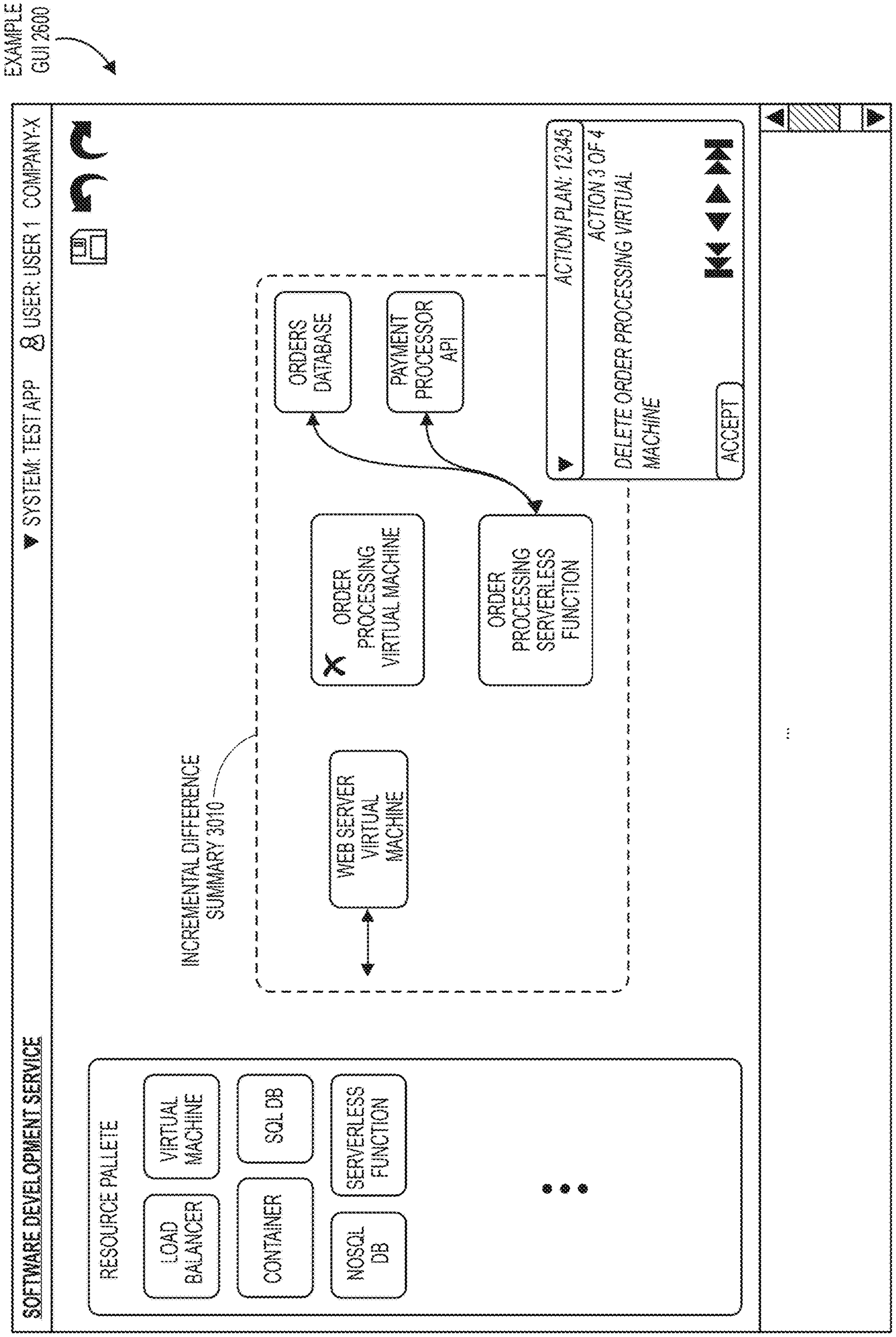

The SDS UI controller 114 causes the display an incremental difference summary 2910 associated with an action (in this case, action 2 of 4) based on a difference between the prior system map and the post-action system map. The incremental difference summary 2910 includes the change associated with the step, here, migrating code from the virtual machine to the serverless function. The GUI 2600 can include code editors displaying the code of the virtual machine and the code of the serverless function. The editor of the new serverless function can include sample code generated with the action plan (e.g., from a code generation model). The GUI 2600 includes an accept button that the user can use to accept the change associated with the displayed step. The user selecting the next action button causes the SDS UI controller 114 to display the next incremental difference, as shown in FIG. 30.

Figure 31:
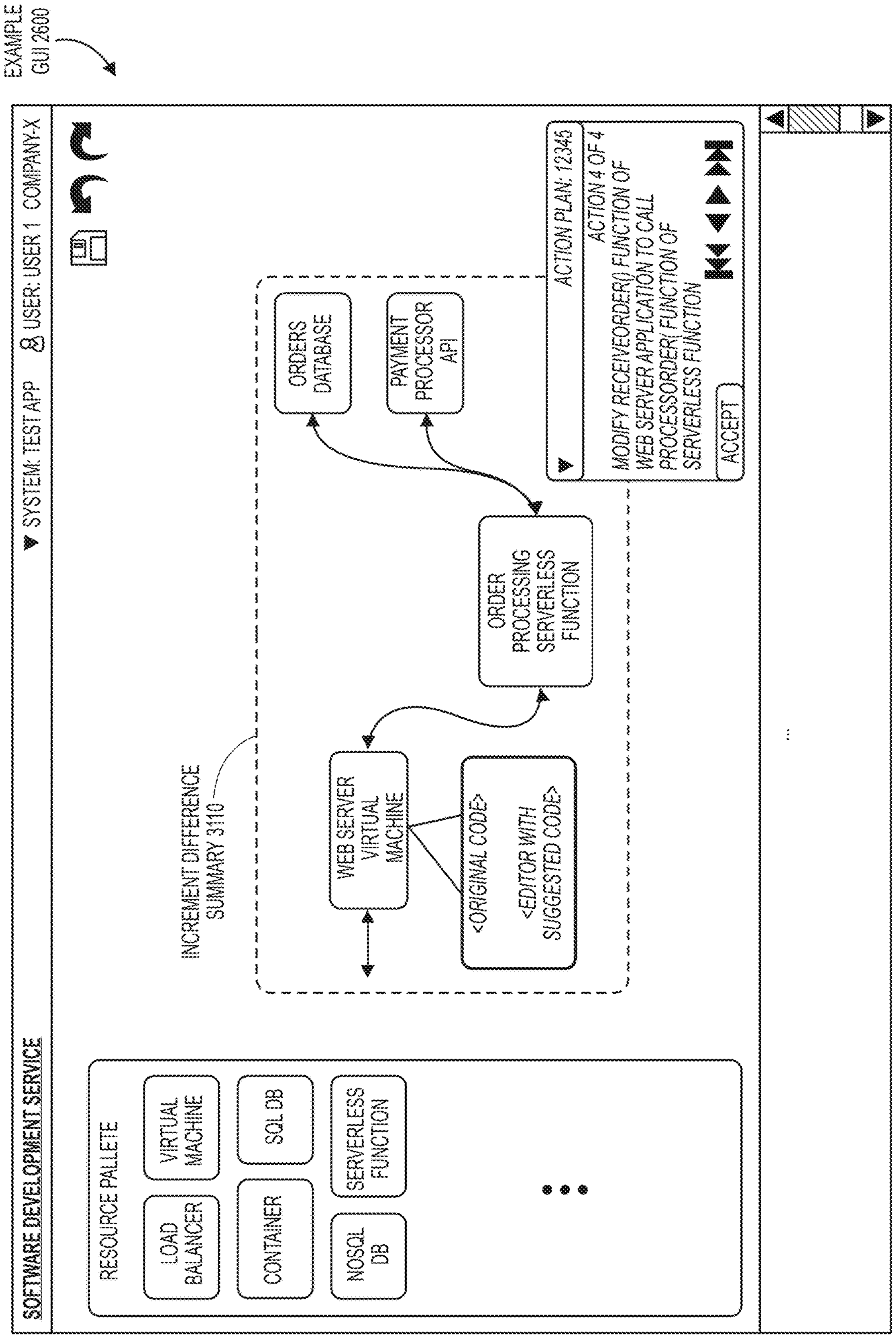

The SDS UI controller 114 causes the display an incremental difference summary 3010 associated with an action (in this case, action 3 of 4) based on a difference between the prior system map and the post-action system map. The incremental difference summary 3010 includes the change associated with the step, here, deleting the virtual machine. The GUI 2600 includes an accept button that the user can use to accept the change associated with the displayed step. The user selecting the next action button causes the SDS UI controller 114 to display the next incremental difference, as shown in FIG. 31.

The SDS UI controller 114 causes the display an incremental difference summary 3110 associated with an action (in this case, action 4 of 4) based on a difference between the prior system map and the post-action system map. The incremental difference summary 3110 includes the change associated with the step, here, updating code of the web server. The GUI 2600 can include a code editor displaying the code of the web server. The editor can include sample code generated with the action plan (e.g., from a code generation model). The GUI 2600 includes an accept button that the user can use to accept the change associated with the displayed step.

In some examples, once the changes are accepted, the SDS 110 can generate a final system map incorporating all of the changes and cause the deployment of the software system based on the final system map.

Figure 32:
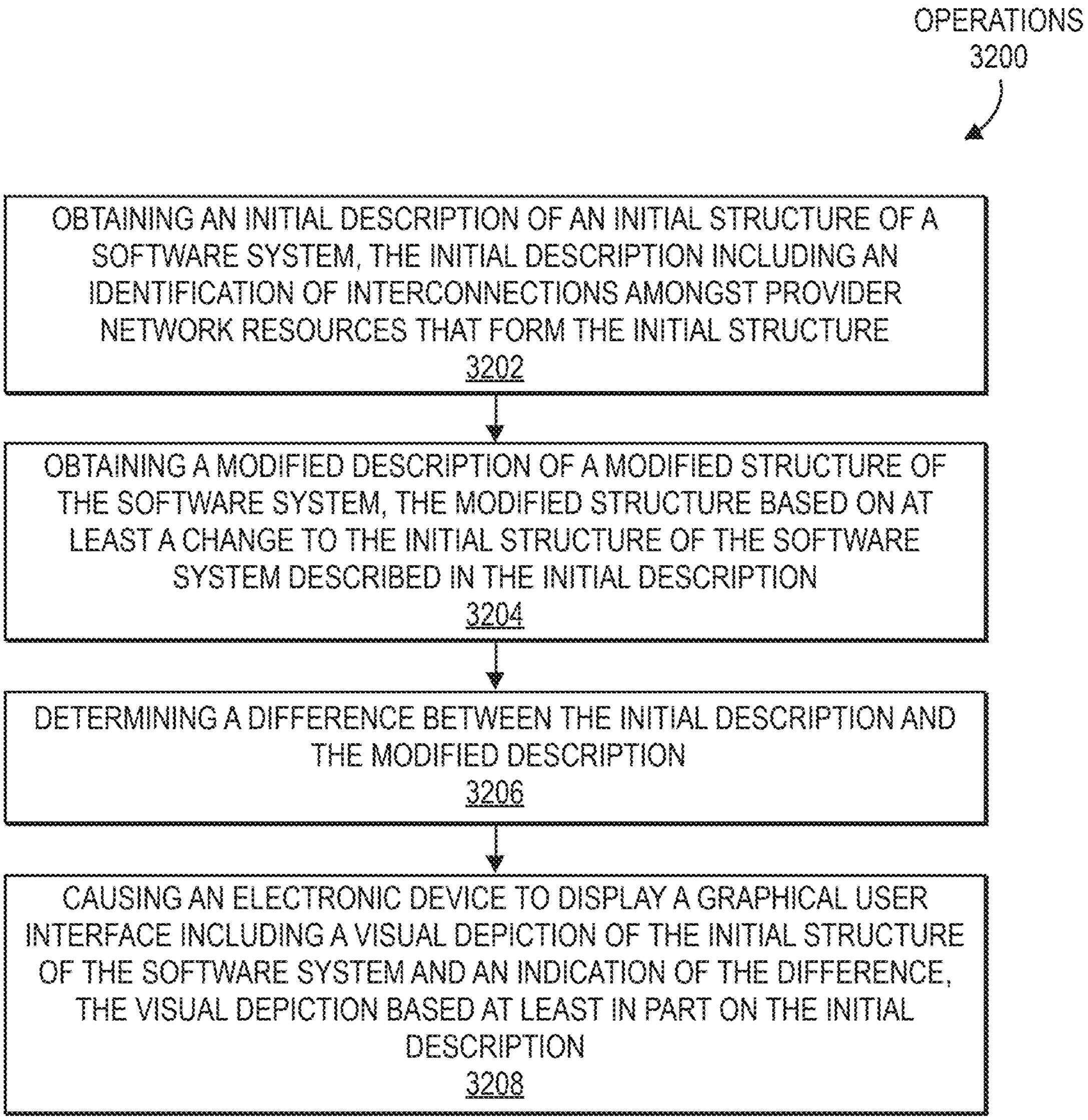
FIG. 32 is a flow diagram illustrating operations of a method for displaying a graphical user interface of a software development system according to some examples.

FIG. 32 is a flow diagram illustrating operations of a method 3200 for displaying a graphical user interface of a software development system according to some examples. Some or all of the operations 3200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 3200 are performed by the SDS 110 of the other figures.

The operations 3200 include, at block 3202, obtaining an initial description of an initial structure of a software system, the initial description including an identification of interconnections amongst provider network resources that form the initial structure. For example, the initial description can be a system map including an identification of the various resources of a software system and their connections or dependencies, such as the original system map 2561.

The operations 3200 further include, at block 3204, obtaining a modified description of a modified structure of the software system, the modified structure based on at least a change to the initial structure of the software system described in the initial description. The modified description can be a partial or full map representing the change (e.g., a partial map including the changes relative to a prior map, the full map representing the system as a whole), such as action maps 2562A-2562N.

The operations 3200 further include, at block 3206, determining a difference between the initial description and the modified description. An exemplary difference is the addition or removal of a system resource or a connection between system resources.

The operations 3200 further include, at block 3208, causing an electronic device to display a graphical user interface including a visual depiction of the initial structure of the software system and an indication of the difference, the visual depiction based at least in part on the initial description. Exemplary difference indicators include icons, color, line weight, etc. associated with the particular difference. For example, a "NEW" icon or green border could indicate a difference of a new component, whereas a "DELETED" or red border could indicate a difference of a removed component.

Figure 33:
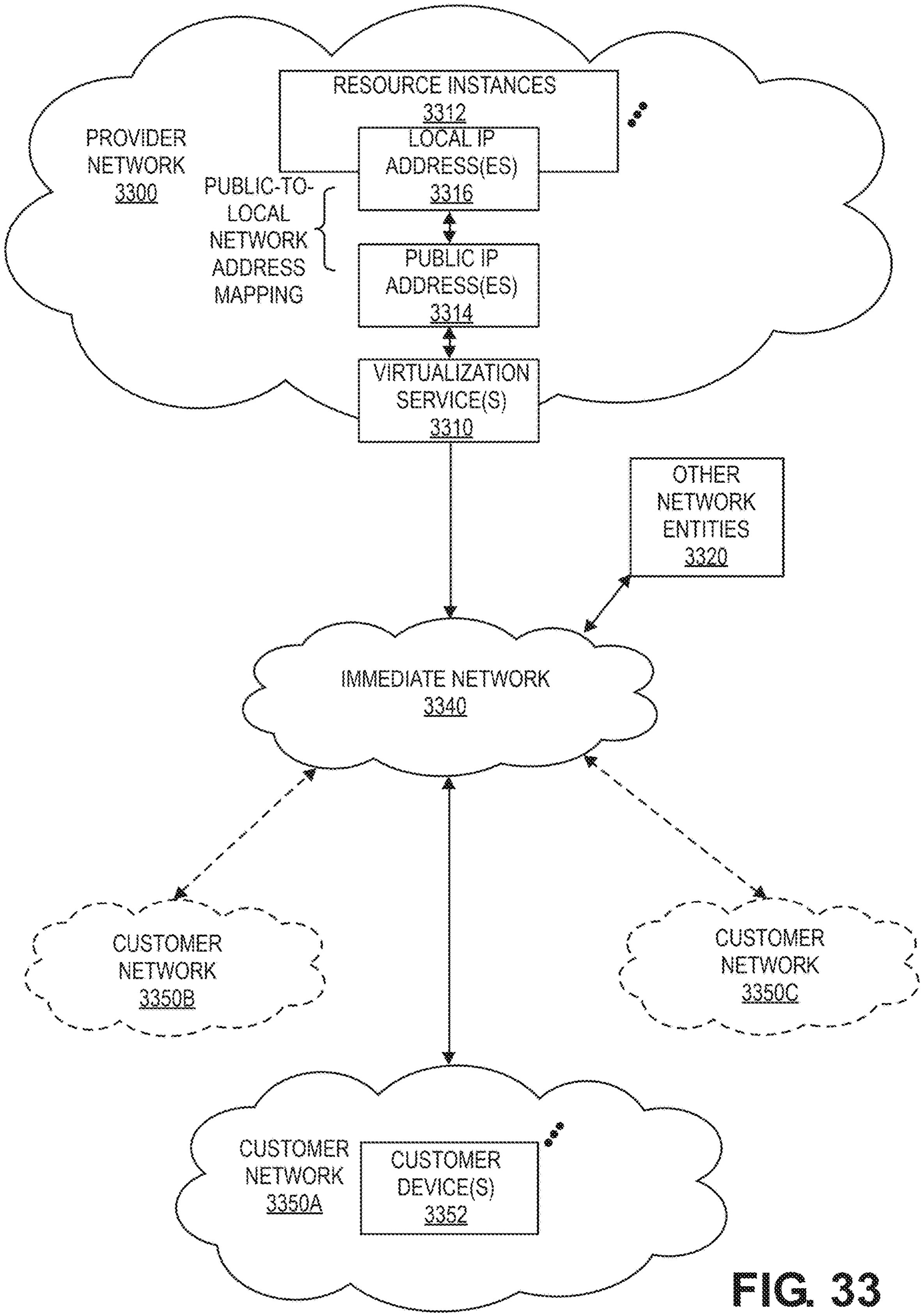
FIG. 33 illustrates an example provider network environment according to some examples.

FIG. 33 illustrates an example provider network (or "service provider system") environment according to some examples. A provider network 3300 can provide resource virtualization to customers via one or more virtualization services 3310 that allow customers to purchase, rent, or otherwise obtain instances 3312 of virtualized resources, including but not limited to computation and storage resources, implemented on devices within the provider network or networks in one or more data centers. Local Internet Protocol (IP) addresses 3316 can be associated with the resource instances 3312; the local IP addresses are the internal network addresses of the resource instances 3312 on the provider network 3300. In some examples, the provider network 3300 can also provide public IP addresses 3314 and/or public IP address ranges (e.g., Internet Protocol version 4 (IPv4) or Internet Protocol version 6 (IPv6) addresses) that customers can obtain from the provider 3300.

Conventionally, the provider network 3300, via the virtualization services 3310, can allow a customer of the service provider (e.g., a customer that operates one or more customer networks 3350A-3350C (or "client networks") including one or more customer device(s) 3352) to dynamically associate at least some public IP addresses 3314 assigned or allocated to the customer with particular resource instances 3312 assigned to the customer. The provider network 3300 can also allow the customer to remap a public IP address 3314, previously mapped to one virtualized computing resource instance 3312 allocated to the customer, to another virtualized computing resource instance 3312 that is also allocated to the customer. Using the virtualized computing resource instances 3312 and public IP addresses 3314 provided by the service provider, a customer of the service provider such as the operator of the customer network(s) 3350A-3350C can, for example, implement customer-specific applications and present the customer's applications on an intermediate network 3340, such as the Internet. Other network entities 3320 on the intermediate network 3340 can then generate traffic to a destination public IP address 3314 published by the customer network(s) 3350A-3350C; the traffic is routed to the service provider data center, and at the data center is routed, via a network substrate, to the local IP address 3316 of the virtualized computing resource instance 3312 currently mapped to the destination public IP address 3314. Similarly, response traffic from the virtualized computing resource instance 3312 can be routed via the network substrate back onto the intermediate network 3340 to the source entity 3320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 3300; a customer can then assign their allocated public IP addresses to particular resource instances allocated to the customer. These public IP addresses can be referred to as customer public IP addresses, or simply customer IP addresses. Instead of being assigned by the provider network 3300 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 34:
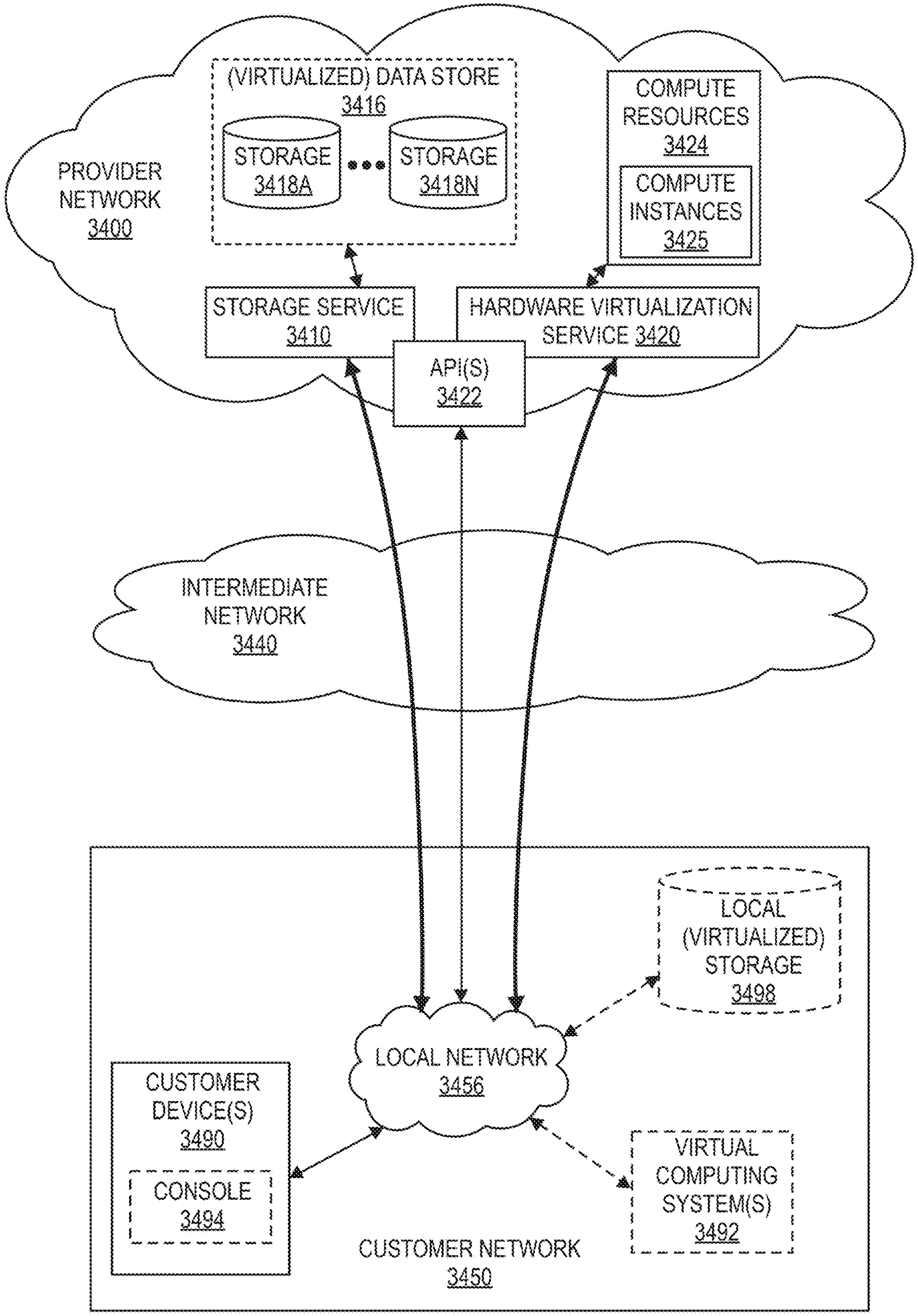
FIG. 34 is a block diagram of an example provider network that provides a storage service and a hardware virtualization service to customers according to some examples.

FIG. 34 is a block diagram of an example provider network environment 3400 that provides a storage service and a hardware virtualization service to customers, according to some examples. A hardware virtualization service 3420 provides multiple compute resources 3424 (e.g., compute instances 3425, such as VMs) to customers. The compute resources 3424 can, for example, be provided as a service to customers of a provider network 3400 (e.g., to a customer that implements a customer network 3450). Each computation resource 3424 can be provided with one or more local IP addresses. The provider network 3400 can be configured to route packets from the local IP addresses of the compute resources 3424 to public Internet destinations, and from public Internet sources to the local IP addresses of the compute resources 3424.

The provider network 3400 can provide the customer network 3450, for example coupled to an intermediate network 3440 via a local network 3456, the ability to implement virtual computing systems 3492 via the hardware virtualization service 3420 coupled to the intermediate network 3440 and to the provider network 3400. In some examples, the hardware virtualization service 3420 can provide one or more APIs 3422, for example a web services interface, via which the customer network 3450 can access functionality provided by the hardware virtualization service 3420, for example via a console 3494 (e.g., a web-based application, standalone application, mobile application, etc.) of a customer device 3490. In some examples, at the provider network 3400, each virtual computing system 3492 at the customer network 3450 can correspond to a computation resource 3424 that is leased, rented, or otherwise provided to the customer network 3450.

From an instance of the virtual computing system(s) 3492 and/or another customer device 3490 (e.g., via console 3494), the customer can access the functionality of a storage service 3410, for example via the one or more APIs 3402, to access data from and store data to storage resources 3418A-3418N of a virtual data store 3416 (e.g., a folder or "bucket," a virtualized volume, a database, etc.) provided by the provider network 3400. In some examples, a virtualized data store gateway (not shown) can be provided at the customer network 3450 that can locally cache at least some data, for example frequently accessed or critical data, and that can communicate with the storage service 3410 via one or more communications channels to upload new or modified data from a local cache so that the primary store of data (the virtualized data store 3416) is maintained. In some examples, a user, via the virtual computing system 3492 and/or another customer device 3490, can mount and access virtual data store 3416 volumes via the storage service 3410 acting as a storage virtualization service, and these volumes can appear to the user as local (virtualized) storage 3498.

While not shown in FIG. 34, the virtualization service(s) can also be accessed from resource instances within the provider network 3400 via the API(s) 3422. For example, a customer, appliance service provider, or other entity can access a virtualization service from within a respective virtual network on the provider network 3400 via the API(s) 3422 to request allocation of one or more resource instances within the virtual network or within another virtual network.

Figure 35:
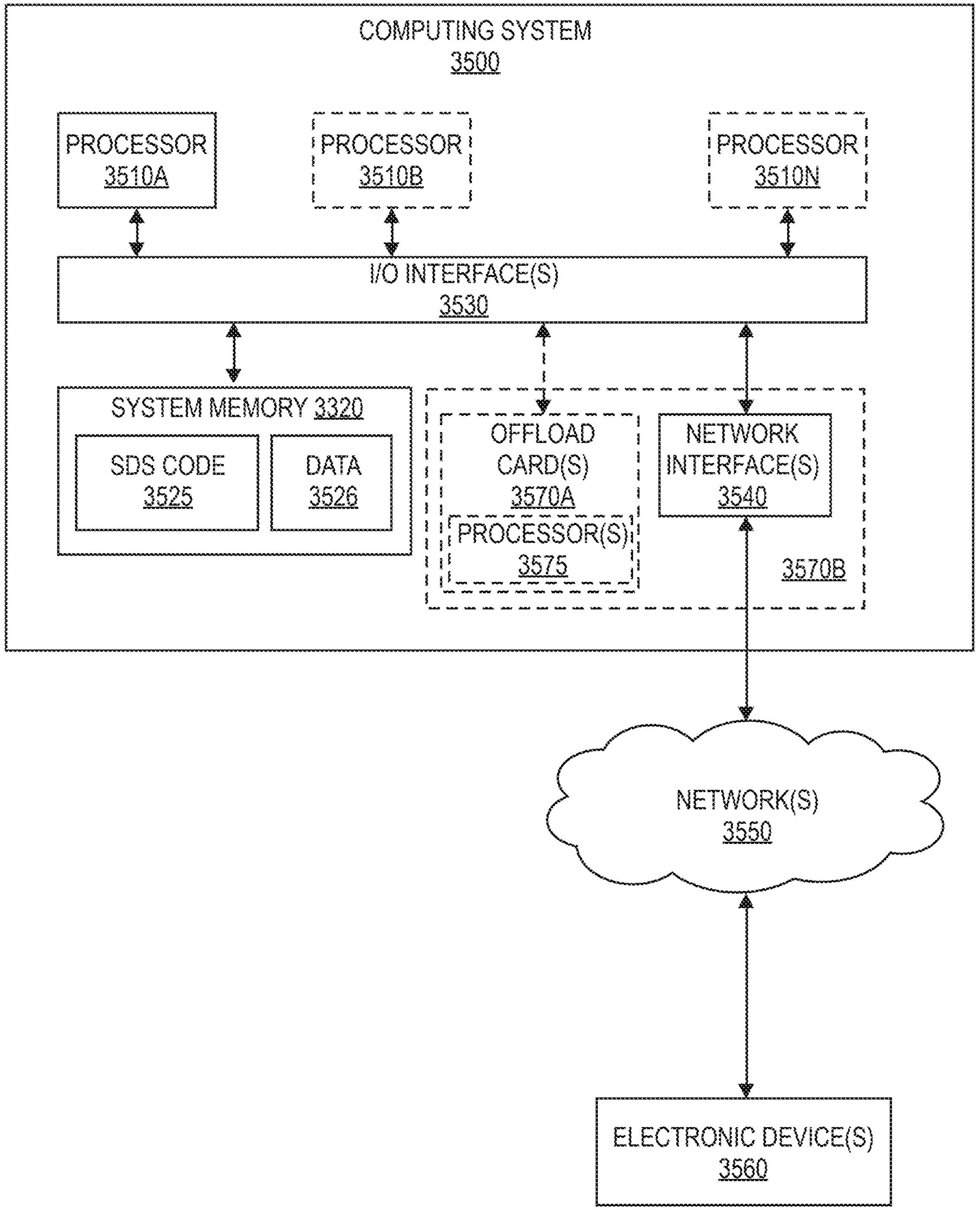
FIG. 35 is a block diagram illustrating an example computer system that can be used in some examples.

In some examples, a system that implements a portion or all of the techniques described herein can include a general-purpose computer system, such as the computer system 3500 (also referred to as a computing device or electronic device) illustrated in FIG. 35, that includes, or is configured to access, one or more computer-accessible media. In the illustrated example, the computer system 3500 includes one or more processors 3510 coupled to a system memory 3520 via an input/output (I/O) interface 3530. The computer system 3500 further includes a network interface 3540 coupled to the I/O interface 3530. While FIG. 35 shows the computer system 3500 as a single computing device, in various examples the computer system 3500 can include one computing device or any number of computing devices configured to work together as a single computer system 3500.

In various examples, the computer system 3500 can be a uniprocessor system including one processor 3510, or a multiprocessor system including several processors 3510 (e.g., two, four, eight, or another suitable number). The processor(s) 3510 can be any suitable processor(s) capable of executing instructions. For example, in various examples, the processor(s) 3510 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 3510 can commonly, but not necessarily, implement the same ISA.

The system memory 3520 can store instructions and data accessible by the processor(s) 3510. In various examples, the system memory 3520 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 3520 as SDS code 3525 (e.g., executable to implement, in whole or in part, an LLM service such as those described herein) and data 3526.

In some examples, the I/O interface 3530 can be configured to coordinate I/O traffic between the processor 3510, the system memory 3520, and any peripheral devices in the device, including the network interface 3540 and/or other peripheral interfaces (not shown). In some examples, the I/O interface 3530 can perform any necessary protocol, timing, or other data transformations to convert data signals from one component (e.g., the system memory 3520) into a format suitable for use by another component (e.g., the processor 3510). In some examples, the I/O interface 3530 can include support for devices attached through various types of peripheral buses, such as a variant of the Peripheral Component Interconnect (PCI) bus standard or the Universal Serial Bus (USB) standard, for example. In some examples, the function of the I/O interface 3530 can be split into two or more separate components, such as a north bridge and a south bridge, for example. Also, in some examples, some or all of the functionality of the I/O interface 3530, such as an interface to the system memory 3520, can be incorporated directly into the processor 3510.

The network interface 3540 can be configured to allow data to be exchanged between the computer system 3500 and other devices 3560 attached to a network or networks 3550, such as other computer systems or devices as illustrated in FIG. 1, for example. In various examples, the network interface 3540 can support communication via any suitable wired or wireless general data networks, such as types of Ethernet network, for example. Additionally, the network interface 3540 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 3500 includes one or more offload cards 3570A or 3570B (including one or more processors 3575, and possibly including the one or more network interfaces 3540) that are connected using the I/O interface 3530 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 3500 can act as a host electronic device (e.g., operating as part of a hardware virtualization service) that hosts compute resources such as compute instances, and the one or more offload cards 3570A or 3570B execute a virtualization manager that can manage compute instances that execute on the host electronic device. As an example, in some examples the offload card(s) 3570A or 3570B can perform compute instance management operations, such as pausing and/or un-pausing compute instances, launching and/or terminating compute instances, performing memory transfer/copying operations, etc. These management operations can, in some examples, be performed by the offload card(s) 3570A or 3570B in coordination with a hypervisor (e.g., upon a request from a hypervisor) that is executed by the other processors 3510A-3510N of the computer system 3500. However, in some examples the virtualization manager implemented by the offload card(s) 3570A or 3570B can accommodate requests from other entities (e.g., from compute instances themselves), and cannot coordinate with (or service) any separate hypervisor.

In some examples, the system memory 3520 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 3500 via the I/O interface 3530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 3500 as the system memory 3520 or another type of memory. Further, a computer-accessible medium can include transmission media or signals such as electrical, electromagnetic, or digital signals, conveyed via a communication medium such as a network and/or a wireless link, such as can be implemented via the network interface 3540.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response to requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 3418A-3418N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method, comprising:

determining a first plurality of errors in a source code;

setting a simulated annealing ("SA") temperature value to an initial value of a plurality of values, wherein the initial value allows selection of one or more potential error solutions that result in a modified code having more errors than the first plurality of errors;

selecting, based at least in part on the initial value, a first one or more potential error solutions that are suggested to resolve a first batch of errors of the first plurality of errors, wherein:

the first one or more potential error solutions is determined to result in a first expected modified code of the source code having a first expected plurality of errors that is larger than the first plurality of errors; and a second one or more potential error solutions of the first plurality of potential error solutions is determined to result in a second expected modified code of the source code having a second expected plurality of errors that is less than the first plurality of errors;

generating a first modified code of the source code based at least in part on the first one or more potential error solutions such that the first batch of errors is resolved and the first modified code includes a second plurality of errors;

decreasing the SA temperature value to a second value of the plurality of values, wherein the second value is more restrictive than the initial value and only allows selection of potential error solutions that result in a modified code having fewer errors than the second plurality of errors;

selecting, based at least in part on the second value, a third one or more potential error solutions of a second plurality of potential error solutions that is suggested to resolve a second batch of errors of the second plurality of errors, wherein the third one or more potential error solutions is determined to result in a third expected modified code having a third expected plurality of errors that is less than the second plurality of errors;

generating a second modified code based on the first modified code and the third one or more potential error solutions such that the second batch of errors is resolved;

decreasing the SA temperature to a third value of the plurality of values, wherein the third value is more restrictive than the second value of the plurality of values and only allows selection of a potential error solution that results in a modified code of the source code that is error-free;

selecting, based at least in part on the third value, a fourth one or more potential error solutions of a third plurality of potential error solutions that is suggested to resolve a third batch of errors of a third plurality of errors, wherein the fourth one or more potential error solutions is determined to result in a final expected modified code of the source code that is error-free; and generating a final modified code of the source code based at least in part on the fourth one or more potential error solutions such that the third batch of errors is resolved and the final modified code is error-free.

2. The computer-implemented method of claim 1, further comprising:

selecting a first error to include in the first batch of errors; and determining the first plurality of potential error solutions to include one or more potential error solutions to resolve the first error.

3. The computer-implemented method of claim 1, further comprising:

generating, for each error of the first plurality of errors, at least one potential solution, wherein each potential solution is included in the first plurality of potential error solutions.

4. The computer-implemented method of claim 1, further comprising:

generating, with a large language model and based at least in part on one or more of the first plurality of errors, the first plurality of potential error solutions.

5. The computer-implemented method of claim 1, further comprising:

transforming an initial source code to the source code, wherein the transformation is a cause of at least some of the first plurality of errors.

6. A system comprising:

one or more processors; and a memory storing program instructions that, when executed by the one or more processors, cause the one or more processors to at least:

determine a first plurality of errors in a source code;

set a simulated annealing ("SA") temperature value to a first value, wherein the first value allows selection of one or more potential error solutions that result in a modified code having more errors than the first plurality of errors;

receive, from a large language model ("LLM"), a first plurality of potential error solutions corresponding to at least one of the first plurality of errors;

select, based at least in part on the first value, a first one or more potential error solutions from the first plurality of potential error solutions, wherein the first one or more potential error solutions is determined to result in a first expected modified code of the source code having a first expected plurality of errors that is larger than the first plurality of errors;

generate a first modified code based at least in part on the first one or more potential error solutions such that at least a first error is resolved and the first modified code includes a second plurality of errors that is more than the first plurality of errors;

set the SA temperature value to a second value, wherein the second value is more restrictive than the first value and requires selection of a potential error solution that results in a modified code having fewer errors than at least one of the first plurality of errors or the second plurality of errors;

receive, from the LLM, a second plurality of potential error solutions corresponding to at least one of the second plurality of errors;

select, based at least in part on the second value, a second one or more potential error solutions from the second plurality of potential error solutions, wherein the second one or more potential error solutions is determined to result in a second expected modified code having a second expected plurality of errors that is less than at least one of the first plurality of errors or the second plurality of errors; and generate a second modified code based at least in part on the second one or more potential error solutions such that a second error is resolved.

7. The system of claim 6, wherein the program instructions that, when executed by the one or more processors, further cause the one or more processors to at least:

select, based at least in part on the second value, a third one or more potential error solutions from the second plurality of potential error solutions, wherein the third one or more potential error solutions are determined to result in a third expected modified code having a third expected plurality of errors that is less than at least one of the first plurality of errors or the second plurality of errors; and generate a third modified code based at least in part on the second one or more potential error solutions and the third one or more potential error solutions such that at least the second error and a third error are resolved.

8. The system of claim 6, wherein the program instructions that, when executed by the one or more processors, further cause the one or more processors to at least:

determine, based at least in part on the second modified code, to increase the SA temperature value to a third value that is between the first value and the second value such that the third value is more restrictive than the first value and less restrictive than the second value;

receive, from the LLM, a third plurality of potential error solutions corresponding to at least one of a second plurality of errors of the second modified code; and select, based at least in part on the SA temperature value, a third one or more potential error solutions from the third plurality of potential error solutions that are expected to create more errors than the second plurality of errors.

9. The system of claim 6, wherein the program instructions that, when executed by the one or more processors, further cause the one or more processors to at least:

select a first error of the first plurality of errors;

provide the first error to the LLM;

receive, from the LLM, one or more potential error solutions that resolve the first error; and include the one or more potential error solutions in the first plurality of potential error solutions.

10. The system of claim 6, wherein the program instructions that, when executed by the one or more processors, further cause the one or more processors to at least:

receive, from the LLM and for each error of the first plurality of errors, at least one potential error solution, wherein each potential error solution is included in the first plurality of potential error solutions.

11. The system of claim 6, wherein the program instructions that, when executed by the one or more processors, further cause the one or more processors to at least:

decrease the SA temperature value to a third value, wherein the third value is more restrictive than all other values of the plurality of values and only allows selection of a potential error solution that results in a modified code that is error-free;

select, based at least in part on the SA temperature value, a third potential error solution of a third plurality of potential error solutions that is suggested to resolve, at least, a third error of a third plurality of errors of the second modified code, wherein the third potential error solution is determined to result in a final expected modified code of the source code that is error-free; and generate a final modified code of the source code based at least in part on the third potential error solution such that the third error is resolved and the final modified code is error-free.

12. The system of claim 6, wherein the program instructions that, when executed by the one or more processors, further cause the one or more processors to at least:

transform an initial source code in a first programming language to the source code in a second programming language; and wherein the first plurality of errors are generated, at least in part, from the transformation.

13. The system of claim 6, wherein the program instructions that, when executed by the one or more processors, further cause the one or more processors to at least:

validate the second modified code to determine that the second modified code resolves the second error and does not generate additional errors exceeding the second expected plurality of errors.

14. The system of claim 6, wherein the program instructions that, when executed by the one or more processors, further cause the one or more processors to at least:

provide, to the LLM and for each error of the first plurality of errors, a description of the error.

15. A computer-implemented method comprising:

determining a first plurality of errors in a source code;

selecting a first value of a plurality of values, wherein the first value allows selection of one or more potential error solutions that result in a modified code having more errors than the first plurality of errors;

determining a first plurality of potential error solutions corresponding to at least one of the first plurality of errors;

selecting, based at least in part on the first value, a first one or more potential error solutions from the first plurality of potential error solutions, wherein the first one or more potential error solutions are determined to result in a first expected modified code of the source code having a first expected plurality of errors that is larger than the first plurality of errors;

generating a first modified code of the source code based at least in part on the first one or more potential error solutions such that at least a first error is resolved and the first modified code includes a second plurality of errors that is more than the first plurality of errors;

selecting a second value of the plurality of values, wherein the second value is more restrictive than the first value and requires selection of a potential error solution that results in a modified code having fewer errors than at least one of the first plurality of errors or the second plurality of errors;

determining a second plurality of potential error solutions corresponding to at least one of the second plurality of errors;

selecting, based at least in part on the second value, a second one or more potential error solutions from the second plurality of potential error solutions, wherein the second one or more potential error solutions are determined to result in a second expected modified code having a second expected plurality of errors that is less than at least one of the first plurality of errors or the second plurality of errors; and generating a second modified code based at least in part on the second one or more potential error solutions such that a second error is resolved and the second modified code has fewer errors than at least one of the first plurality of errors or the second plurality of errors.

16. The computer-implemented method of claim 15, wherein determining the first plurality of potential error solutions, further includes:

providing at least one error of the first plurality of errors to a large language model ("LLM") with instructions for the LLM to determine at least one potential error solution for the at least one error.

17. The computer-implemented method of claim 15, wherein:

the second value requires that selection of one or more potential error solutions result in a modified code that is error-free.

18. The computer-implemented method of claim 15, further comprising:

validating the second modified code and determining that the second modified code is not error-free;

rejecting the second modified code;

selecting a third one or more potential error solutions from the second plurality of potential error solutions, wherein the third one or more potential error solutions are determined to result in a third expected modified code having a third expected plurality of errors that is less than at least one of the first plurality of errors or the second plurality of errors; and generating a third modified code of the source code based at least in part on the third one or more potential error solutions such that at least the second error is resolved and the third modified code has fewer errors than at least one of the first plurality of errors or the second plurality of errors.

19. The computer-implemented method of claim 18, further comprising:

subsequent to rejecting the second modified code, selecting the third one or more potential error solutions based at least in part on a third value such that the selection of the third one or more potential error solutions is less restrictive than selection of the second one or more potential error solutions and more restrictive than the first one or more potential error solutions.

20. The computer-implemented method of claim 15, further comprising:

validating the second modified code and determining that the second modified code is error-free; and finalizing a de-bugging of the source code.

* * * * *